(12) United States Patent
Zhu et al.

(10) Patent No.: US 9,744,841 B2
(45) Date of Patent: Aug. 29, 2017

(54) HYBRID-POWER DRIVING SYSTEM FOR A VEHICLE AND A TRANSMISSION THEREOF

(71) Applicant: SAIC Motor Corporation Limited, Shanghai (CN)

(72) Inventors: Jun Zhu, Shanghai (CN); Jian Wang, Shanghai (CN); Hailong Ge, Shanghai (CN); Zhenxing Fu, Shanghai (CN); Sidong Luo, Shanghai (CN); Min Liu, Shanghai (CN)

(73) Assignee: SAIC Motor Corporation Limited, Shanghai (CN)

( * ) Notice: Subject to any disclaimer, the term of this patent is extended or adjusted under 35 U.S.C. 154(b) by 207 days.

(21) Appl. No.: 14/752,211

(22) Filed: Jun. 26, 2015

(65) Prior Publication Data
US 2016/0137048 A1    May 19, 2016

(30) Foreign Application Priority Data

Nov. 18, 2014    (CN) .......................... 2014 1 0658447

(51) Int. Cl.
*F16H 3/093*    (2006.01)
*B60K 6/365*    (2007.10)
(Continued)

(52) U.S. Cl.
CPC ................ *B60K 6/365* (2013.01); *B60K 6/48* (2013.01); *B60K 6/547* (2013.01); *F16H 3/091* (2013.01);
(Continued)

(58) Field of Classification Search
CPC ...................................................... F16H 3/093
See application file for complete search history.

(56) References Cited

U.S. PATENT DOCUMENTS 4,565,106 A * 1/1986 Sumiyoshi .............. F16H 3/093
                                                                74/329
4,584,892 A   4/1986 Hiraiwa et al.
(Continued)

FOREIGN PATENT DOCUMENTS

CN    101875298 A    11/2010
CN    102490585 A    6/2012
(Continued)

OTHER PUBLICATIONS

U.S. Appl. No. 14/948,034, filed Nov. 20, 2015, inventors: Jun Zhu, Chengjie Ma, Ihengmin Gu, Xiajun Ye, Pengjun Zhang, Peng Zhang, and Jing Gu.
(Continued)

*Primary Examiner* — Tisha Lewis
(74) *Attorney, Agent, or Firm* — McDonnell Boehnen Hulbert & Berghoff LLP

(57) ABSTRACT

A hybrid-power driving system (HPDS) (100, 200) includes an engine, a motor, and a transmission. The HPDS may include a single clutch and the transmission can provide at least five forward speed ratios and can provide for at least one reverse speed ratio. The transmission can include three synchronizers and multiple gearwheels that are used in multiple speed ratios. In addition to a pure engine driving mode and a pure motor driving mode, the HPDS can operate using a hybrid-power driving mode (HDM). In the HDM, the HPDS can provide for shifting of gears without power interruption to the output shaft or half-axles and wheels of a vehicle. In the HDM, the continuous power being output can be achieved by keeping a synchronizer engaged with a gearwheel for two consecutive speed ratios.

17 Claims, 34 Drawing Sheets

(51) Int. Cl.
*B60K 6/48* (2007.10)
*B60K 6/547* (2007.10)
*F16H 3/091* (2006.01)
*F16H 3/08* (2006.01)

(52) U.S. Cl.
CPC .......... *B60K 2006/4816* (2013.01); *B60K 2006/4841* (2013.01); *B60Y 2200/92* (2013.01); *F16H 2003/0826* (2013.01); *F16H 2200/0052* (2013.01); *Y02T 10/6221* (2013.01); *Y02T 10/6256* (2013.01); *Y10S 903/91* (2013.01); *Y10S 903/919* (2013.01)

(56) References Cited

U.S. PATENT DOCUMENTS

| | | | |
|---|---|---|---|
| 5,106,352 | A | 4/1992 | Lepelletier |
| 5,425,283 | A | 6/1995 | Wehking |
| 5,558,595 | A | 9/1996 | Schmidt et al. |
| 5,789,823 | A | 8/1998 | Sherman |
| 6,019,697 | A | 2/2000 | Colletti |
| 6,592,484 | B1 | 7/2003 | Tsai et al. |
| 6,886,424 | B2 | 5/2005 | Janson et al. |
| 7,597,020 | B2 | 10/2009 | Baldwin |
| 7,611,433 | B2 | 11/2009 | Forsyth et al. |
| 7,895,910 | B2 | 3/2011 | Caenazzo et al. |
| 8,109,167 | B2 | 2/2012 | Mohlin |
| 8,116,951 | B2 | 2/2012 | Holmes |
| 8,333,126 | B2 | 12/2012 | Enstroem et al. |
| 8,444,519 | B2 | 5/2013 | Borntraeger et al. |
| 8,549,959 | B2 | 10/2013 | Kasuya et al. |
| 8,661,941 | B2 * | 3/2014 | Hellenbroich .......... B60K 6/48 74/331 |
| 8,672,109 | B2 | 3/2014 | Quartier et al. |
| 8,672,803 | B2 | 3/2014 | Tamba et al. |
| 8,677,847 | B2 | 3/2014 | Diani et al. |
| 8,689,655 | B2 | 4/2014 | Diani et al. |
| 8,714,287 | B2 | 5/2014 | Kim et al. |
| 8,727,939 | B2 | 5/2014 | Chen et al. |
| 8,763,485 | B2 | 7/2014 | Thomas |
| 8,771,136 | B2 | 7/2014 | Miller et al. |
| 8,784,249 | B2 | 7/2014 | Motodohl et al. |
| 9,358,873 | B2 | 6/2016 | Moore et al. |
| 2001/0051556 | A1 | 12/2001 | Takenaka |
| 2002/0033059 | A1 * | 3/2002 | Pels .......... B60K 6/26 74/329 |
| 2004/0251064 | A1 | 12/2004 | Imai |
| 2004/0251862 | A1 | 12/2004 | Imai |
| 2009/0199666 | A1 | 8/2009 | Yang et al. |
| 2010/0276218 | A1 | 11/2010 | Thompson et al. |
| 2010/0311540 | A1 | 12/2010 | Hellenbroich |
| 2011/0239820 | A1 | 10/2011 | Shibahata |
| 2012/0104904 | A1 | 5/2012 | Abiko et al. |
| 2012/0234133 | A1 | 9/2012 | Ikegami et al. |
| 2012/0304789 | A1 * | 12/2012 | Misu .......... B60K 6/547 74/331 |
| 2013/0091984 | A1 | 4/2013 | Pesola et al. |
| 2013/0112041 | A1 | 5/2013 | Tamai et al. |
| 2013/0184111 | A1 | 7/2013 | Tsuchida et al. |
| 2014/0011631 | A1 | 1/2014 | Cimatti |
| 2014/0135162 | A1 | 5/2014 | Wittkopp et al. |
| 2014/0283647 | A1 | 9/2014 | Blessing et al. |
| 2014/0373675 | A1 | 12/2014 | Kaltenbach et al. |
| 2016/0009269 | A1 | 1/2016 | Zhou et al. |
| 2016/0137045 | A1 | 5/2016 | Zhu et al. |
| 2016/0137049 | A1 | 5/2016 | Zhu et al. |
| 2016/0137188 | A1 | 5/2016 | Zhu et al. |
| 2016/0137189 | A1 | 5/2016 | Zhu et al. |

FOREIGN PATENT DOCUMENTS

| | | |
|---|---|---|
| CN | 103072474 A | 5/2013 |
| CN | 103332100 A | 10/2013 |
| CN | 103552461 A | 2/2014 |
| EP | 1690723 A2 | 8/2006 |
| JP | 2009107626 A | 5/2009 |
| WO | 2008/138387 A1 | 11/2008 |

OTHER PUBLICATIONS

U.S. Appl. No. 14/947,979, filed Nov. 20, 2015, inventors: Hongxiang Leng, Wen Li, Jun Sun, Xinhua Jiang, Feifei Zhang, Sidong Luo, and Hailong Ge.

Ioan-Adrian Viorel; et al.; Integrated Starter-Generators for Automotive Applications, ACTA Electrotehnica, vol. 45, No. 3, Sep. 2004, pp. 255-260.

Nate Martinez, Motor Trend Canada, First Drive: 2012 Infiniti M35 Hybrid—Fashionably Late: Infinity Finally RSVPs for Upscale Hybrid Party, Aug. 4, 2010, 18 pages.

Iskra Avtoelektrika d.d.; Integrated Starter Motor Generators; Mar. 2008, 8 pages.

\* cited by examiner

HYBRID-POWER DRIVING SYSTEM FOR A VEHICLE AND A TRANSMISSION THEREOF

CROSS REFERENCE TO RELATED APPLICATIONS

This application claims the benefit of priority to Chinese Patent Application No. 201410658447.8, filed Nov. 18, 2014, the contents of which are incorporated entirely herein by reference

BACKGROUND

Unless otherwise indicated herein, the elements described in this section, the technical field, and the background art are not prior art to the claims and are not admitted to be prior art by inclusion in this section.

A. Technical Field

This application relates to a vehicle hybrid-power driving system. A vehicle hybrid-power driving system described in this application can include synchronizers that are cooperatively switched and gearwheels that are shared in different gear ratios (i.e., speed ratios), so that a compact structure of the system can be obtained and effective cooperation of an electric motor (or more simply, "EM") and an internal combustion engine (or more simply, "engine" or "ICE") in multiple speed ratios can be achieved. A clutch in the vehicle hybrid-power driving system can allow for shifting of gears without interrupting the transmission of power.

B. Background Art

As the pollution of the environment, the demand for petroleum, and the requirements for vehicle emission equipment increase, vehicles with new power sources get more and more attention. Hybrid-power vehicles are widely used, at least in part, because of their low operating cost and low emissions. In known hybrid-power vehicles, the ICE, the clutch, the EM, and the transmission are disposed in sequence and occupy a large space in a vehicle. Deploying those hybrid-power vehicle components in such a layout can result in limiting the size of the EM, and as a result, limiting the power of the EM and the power capacity of the vehicle. As such, the fuel use efficiency cannot be improved significantly with respect to non-hybrid vehicles. Furthermore, the driving ability in a pure motor driving mode is not satisfying when the power of the EM is too low.

Furthermore still, in current vehicle hybrid-power driving systems, driving comfort cannot be ensured since power interruption cannot be avoided automatically in the configuration having a single clutch. In a known vehicle hybrid-power driving system, the power transmitting path of the EM is joined midway into several of the power transmitting paths of the ICE, which results in a vehicle hybrid-power driving system having complex power transmitting paths.

OVERVIEW

This application describes several example embodiments, at least some of which pertain to a hybrid-power driving system (HPDS) and components thereof such as, but not limited to, transmissions and gearboxes, and methods of transmitting power through or within an HPDS and transmission.

In one respect, an example embodiment can take the form of an HPDS comprising: (i) an input shaft having disposed thereon a first driving gearwheel, a second driving gearwheel, a third driving gearwheel, a reverse-gear driving gearwheel, a first synchronizer, and a second synchronizer, wherein the first synchronizer is disposed between the first driving gearwheel and the second driving gearwheel, and wherein the second synchronizer is disposed between the third driving gearwheel and the reverse-gear driving gearwheel, (ii) a first intermediate shaft having disposed thereon a first speed-reducing gearwheel, a first driven gearwheel, a second driven gearwheel, a third driven gearwheel, a reverse-gear driven gearwheel, and a third synchronizer, wherein the third synchronizer is disposed between the first driven gearwheel and the second driven gearwheel, (iii) a second intermediate shaft having disposed thereon a first idler gearwheel and a second idler gearwheel, (iv) a first idler having disposed thereon a reverse-gear idler gearwheel, (v) a motor shaft, and (vi) a differential having gearwheels including a second speed-reducing gearwheel, wherein (i) the first driving gearwheel meshes with the first driven gearwheel, (ii) the second driving gearwheel meshes with the second driven gearwheel, (iii) the third driving gearwheel meshes with the third driven gearwheel, (iv) the reverse-gear driving gearwheel meshes with the reverse-gear idler gearwheel, (v) the reverse-gear driven gearwheel meshes with the reverse-gear idler gearwheel, (vi) the first idler gearwheel meshes with the first driven gearwheel, (vii) the second idler gearwheel meshes with the second driven gearwheel, and (viii) the first speed-reducing gearwheel meshes with the second speed-reducing gearwheel.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

Figure 1:
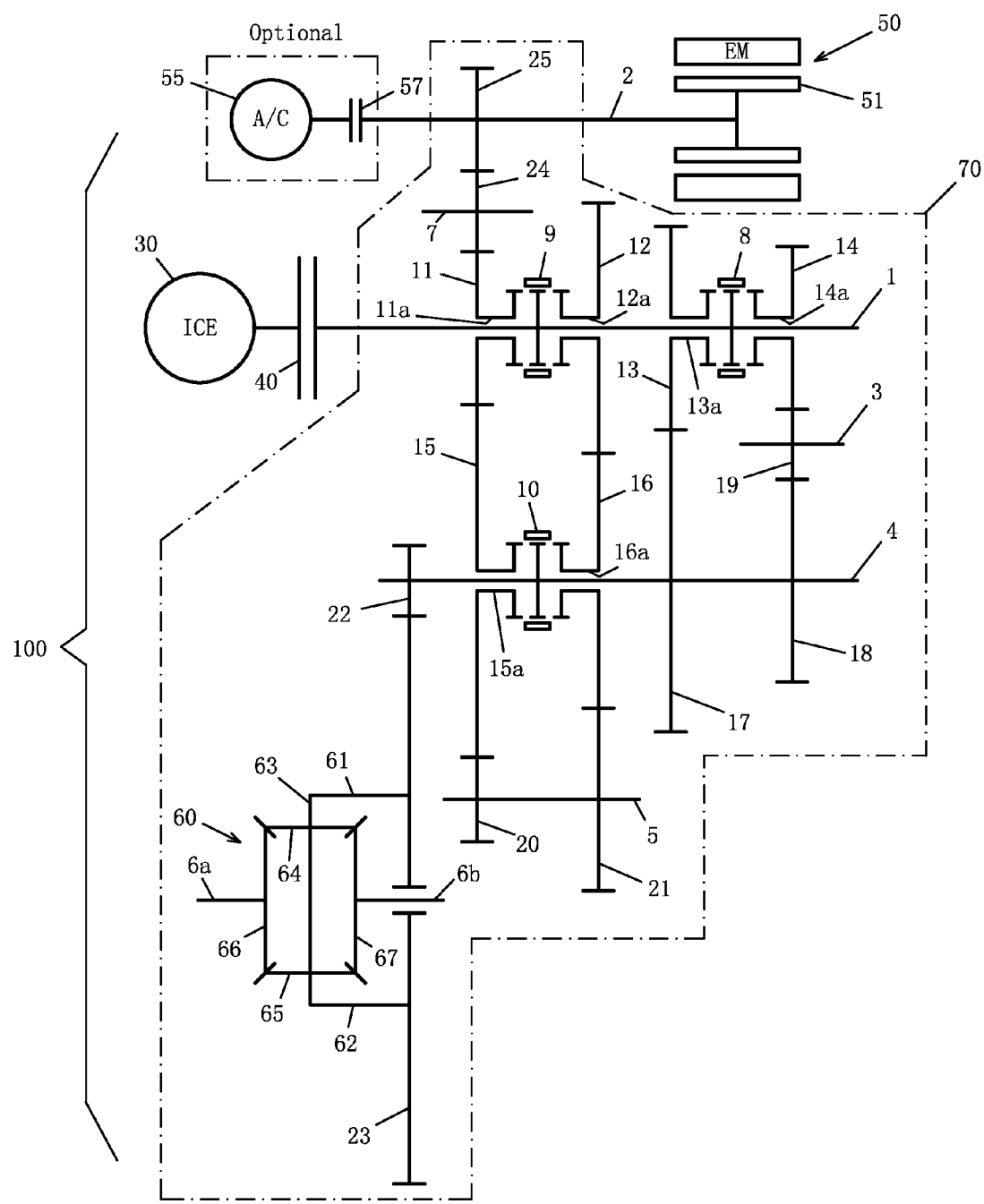
FIG. 1 is a schematic diagram of an HPDS including a transmission, an ICE, and an EM, the ICE being disposed coaxially with an input shaft of the transmission, and the EM being disposed other than coaxially with an input shaft of the transmission.

This description describes several example embodiments. The example embodiments can be applicable to an HPDS and components of or usable in an HPDS or usable in another type of driving system. A driving system, such as an HPDS or otherwise, can be installed within a vehicle such as, but not limited to, an automobile or a truck. An HPDS installed or installable within a vehicle can be referred to as a vehicle HPDS. Each example embodiment described herein can be a vehicle HPDS or a portion thereof, but is not so limited.

The example embodiments can provide for an HPDS having a structure that is compact and that can provide a pure engine driving mode (PEDM), a pure motor driving mode (PMDM), and a hybrid-power driving mode (HDM). At least one of the power capacity and fuel efficiency of a vehicle can be improved significantly by use of at least one of the example embodiments. The HPDS can include synchronizers that are cooperatively switched and gearwheels that are used in multiple speed ratios. This can provide for a compact structure of the transmission or gearbox and effective cooperation of an EM and an ICE in multiple speed ratios can be achieved. The HPDS can include a single clutch and gear shifting can be conducted without power interruption. Furthermore, power interruption during gear shifting can be avoided by alternate operation of the EM and the ICE.

In accordance with the example embodiments, an HPDS can include a transmission or gearbox having common gears that are shared in different speed ratios. The benefits of such a system include, but are not limited to, a reduced number of transmission components, a more compact structure, and a lower cost to produce the system. The transmission can be coupled to an ICE operable in the PEDM and the HDM and to an EM operable in the PMDM and the HDM.

The example embodiments provide flexibility in designing vehicles due to the alternative locations and arrangements of the EM that are possible by using the example embodiments. For example, in some example embodiments, the EM can be disposed in a side position relative to the transmission, whereas in other example embodiments, the EM can be disposed in an axial position relative to the transmission so as to reduce the occupied space in the axial direction.

In accordance with the example embodiments, the EM can provide two forward speed ratios. In this manner, the speed of the EM can be kept relatively low so that the EM can operate at higher efficiency levels. The ICE can operate under five or more forward speed ratios so that the operation efficiency of the ICE is high.

The example embodiments can include a single clutch transmission and a three synchronizer gearbox or transmission that provides for at least five forward speed ratios. A person having ordinary skill in the art will understand that the described example embodiments allow for a more compact HPDS arrangement as compared to an HPDS arrangement having at least one of (i) two or more clutches, and (ii) four or more synchronizers.

Within this description, the articles "a," "an," and "the" are used to introduce elements of the example embodiments. The intent of using those articles is that there is one or more of the elements. The intent of using the conjunction "or" within a list of at least two terms in this description is to indicate any of the listed terms or any combination of the listed terms. For example, in a list of terms recited as "A, B, or C," the combinations indicated by that list of terms include "A and B," "A and C," "B, and C," and "A, B, and C." The use of ordinal numbers such as "first," "second," "third," and so on in the description is to distinguish respective elements rather than to denote a particular order of those elements unless the context of using those terms explicitly indicates otherwise.

The diagrams and power transmission paths shown in the figures are provided merely as examples and are not intended to be limiting. Those skilled in the art will appreciate that other arrangements of the elements shown in the figures can be used instead.

II. First Example Hybrid-Power Driving System and Components Thereof

FIG. 1 is a schematic view of an HPDS 100 in accordance with multiple example embodiments. In accordance with an example embodiment, the HPDS 100 includes a transmission 70. In accordance with another example embodiment, the HPDS 100 can include the transmission 70 and at least one of an ICE 30 and an EM 50. The EM 50 can rotate a motor shaft 2 of the transmission 70. The motor shaft 2 can, in turn, rotate a mechanical compressor 55 of an air conditioning system or a compressor clutch 57 thereof, but the motor shaft is not so limited. The motor shaft 2 can include splines for engaging a rotor 51 of the EM 50 and a gearwheel on the shaft. HPDS 100 can be installed within a vehicle, such that HPDS 100 is a vehicle HPDS.

The ICE 30 and the EM 50 can each output power. The power (P) output by the ICE 30 can be calculated using the relationship $T_{ICE} \times W_{ICE}$, where $T_{ICE}$ equals the torque at the flywheel of the engine and $W_{ICE}$ equals an angular speed of the flywheel. The power (P) output by the EM 50 can be calculated using the relationship $T_{EM} \times W_{EM}$, where $T_{EM}$ equals the torque of a rotor within the EM 50 and $W_{EM}$ equals an angular speed of the rotor. The power output by the ICE 30 can be transmitted (e.g., transferred) to a clutch 40 and to an input shaft of the transmission 70, and, in turn, to wheels of a vehicle. The power output by the EM 50 can be output to the input shaft of the transmission 70 and, in turn, to the wheels of the vehicle. The power received by the transmission 70 from the ICE 30 or the EM 50 can be referred to as input power. Since the power transmitted by the transmission 70 includes a torque aspect, the transmission of power through or by the transmission 70 can be referred to as the transmission of torque through or by the transmission 70.

The transmission 70 includes an input shaft 1, a motor shaft 2 extending out from a rotor 51 of the EM 50, a reverse-gear idler shaft 3, an intermediate shaft 4, an intermediate shaft 5, a pair of differential half-axles 6a and 6b, and an idler shaft 7. For convenience purposes, the eight aforementioned shafts and half-axles are referred to herein as the "eight transmission shafts of the transmission 70." The half-axles 6a and 6b are differential half-axles of the differential 60. Differential half-axle 6a can be referred to as a half-axle and an output shaft. Differential half-axle 6b can be referred to as a half-axle and an output shaft Each of the eight transmission shafts of the transmission 70 can be mounted to, or at least partially within, a transmission case at locations that allow for gearwheels on those transmission shafts to mesh with at least one other gearwheel as described herein. Each of the eight transmission shafts of the transmission 70 can be spatially arranged parallel with each other. The transmission case can form or include a gearbox within which gearwheels of the transmission 70 and at least a portion of the eight transmission shafts of the transmission 70 are located. The EM 50 or a portion thereof can be located within the transmission case. Alternatively, the EM 50 can be located outside of the transmission case.

Each of the eight transmission shafts of the transmission 70 can have a first shaft-end-portion and a second shaftend-portion opposite the first shaft-end-portion axially (e.g., longitudinally). With reference to FIG. 1, the left-most shaft-end-portion of each of the eight transmission shafts of the transmission 70 is referred to as a first shaft-end-portion of that shaft and the right-most shaft-end-portion of each of the eight transmission shafts of the transmission 70 is referred to as a second shaft-end-portion of that shaft. The same designation of shaft-end-portions applies to any transmission shaft described herein or shown in any of the other figures.

The transmission 70 can include sleeves (e.g., a hollow shaft) 12a, 13a, 14a, 15a, and 16a. Sleeves 12a, 13a, and 14a are carried by the input shaft 1. Sleeves 15a and 16a are carried by the intermediate shaft 4.

The transmission 70 includes multiple driving gearwheels that drive at least one other gearwheel or causes at least one other gearwheel to turn. A driving gearwheel can be referred to as a "drive gearwheel." The transmission 70 includes multiple driven gearwheels. Each driven gearwheel can be driven by another gearwheel (e.g., driven by a driving gearwheel) or by a transmission shaft. One or more of the driving gearwheels described herein can act as a driven gearwheel for at least some of the power transmitting paths. For purposes of this description, the term "gearwheel" can be stated more simply as just "gear."

In an example embodiment of the HPDS 100 including the ICE 30, the input shaft 1 can be coupled to the ICE 30 by use of a clutch 40. As an example, the clutch 40 can include a pressure plate assembly, a throw-out bearing, a throw-our fork, and a clutch disk to engage a flywheel of the ICE 30, but the clutch 40 is not so limited. The clutch 40 can have an engaged state in which an output of the ICE 30 (e.g., the flywheel) is connected to the input shaft 1 (e.g., by way of the clutch disk). When viewed from a front side of the ICE 30 (opposite a back side of the ICE 30 to which the flywheel is connected), the power or torque output by the ICE 30 can turn the clutch 40 in a clockwise direction. Other references herein to the ICE 30 or a shaft of the transmission 70 turning in a clockwise direction are considered from the same viewpoint. Clutch 40 can have a disengaged state in which the output of the ICE 30 is not connected to the input shaft 1.

The transmission 70 can include a driving gearwheel 11, a synchronizer 9, a driving gearwheel 12, a driving gearwheel 13, a synchronizer 8, and a reverse-gear driving gearwheel 14 disposed on the input shaft 1 in a sequence from left to right (e.g., from the first shaft-end-portion to the second shaft-end portion) as shown in FIG. 1, but is not so limited. For example, those four gearwheels can be in a different sequence between the first shaft-end-portion and the second shaft-end portion of the input shaft 1 so long as each of those gearwheels is positioned to mesh with the corresponding gear(s) described herein as meshing with that gearwheel. Each of the driving gearwheel 11, the driving gearwheel 12, the driving gearwheel 13, and the reverse-gear driving gearwheel 14 is configured for releasably coupling (e.g., releasably engaging) with the input shaft 1 by a synchronizer and is rotatably carried by the input shaft 1 or is rotatably carried by the sleeves 12a, 13a, and 14a, respectively. Engagement of a gearwheel to a shaft by a synchronizer can include synchronizing (e.g., engaging) the synchronizer to a sleeve that carries the gearwheel. Alternatively, engagement of a gearwheel to a shaft by a synchronizer can include synchronizing the synchronizer directly to the gearwheel that is carried by a sleeve. Any gearwheel, shaft, or synchronizer disposed on a given shaft is carried by the given shaft and is supported by the given shaft.

Each synchronizer can include a hub, a synchronizer sleeve, and two blocker rings, but is not so limited. A synchronizer can be configured as a block synchronizer, a cone synchronizer, a pin synchronizer, but is not so limited. Each synchronizer described herein can be moved axially along a shaft on which the synchronizer is disposed. Axial movement of the synchronizer towards a gearwheel adjacent to the synchronizer can lead to coupling (i.e., engagement of) the gearwheel and the shaft upon which the synchronizer and gearwheel are carried. Axial movement of the synchronizer away from a gearwheel adjacent to the synchronizer can lead to uncoupling (i.e., disengagement of) the gearwheel and the shaft upon which the synchronizer and gearwheel are carried.

A gearwheel that couples with a shaft by a synchronizer can rotate in the same direction and same speed as the shaft when the gearwheel is coupled (i.e., engaged or locked) to the shaft. Any description herein of a gearwheel being engaged with a synchronizer carried by a transmission shaft includes that gearwheel being engaged with (i.e., coupled to) that transmission shaft. A gearwheel that couples with a shaft by a synchronizer can rotate independent of the shaft when the gearwheel is uncoupled from the shaft. Instead of using a single synchronizer to couple at least two gearwheels, two shafts, or a gearwheel and shaft, separate synchronizers could be used to couple the multiple gearwheels or shafts.

The synchronizer 9 can be moved axially along the input shaft 1 by a shift fork or another mechanism. The synchronizer 9 can have (i) a first engaged position in which the synchronizer 9 keeps the driving gearwheel 11, but not the driving gearwheel 12, engaged with the input shaft 1, (ii) a second engaged position in which the synchronizer 9 keeps the driving gearwheel 12, but not the driving gearwheel 11, engaged with the input shaft 1, and (iii) a neutral position in which neither of the driving gearwheel 11 and the driving gearwheel 12 is engaged with the input shaft 1. The synchronizer 9 can be moved axially along the input shaft 1 away from a gearwheel adjacent to the synchronizer 9 so that the gearwheel disengages from the input shaft 1 and the synchronizer 9 moves into its neutral position.

The synchronizer 8 can be moved axially along the input shaft 1 by a shift fork or another mechanism. The synchronizer 8 can have (i) a first engaged position in which the synchronizer 8 keeps the driving gearwheel 13, but not the reverse-gear driving gearwheel 14, engaged with the input shaft 1, (ii) a second engaged position in which the synchronizer 8 keeps the reverse-gear driving gearwheel 14, but not the driving gearwheel 13, engaged with the input shaft 1, and (iii) a neutral position in which neither of the driving gearwheel 13 and the reverse-gear driving gearwheel 14 is engaged with the input shaft 1. The synchronizer 8 can be moved axially along the input shaft 1 away from a gearwheel adjacent to the synchronizer 8 so that the gearwheel disengages from the input shaft 1 and the synchronizer 8 moves into its neutral position.

The transmission 70 can include a speed-reducing gearwheel 22, a driven gearwheel 15, a synchronizer 10, a driven gearwheel 16, a driven gearwheel 17, and a reverse-gear driven gearwheel 18 disposed on the intermediate shaft 4 in a sequence from left to right (e.g., from the first shaft-end-portion to the second shaft-end portion) as shown in FIG. 1, but is not so limited. For example, those five gearwheels can be in a different sequence between the first shaft-end-portion and the second shaft-end portion of the intermediate shaft 4 so long as each of those gearwheels is positioned to mesh with the corresponding gear(s) described herein as meshing with that gearwheel.

The driven gearwheel 15 and the driven gearwheel 16 are configured for engagement to the intermediate shaft 4 by the synchronizer 10. The synchronizer 10 can be moved axially along the intermediate shaft 4 by a shift fork or another mechanism. The synchronizer 10 can have (i) a first engaged position in which the synchronizer 10 keeps the driven gearwheel 15, but not the driven gearwheel 16, engaged with the intermediate shaft 4, (ii) a second engaged position in which the synchronizer 10 keeps the driven gearwheel 16, but not the driven gearwheel 15, engaged with the intermediate shaft 4, and (iii) a neutral position in which neither of the driven gearwheel 15 and the driven gearwheel 16 is engaged with the intermediate shaft 4. The driven gearwheel 16 and the driven gearwheel 16 is rotatably carried by the intermediate shaft 4 or is rotatably carried by the sleeves 15a and 16a, respectively.

The transmission 70 can include an idler gearwheel 20 and an idler gearwheel 21 disposed on the intermediate shaft 5 in a sequence from left to right (e.g., from the first shaft-end-portion to the second shaft-end portion) as shown in FIG. 1, but is not so limited. For example, those two gearwheels can be in a different sequence between the first shaft-end-portion and the second shaft-end portion of the intermediate shaft 5 so long as each of those gearwheels is positioned on the intermediate shaft 5 so as to mesh with the corresponding gear(s) described herein as meshing with that gearwheel. The idler gearwheel 20 meshes with the driven gearwheel 15 on the intermediate shaft 4. The idler gearwheel 21 meshes with the driven gearwheel 16 on the intermediate shaft 4.

The transmission 70 can include a reverse-gear idler gearwheel 19 disposed on the reverse-gear idler shaft 3. The reverse-gear idler gearwheel 19 meshes with the reverse-gear driving gearwheel 14 on the input shaft 1 and with the reverse-gear driven gearwheel 18 on the intermediate shaft 4.

The transmission 70 can include a differential 60. The differential 60 can include a speed-reducing gearwheel 23 and differential half-axles 6a and 6b. The differential 60 can include a pair of carriers 61, 62 fixed to the speed-reducing gearwheel 23, a shaft 63 rotatably carried by the pair of carriers 61, 62, a pair of first gearwheels 64, 65 mounted to the shaft 63, a pair of second gearwheels 66, 67 each meshing with the first gearwheels 64, 65, and the differential half-axles 6a and 6b extending from the second gearwheels 66, 67 respectively. The differential half-axles 6 can be connected to vehicle wheels. The pair of carriers 61 and 62 can be configured as a single carrier fixed to the speed-reducing gearwheel 23, but is not so limited. Each of the first gearwheels 64 and 65 can be referred to as a spider gearwheel. Each of the second gearwheels 66 and 67 can be referred to as a side gearwheel. The differential 60 can include a differential case (not shown). The speed-reducing gearwheel 23, as well as one or more other components of the differential 60, can be carried by or within the differential case. The differential case can rotatably carry the speed-reducing gearwheel 23.

The transmission 70 can include a driving gearwheel 25 disposed on the motor shaft 2. The driving gearwheel 25 meshes with an idler gearwheel 24 disposed on the idler shaft 7. The EM 50 can turn the motor shaft 2 clockwise or counter-clockwise. In the example embodiments in which HPDS 100 includes the compressor 55, a compressor clutch 57 can releasably couple the compressor 55 and the motor shaft 2 together.

The idler gearwheel 24 is disposed on the idler shaft 7. The idler gearwheel 24 meshes with the driving gearwheel 25 on the motor shaft 2 and the driving gearwheel 11 on the input shaft 1.

The aforementioned gearwheels and synchronizers can be referred to by alternative names. Table 1 shows alternative gearwheel and synchronizer names for the gearwheels and synchronizers of the transmission 70. Other examples of alternative names are also possible.

TABLE 1

| Gearwheel/Synchronizer | Drawing Reference Number | Alternative names for Gearwheel/Synchronizer |
|---|---|---|
| Synchronizer | 8 | Third-and-reverse-gear synchronizer |
| Synchronizer | 9 | Second-and-fourth-gear synchronizer |
| Synchronizer | 10 | Passive gearwheels synchronizer |
| Driving gearwheel | 11 | Second-gear active gearwheel |
| Driving gearwheel | 12 | Fourth-gear active gearwheel |
| Driving gearwheel | 13 | Third-gear active gearwheel |
| Reverse-gear driving gearwheel | 14 | Reverse-gear active gearwheel |
| Driven gearwheel | 15 | Second-gear passive gearwheel |
| Driven gearwheel | 16 | Fourth-gear passive gearwheel |
| Driven gearwheel | 17 | Third-gear passive gearwheel |
| Reverse-gear driven gearwheel | 18 | Reverse-gear passive gearwheel |
| Reverse-gear idler gearwheel | 19 | Fourth idler gearwheel |
| Idler gearwheel | 20 | First idler gearwheel |
| Idler gearwheel | 21 | Second idler gearwheel |
| Speed-reducing gearwheel | 22 | Speed-reducing gearwheel |
| Speed-reducing gearwheel | 23 | Passive speed-reducing gearwheel |
| Idler gearwheel | 24 | Third idler gearwheel |
| Driving gearwheel | 25 | Drive gearwheel |

The gearwheels of the example embodiments can have various characteristics. For example, each of the gearwheels described herein can comprise a helix gearwheel, but is not so limited. Table 2 includes data indicating additional example characteristics of the various gearwheels of the transmission 70. A person having ordinary skill in the art will understand that other examples of the identified characteristics are also possible.

TABLE 2

| Gearwheel | Slidable on shaft | Rotatably carried by shaft (Shaft No.) | Fixedly carried by shaft (Shaft No.) | Meshing gearwheels |
|---|---|---|---|---|
| Driving gearwheel (11) | No | Yes (1) | No | 15, 24 |
| Driving gearwheel (12) | No | Yes (1) | No | 16 |
| Driving gearwheel (13) | No | Yes (1) | No | 17 |
| Reverse-gear Driving (14) | No | Yes (1) | No | 19 |
| Driven gearwheel (15) | No | Yes (4) | No | 11, 20 |
| Driven gearwheel (16) | No | Yes (4) | No | 12, 21 |
| Driven gearwheel (17) | No | No | Yes (4) | 13 |
| Reverse-gear driven gearwheel (18) | No | No | Yes (4) | 19 |

TABLE 2-continued

| Gearwheel | Slidable on shaft | Rotatably carried by shaft (Shaft No.) | Fixedly carried by shaft (Shaft No.) | Meshing gearwheels |
|---|---|---|---|---|
| Reverse-gear Idler (19) | No | No | Yes (3) | 14, 18 |
| Idler gearwheel (20) | No | No | Yes (5) | 15 |
| Idler gearwheel (21) | No | No | Yes (5) | 16 |
| Speed-reducing gearwheel (22) | No | No | Yes (4) | 23 |
| Speed-reducing gearwheel (23) | No | No | No | 22 |
| Idler gearwheel (24) | No | No | Yes (7) | 11, 25 |
| Driving gearwheel (25) | No | No | Yes (2) | 24 |

In accordance with the example embodiments, gear shifting and gear selection can be achieved manually or automatically. Those shifting and selection actions performed automatically can occur electrically, hydraulically, or a combination of electrically and hydraulically. With respect to electrical gear shifting or selection, an electric motor other than the EM 50 can be used to perform the gear shifting or selection by moving a shift fork to slide a synchronizer axially along a shaft.

III. Power Transmitting Paths for Example HPDS 100

The HPDS 100 can have one or more driving modes. Those driving modes can include at least one of (i) a PEDM in which the ICE 30 is the acting power source for the HPDS 100, (ii) a PMDM in which the EM 50 is the acting power source for the HPDS 100, and (iii) a HDM in which both the ICE 30 and the EM 50 are the acting power sources for the HPDS 100.

The HPDS 100 and the transmission 70 can provide multiple power transmitting paths for each of the one or more driving modes. Examples of those power transmitting paths are described below. For each of the power transmitting paths of the PEDM and the HDM, the clutch 40 can be in the engaged state such that the power of the ICE 30 is transmitted to the input shaft 1 by the clutch 40. For each of the power transmitting paths of the PMDM, the clutch 40 is in the disengaged state such that any power available from the ICE 30 is not transmitted to the input shaft 1 by the clutch 40 or the ICE 30 is not outputting power. Shifting the transmission 70 from any speed ratio to another speed ratio in the PEDM and HDM can include the ICE 30 and the input shaft 1 being disengaged from one another by the clutch 40 so that axial movement of one or more of the synchronizers can be moved axially to allow for engagement and disengagement (i.e., coupling and uncoupling) of one or more gearwheels as described below.

The axial movement of any of the synchronizers described herein to couple with a gearwheel can include that gearwheel coupling with the shaft on which the synchronizer is carried such that the gearwheel and that shaft rotate at the same speed.

The power transmitting paths discussed herein refer to forward speed ratios and reverse speed ratios. The power output by the half-axles 6a and 6b for the forward speed ratios can cause the half-axles 6a and 6b, and wheels attached thereto, to turn in a first driving direction (e.g., a forward driving direction). The power output by the half-axles 6a and 6b for the reverse speed ratios can cause the half-axles 6a and 6b, and wheels attached thereto, to turn in a second driving direction (e.g., a reverse driving direction) opposite the first driving direction.

A. Power Transmitting Paths—Pure Engine Driving Mode (PEDM)

1. First Forward Speed Ratio (PEDM)

Figure 2:
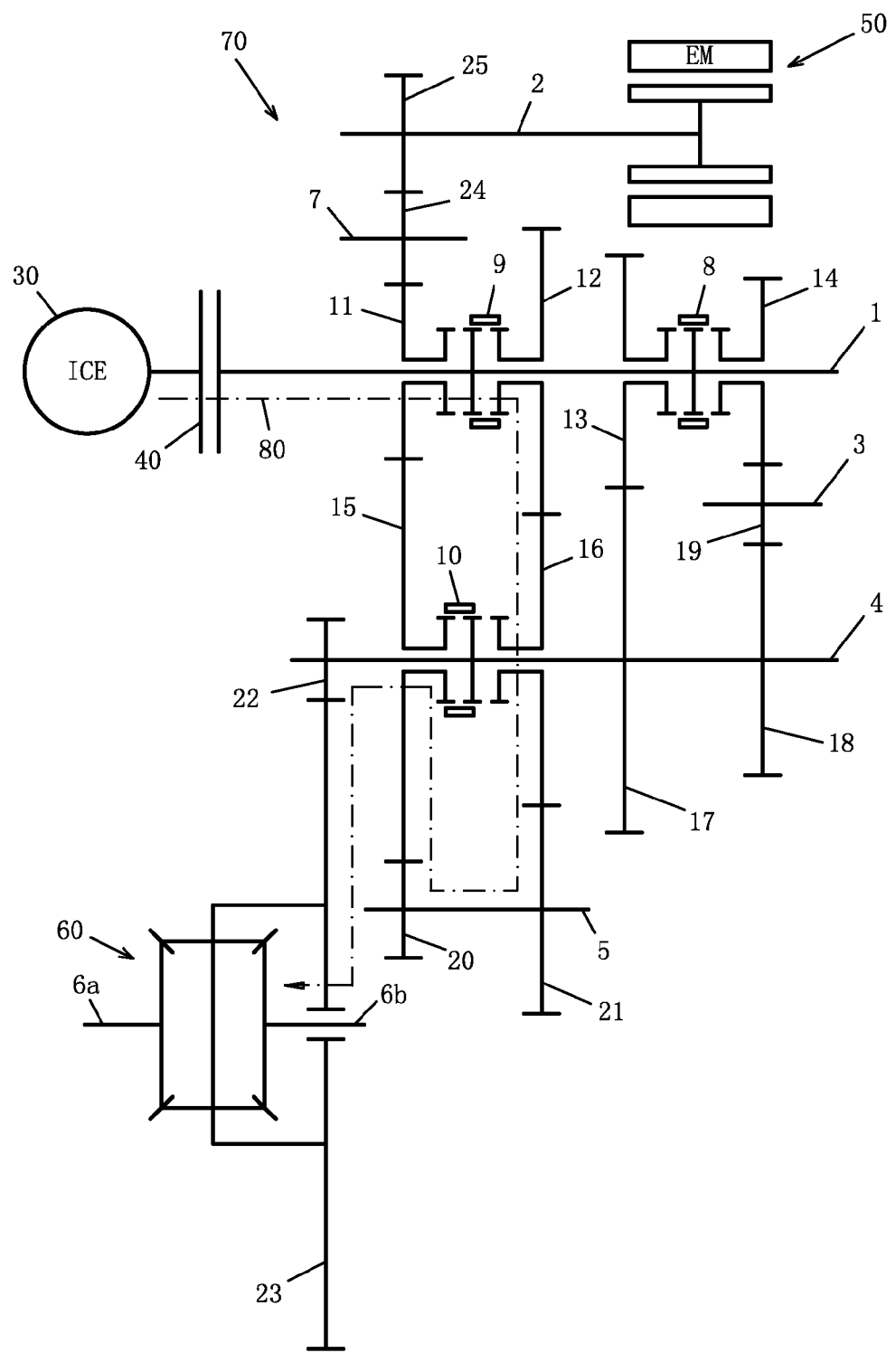
FIGS. 2-7 illustrate example power transmitting paths for the HPDS of FIG. 1 when operating in a pure engine driving mode (PEDM).

The HPDS 100 and the transmission 70 can provide a power transmitting path 80 for a first forward speed ratio while operating in the PEDM. This power transmitting path 80 (shown in FIG. 2) can be achieved when (i) the clutch 40 is in an engaged state such that the ICE 30 is coupled to the input shaft 1, (ii) the synchronizer 9 is engaged with the driving gearwheel 12, (iii) the synchronizer 10 is engaged with the driven gearwheel 15, and (iv) the synchronizer 8 is in its neutral position.

For the first forward speed ratio in the PEDM, the power output by the ICE 30 for power transmitting path 80 is transmitted in sequence through the driving gearwheel 12 on the input shaft 1, the driven gearwheel 16 on the intermediate shaft 4, the idler gearwheel 21 and the idler gearwheel 20 on the intermediate shaft 5, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

2. Second Forward Speed Ratio (PEDM)

Figure 3:
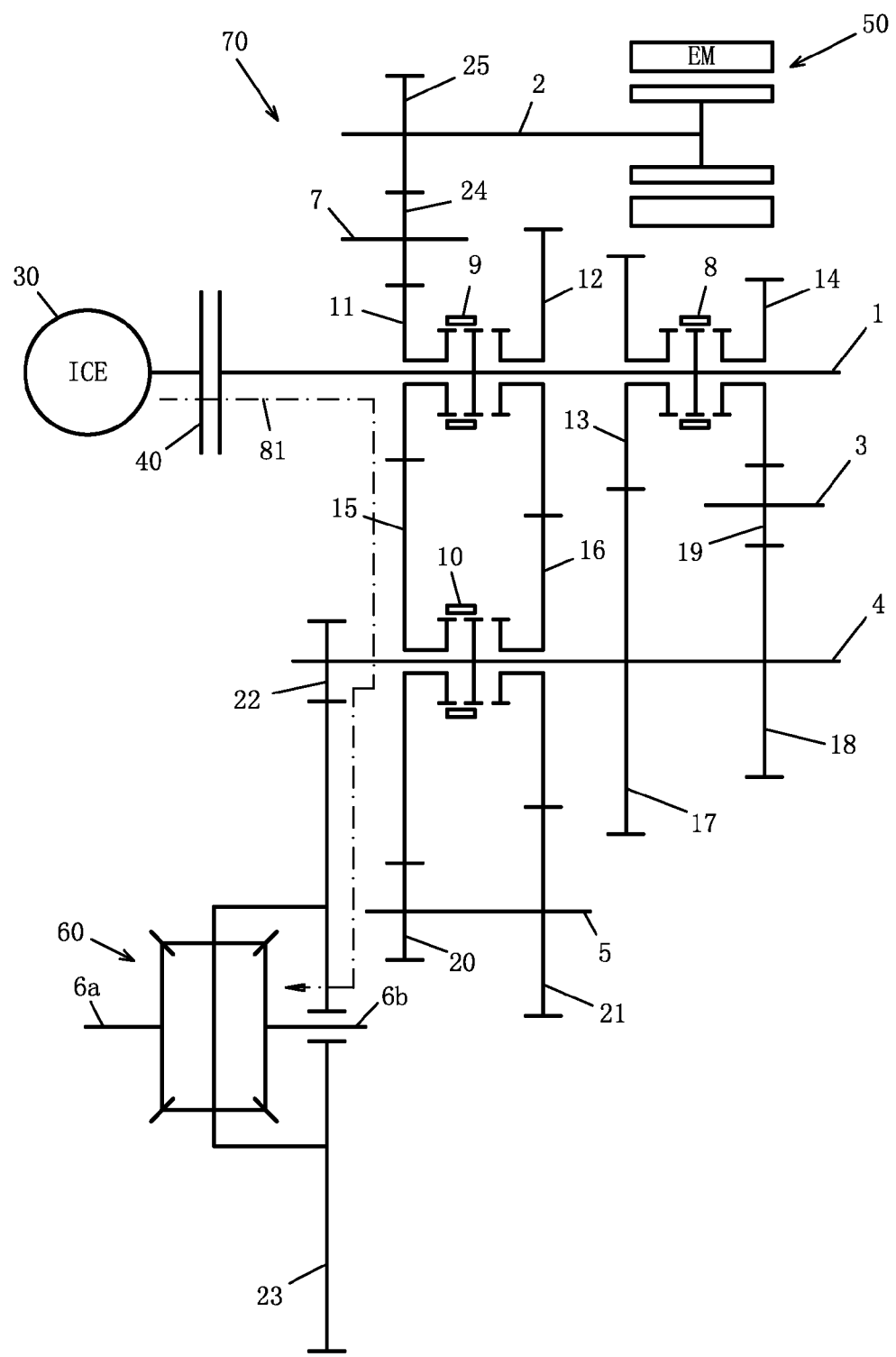

The HPDS 100 and the transmission 70 can provide a power transmitting path 81 for a second forward speed ratio while operating in the PEDM. This power transmitting path 81 (shown in FIG. 3) can be achieved when (i) the clutch 40 is in an engaged state such that the ICE 30 is coupled to the input shaft 1, (ii) the synchronizer 9 is engaged with the driving gearwheel 11, (iii) the synchronizer 10 is engaged with the driven gearwheel 15, and (iv) the synchronizer 8 is in its neutral position.

For the second forward speed ratio in the PEDM, the power output by the ICE 30 for power transmitting path 81 is transmitted in sequence through the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

3. Third Forward Speed Ratio (PEDM)

Figure 4:
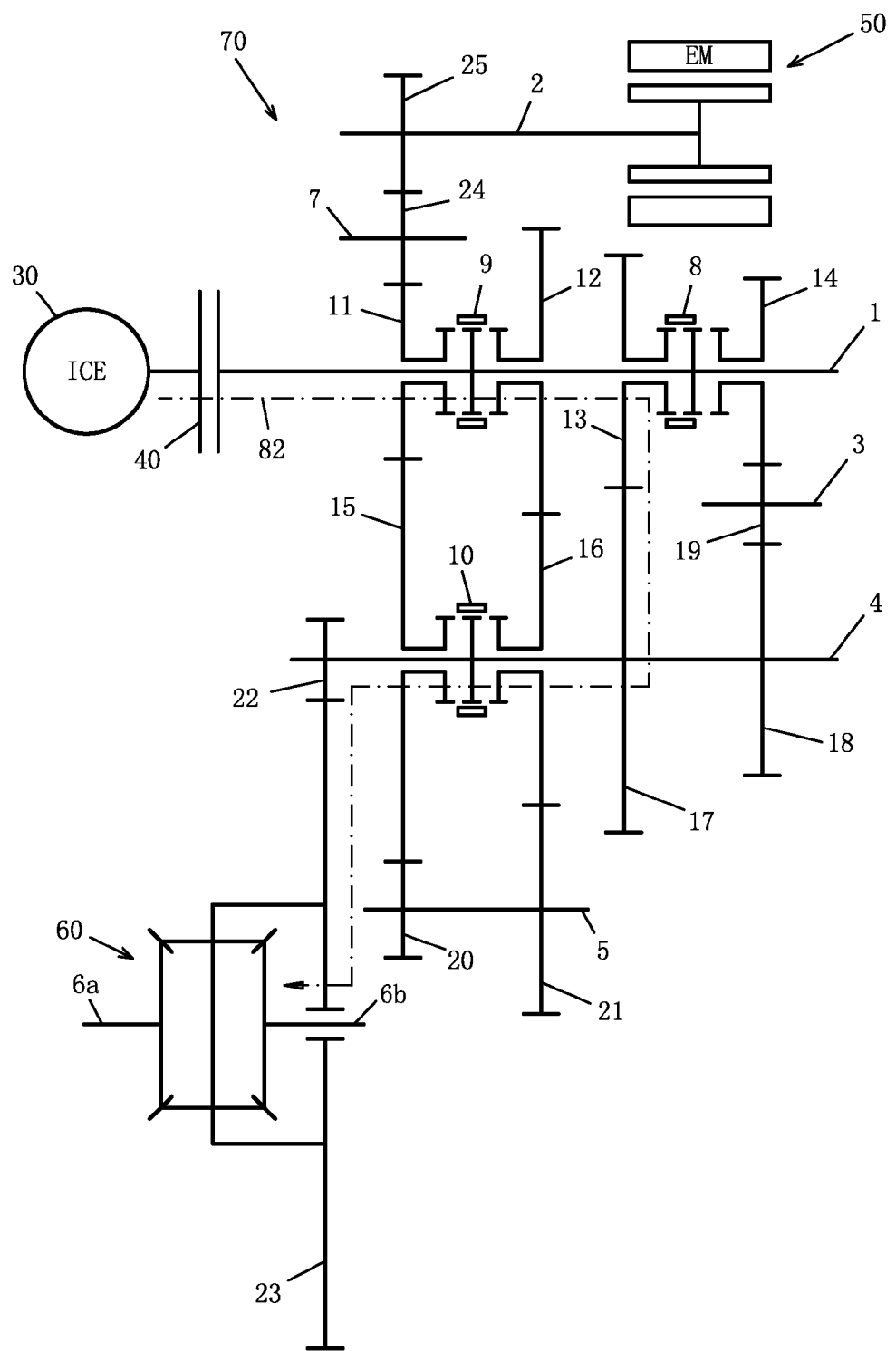

The HPDS 100 and the transmission 70 can provide a power transmitting path 82 for a third forward speed ratio while operating in the PEDM. This power transmitting path 82 (shown in FIG. 4) can be achieved when (i) the clutch 40 is in an engaged state such that the ICE 30 is coupled to the input shaft 1, (ii) the synchronizer 8 is engaged with the driving gearwheel 13, (iii) the synchronizer 9 is in its neutral position, and (iv) the synchronizer 10 is in its neutral position.

For the third forward speed ratio in the PEDM, the power output by the ICE 30 for power transmitting path 82 is transmitted in sequence through the driving gearwheel 13 on the input shaft 1, the driven gearwheel 17 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto

4. Fourth Forward Speed Ratio (PEDM)

Figure 5:
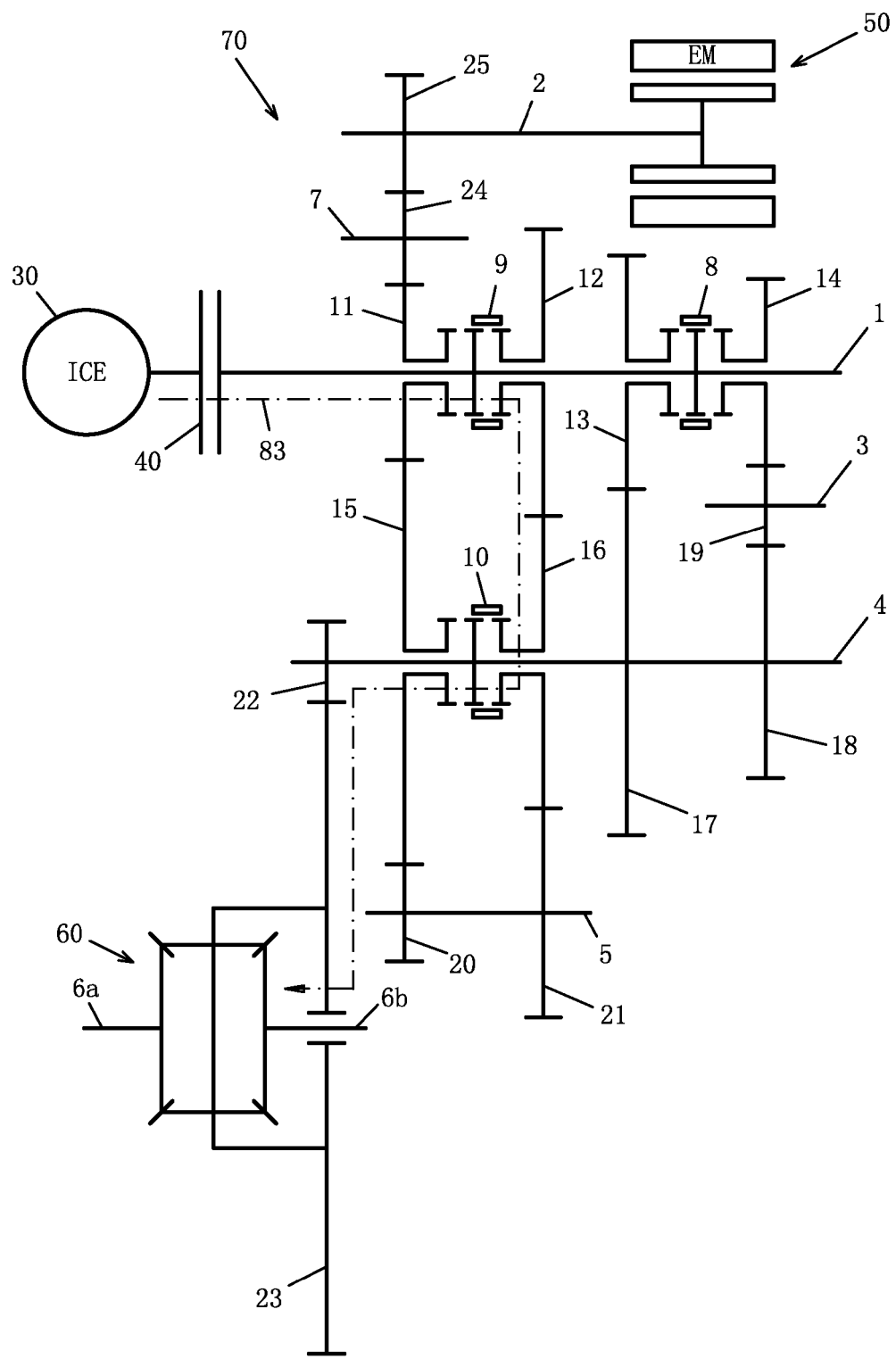

The HPDS 100 and the transmission 70 can provide a power transmitting path 83 for a fourth forward speed ratio while operating in the PEDM. This power transmitting path 83 (shown in FIG. 5) can be achieved when (i) the clutch 40 is in an engaged state such that the ICE 30 is coupled to the input shaft 1, (ii) the synchronizer 9 is engaged with the driving gearwheel 12, (iii) the synchronizer 10 is engaged with the driven gearwheel 16, and (iv) the synchronizer 8 is in its neutral position.

For the fourth forward speed ratio in the PEDM, the power output by the ICE 30 for power transmitting path 83 is transmitted in sequence through the driving gearwheel 12 on the input shaft 1, the driven gearwheel 16, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto

5. Fifth Forward Speed Ratio (PEDM)

Figure 6:
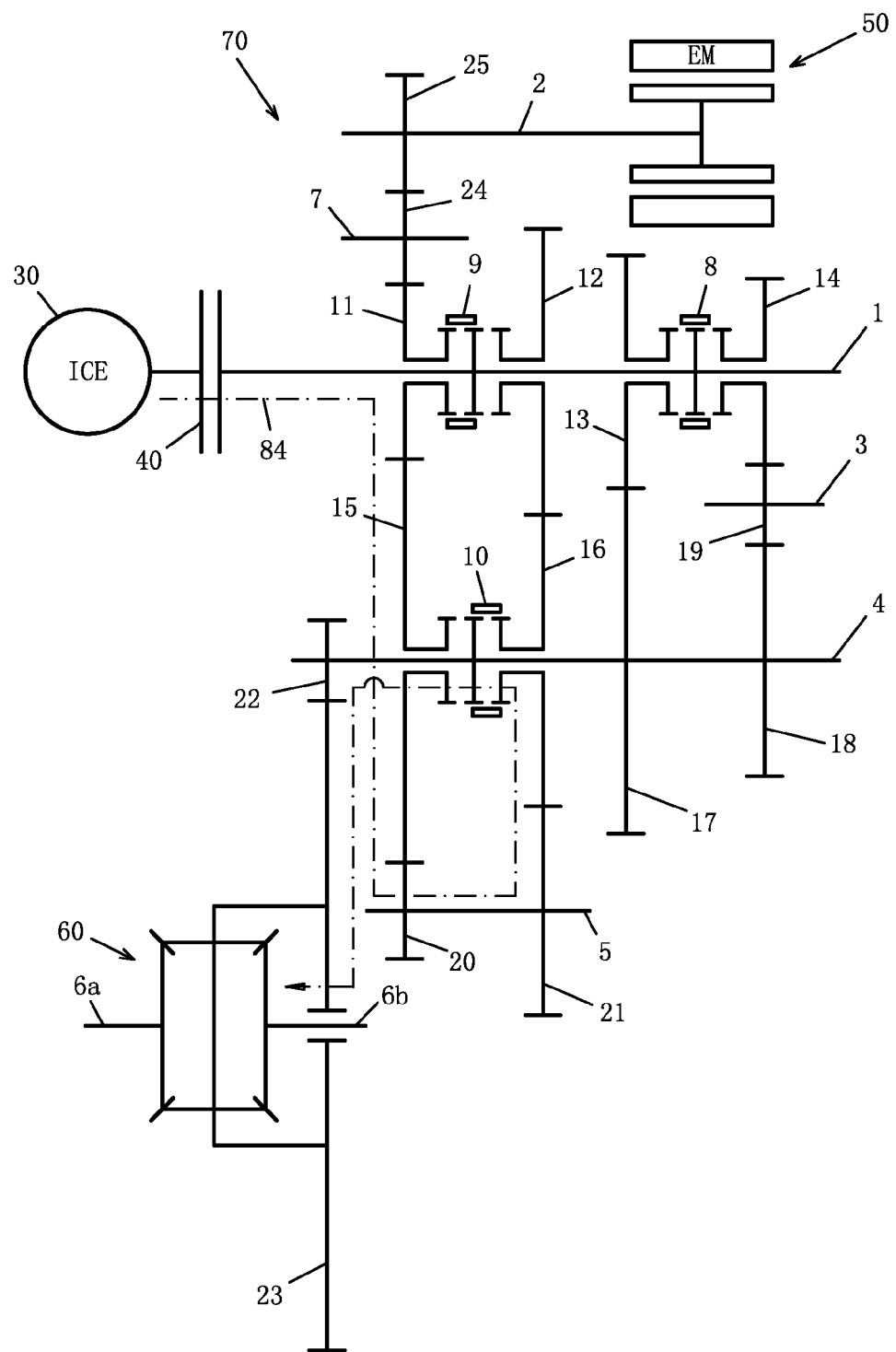

The HPDS 100 and the transmission 70 can provide a power transmitting path 84 for a fifth forward speed ratio while operating in the PEDM. This power transmitting path 84 (shown in FIG. 6) can be achieved when (i) the clutch 40 is in an engaged state such that the ICE 30 is coupled to the input shaft 1, (ii) the synchronizer 9 is engaged with the driving gearwheel 11, (iii) the synchronizer 10 is engaged with the driven gearwheel 16, and (iv) the synchronizer 8 is in its neutral position.

For the fifth forward speed ratio in the PEDM, the power output by the ICE 30 for power transmitting path 84 is transmitted in sequence through the driving gearwheel 11 on the input shaft 1, the driven gearwheel 15 on the first intermediate shaft, the idler gearwheel 20 and idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto

6. Reverse Speed Ratio (PEDM)

Figure 7:
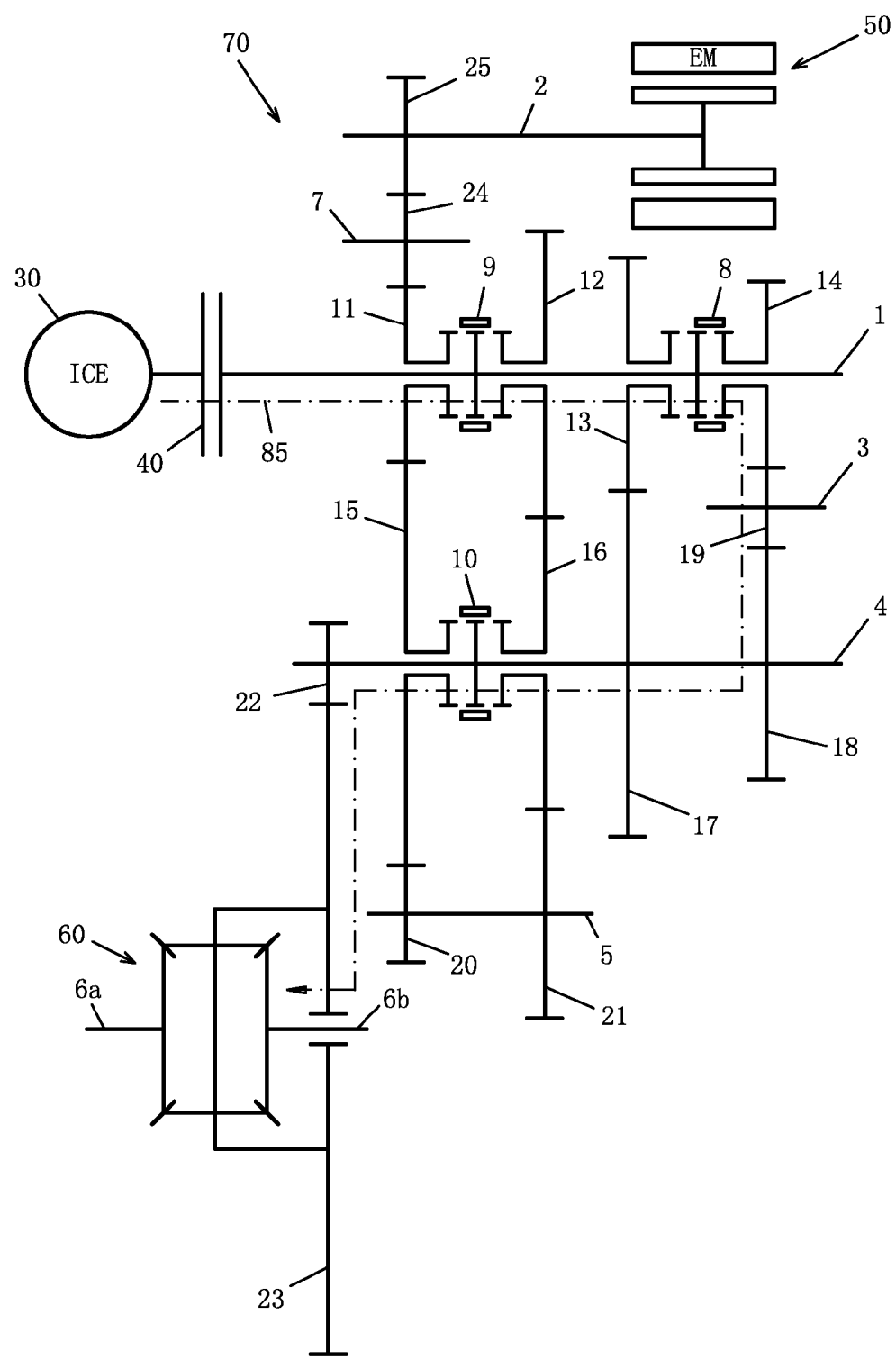

The HPDS 100 and the transmission 70 can provide a power transmitting path 85 for a reverse speed ratio while operating in the PEDM. This power transmitting path 85 (shown in FIG. 7) can be achieved when (i) the clutch 40 is in an engaged state such that the ICE 30 is coupled to the input shaft 1, (ii) the synchronizer 8 is engaged with the reverse-gear driving gearwheel 14, (iii) the synchronizer 9 is in its neutral position, and (iv) the synchronizer 10 is in its neutral position.

For the reverse speed ratio in the PEDM, the power output by the ICE 30 for power transmitting path 85 is transmitted in sequence through the reverse-gear driving gearwheel 14 on the input shaft 1, the reverse-gear idler gearwheel 19 on the reverse-gear idler shaft 3, the reverse-gear driven gearwheel 18 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

B. Power Transmitting Paths—Pure Motor Driving Mode (PMDM)

1. First Forward Speed Ratio (PMDM)

Figure 8:
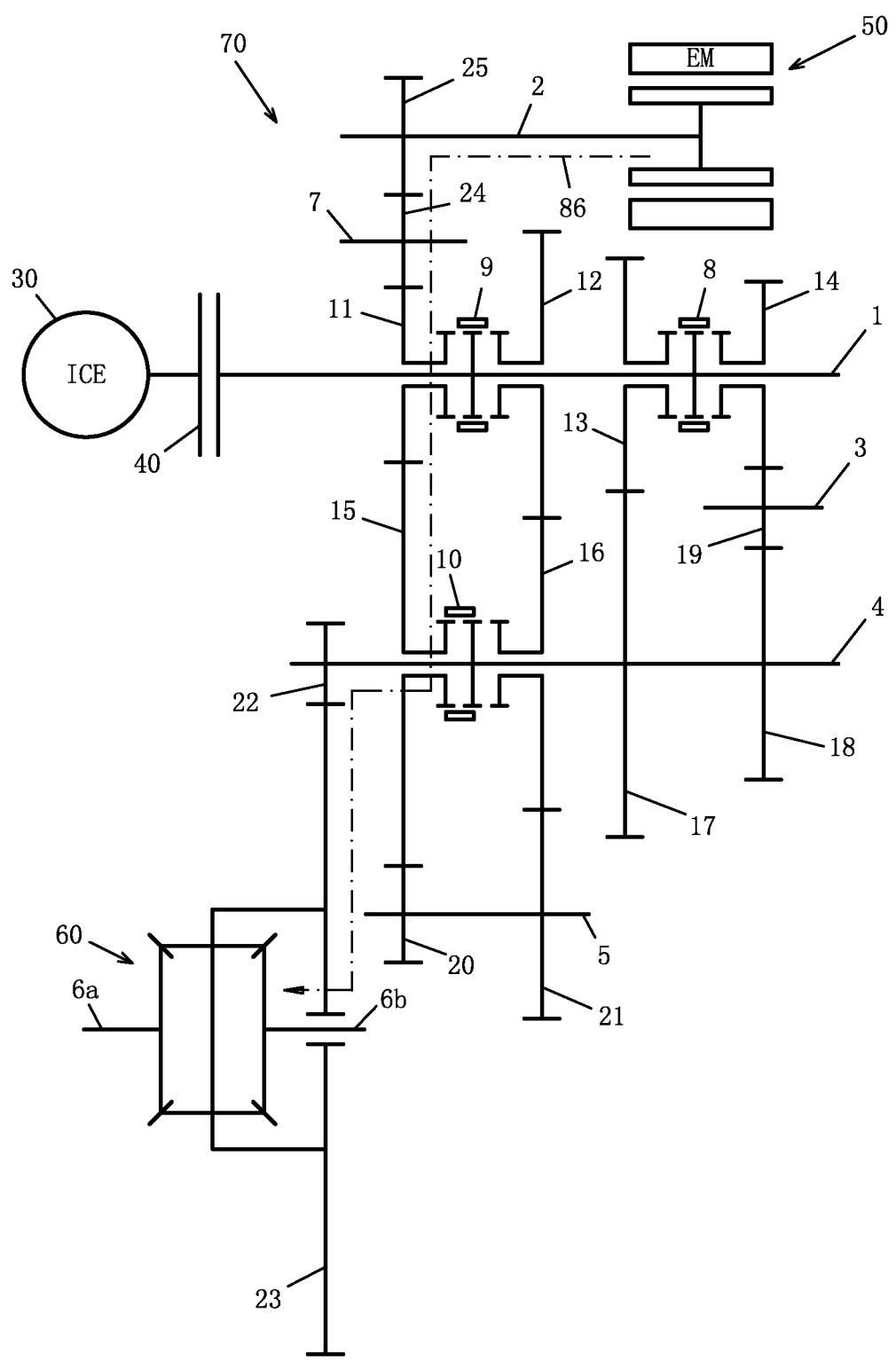
FIGS. 8-9 illustrate example power transmitting paths for the HPDS of FIG. 1 when operating in a pure motor driving mode (PMDM).

The HPDS 100 and the transmission 70 can provide a power transmitting path 86 for a first forward speed ratio while operating in the PMDM. This power transmitting path 86 (shown in FIG. 8) can be achieved when (i) the synchronizer 10 is engaged with the driven gearwheel 15, (ii) the synchronizer 8 is in its neutral position, and (iii) the synchronizer 9 is in its neutral position.

For the first forward speed ratio in the PMDM, the power output by the EM 50 for power transmitting path 86 is transmitted in sequence through the driving gearwheel 25 on the motor shaft 2, the idler gearwheel 24 on the idler shaft 7, the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

2. Second Forward Speed Ratio (PMDM)

Figure 9:
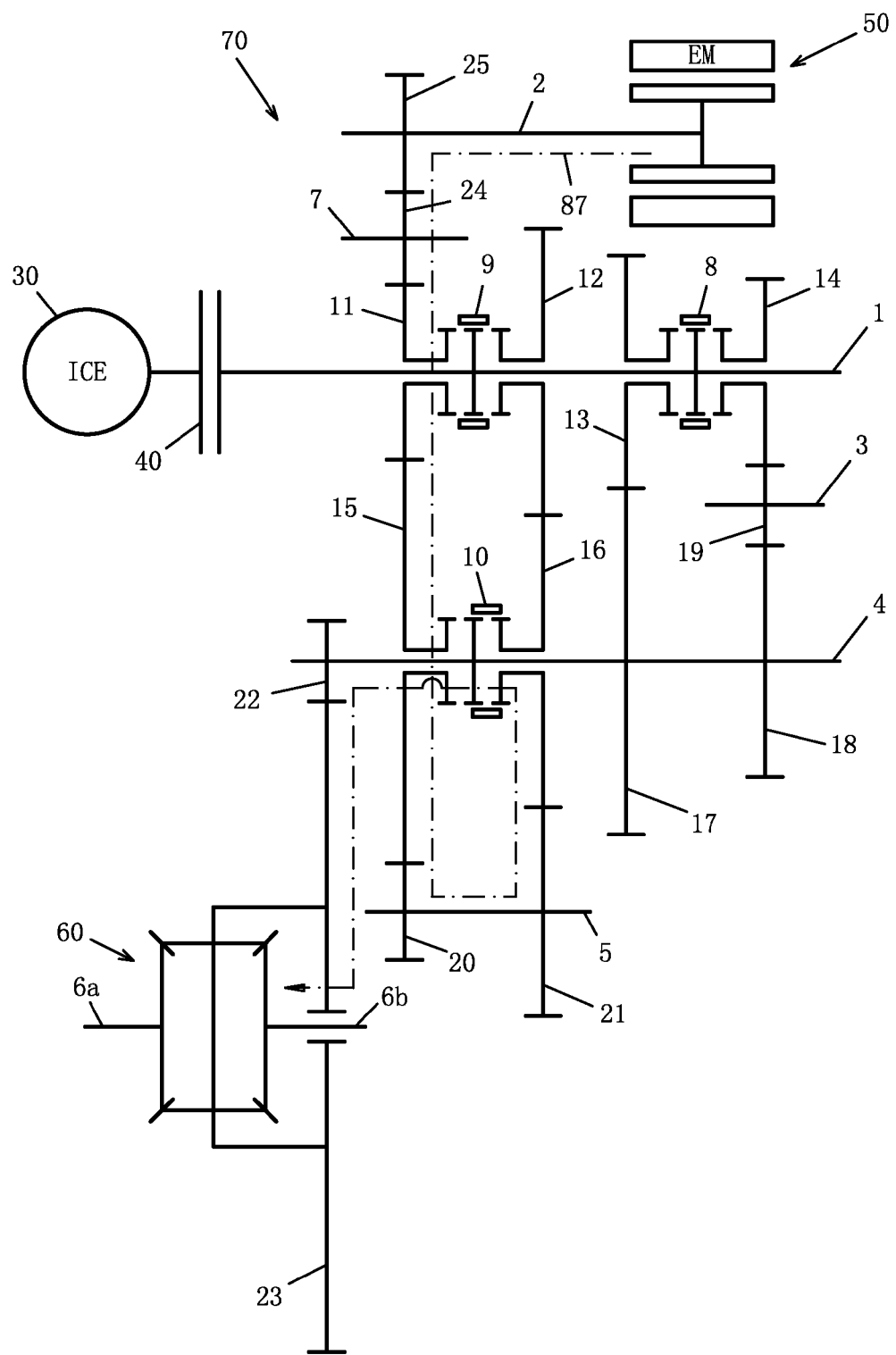

The HPDS 100 and the transmission 70 can provide a power transmitting path 87 for a second forward speed ratio while operating in the PMDM. This power transmitting path 87 (shown in FIG. 9) can be achieved when (i) the synchronizer 10 is engaged with the driven gearwheel 16, (ii) the synchronizer 8 is in its neutral position, and (iii) the synchronizer 9 is in its neutral position.

For the second forward speed ratio in the PMDM, the power output by the EM 50 for power transmitting path 87 is transmitted in sequence through the driving gearwheel 25 on the motor shaft 2, the idler gearwheel 24 on the idler shaft 7, the driving gearwheel 11 on the input shaft 1, the driven gearwheel 15 on the intermediate shaft 4, the idler gearwheel 20 and the idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

3. Reverse Speed Ratios (PMDM)

The HPDS 100 and the transmission 70 can provide power transmitting paths for a reverse speed ratio in the PMDM. A power transmitting path 86 for a first reverse speed ratio in the PMDM is identical to the power transmitting path for the first forward speed ratio in the PMDM, but the EM 50 rotates in an opposite direction (e.g., a reverse direction) with respect to the direction the EM 50 rotates for the first forward speed ratio in the PMDM. This power transmitting path 86 (shown in FIG. 8) can be achieved when (i) the synchronizer 10 is engaged with the driven gearwheel 15, (ii) the synchronizer 8 is in its neutral position, and (iii) the synchronizer 9 is in its neutral position.

For the power transmitting path for the first reverse speed ratio in the PMDM, the power output by the EM 50 for power transmitting path 86 is transmitted in sequence through the driving gearwheel 25 on the motor shaft 2, the idler gearwheel 24 on the idler shaft 7, the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

A power transmitting path 87 for a second reverse speed ratio in the PMDM is identical to the power transmitting path for the second forward speed ratio in the PMDM, but the EM 50 rotates in the opposite direction with respect to the direction the EM 50 rotates for the second forward speed ratio in the PMDM. This power transmitting path 87 (shown in FIG. 9) can be achieved when (i) the synchronizer 10 is engaged with the driven gearwheel 16, (ii) the synchronizer 8 is in its neutral position, and (iii) the synchronizer 9 is in its neutral position.

For the power transmitting path for the second reverse speed ratio in the PMDM, the power output by the EM 50 for power transmitting path 87 is transmitted in sequence through the driving gearwheel 25 on the motor shaft 2, the idler gearwheel 24 on the idler shaft 7, the driving gearwheel 11 on the input shaft 1, the driven gearwheel 15 on the intermediate shaft 4, the idler gearwheel 20 and the idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

C. Power Transmitting Paths—Hybrid Driving Mode (HDM)

1. First Forward Speed Ratio (HDM)

Figure 10:
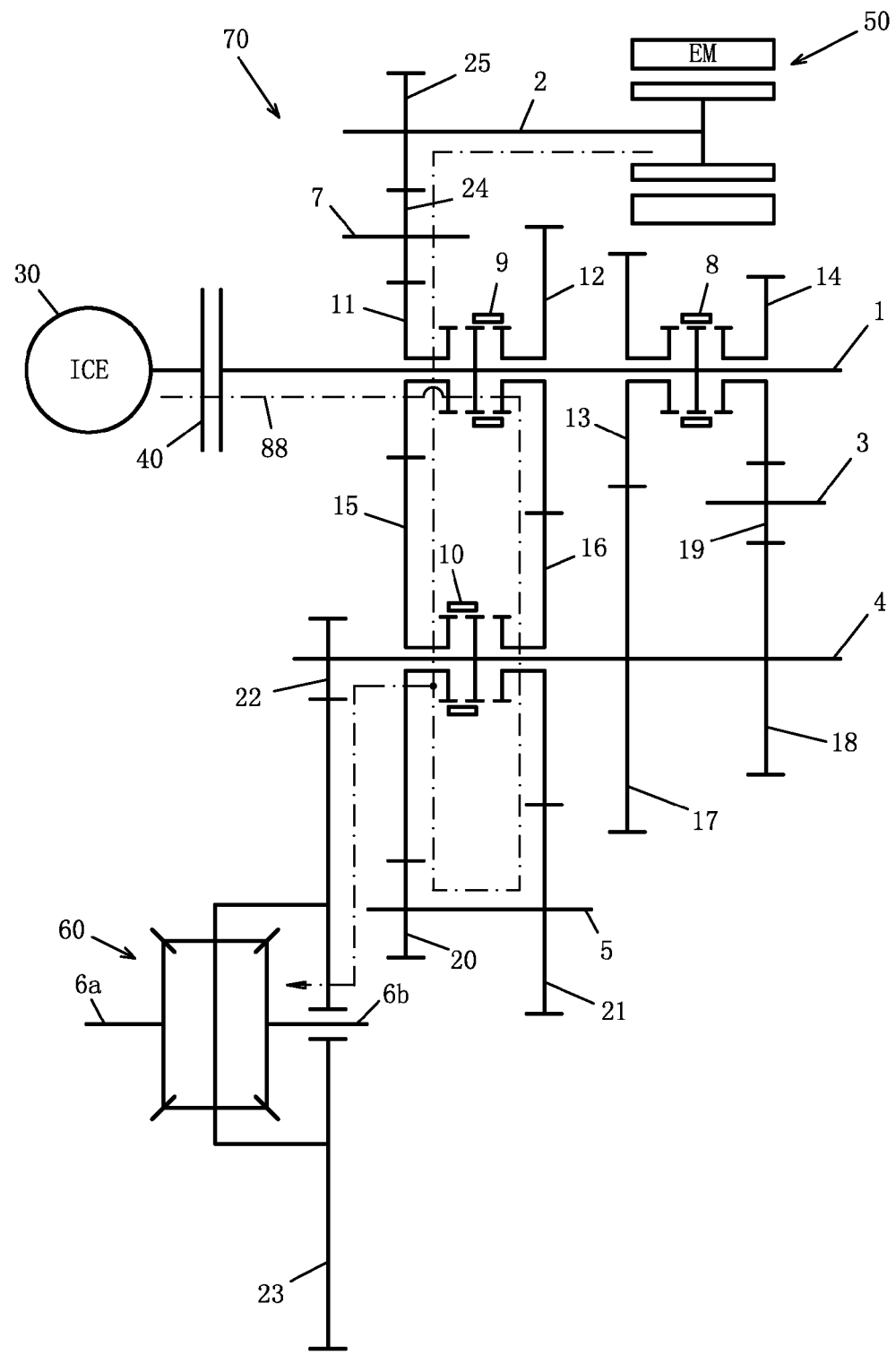
FIGS. 10-17 illustrate example power transmitting paths for the HPDS of FIG. 1 when operating in a hybrid driving mode (HDM).

The HPDS 100 and the transmission 70 can provide a power transmitting path 88 from the ICE 30 and the EM 50 for a first forward speed ratio while operating in the HDM. This power transmitting path 88 (shown in FIG. 10) can be achieved when (i) the clutch 40 is in an engaged state such that ICE 30 is coupled to the input shaft 1, (ii) the synchronizer 9 is engaged with the driving gearwheel 12, (iii) the synchronizer 10 is engaged with the driven gearwheel 15, and (iv) the synchronizer 8 is in its neutral position. The power transmitting path 88 transmits power output by the ICE 30 and the EM 50.

For the first forward speed ratio in the HDM, the power output by the ICE 30 is transmitted in sequence through the driving gearwheel 12 on the input shaft 1, the driven gearwheel 16 on the intermediate shaft 4, the idler gearwheel 21 on the intermediate shaft 5, the idler gearwheel 20 on the intermediate shaft 5, the driven gearwheel 15 on the intermediate shaft 4, the speed-reducing gearwheel 22 on the intermediate shaft 4, and the speed-reducing gearwheel 23, and the gearwheels of the differential 60 to at least one of the half-axles 6a and 6b and to a respective wheel (not shown) connectable thereto. Additionally, the power output by the EM 50 is transmitted in sequence through the driving gearwheel 25 on the motor shaft 2, the idler gearwheel 24 on the idler shaft 7, the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto. Stated another way, for the first forward speed ratio in the HDM, the power transmitting path for power from the ICE 30 follows the power transmitting path 80 and the power from the EM 50 follows the power transmitting path 86.

2. Second Forward Speed Ratio (HDM)

Figure 11:
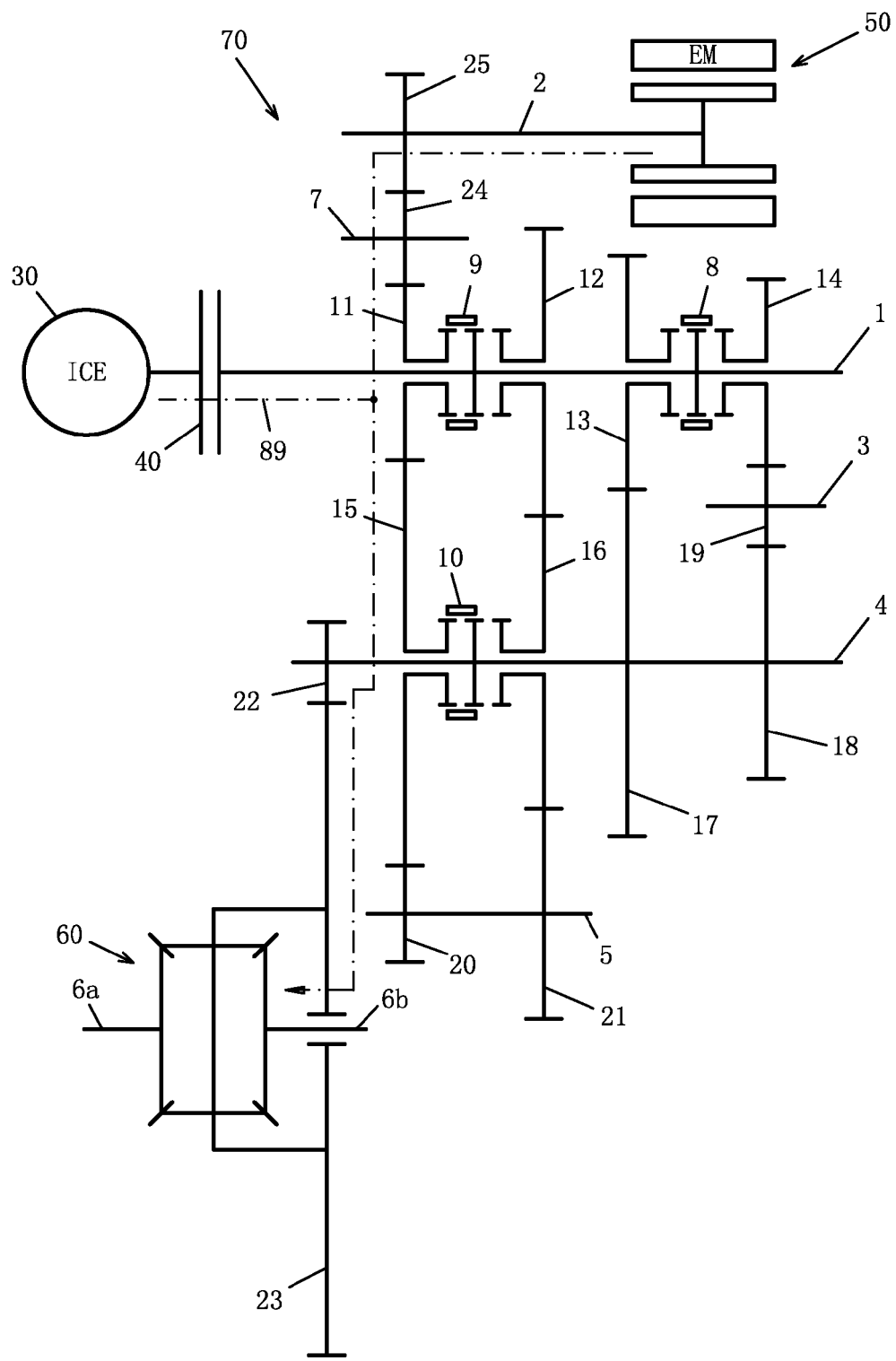

The HPDS 100 and the transmission 70 can provide a power transmitting path 89 from the ICE 30 and the EM 50 for a second forward speed ratio while operating in the HDM. This power transmitting path 89 (shown in FIG. 11) can be achieved when (i) the clutch 40 is in an engaged state such that ICE 30 is coupled to the input shaft 1, (ii) the synchronizer 9 on the input shaft 1 is engaged with the driving gearwheel 11, (iii) the synchronizer 10 is engaged with the driven gearwheel 15, and (iv) the synchronizer 8 is in its neutral position. The power transmitting path 89 transmits power output by the ICE 30 and the EM 50.

For the second forward speed ratio in the HDM, the power output by the ICE 30 is transmitted in sequence through the driving gearwheel 11 on the input shaft 1, the driven gearwheel 15 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted through the driving gearwheel 25 on the motor shaft 2, the idler gearwheel 24 on the idler shaft 7, the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto. Stated another way, for the second forward speed ratio in the HDM, the power transmitting path for power from the ICE 30 follows the power transmitting path 81 and the power from the EM 50 follows the power transmitting path 86.

3. First Instance of a Third Forward Speed Ratio (HDM)

Figure 12:
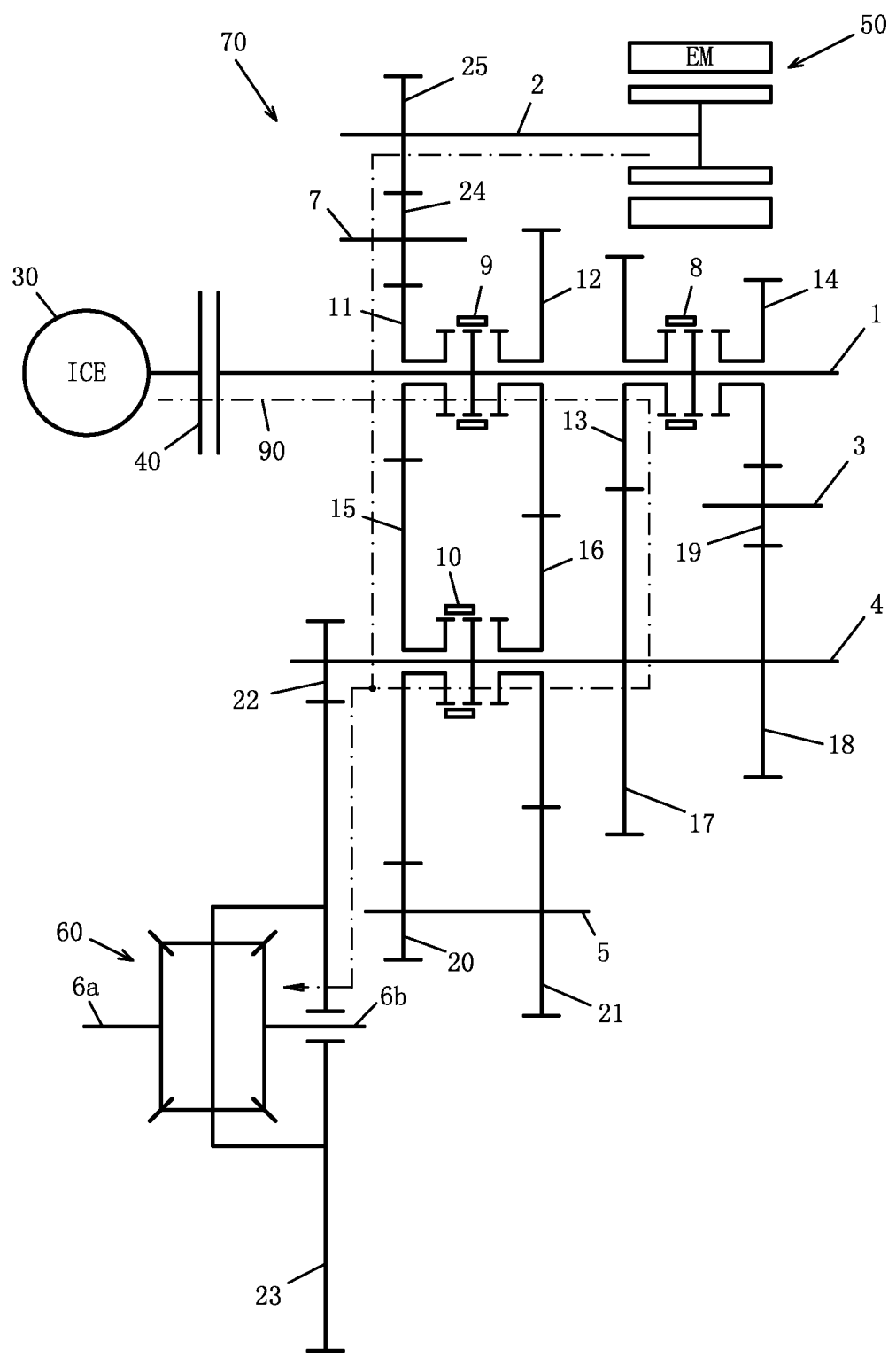

The HPDS 100 and the transmission 70 can provide multiple power transmitting paths from the ICE 30 and the EM 50 for a third forward speed ratio while operating in the HDM. A power transmitting path 90 (shown in FIG. 12) for a first instance of the third forward speed ratio in the HDM can be achieved when (i) the clutch 40 is in an engaged state such that ICE 30 is coupled to the input shaft 1, (ii) the synchronizer 8 is engaged with the driving gearwheel 13, (iii) the synchronizer 10 is engaged with the driven gearwheel 15, and (iv) the synchronizer 9 is in its neutral position. The power transmitting path 90 transmits power output by the ICE 30 and the EM 50.

For the power transmitting path 90 for the first instance of the third forward speed ratio in the HDM, the power output by the ICE 30 is transmitted in sequence through the driving gearwheel 13 on the input shaft 1, the driven gearwheel 17 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted through the driving gearwheel 25 on the motor shaft 2, the idler gearwheel 24 on the idler shaft 7, the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto. Stated another way, for the first instance of the third forward speed ratio in the HDM, the power transmitting path for power from the ICE 30 follows the power transmitting path 82 and the power from the EM 50 follows the power transmitting path 86.

4. Second Instance of a Third Forward Speed Ratio (HDM)

Figure 13:
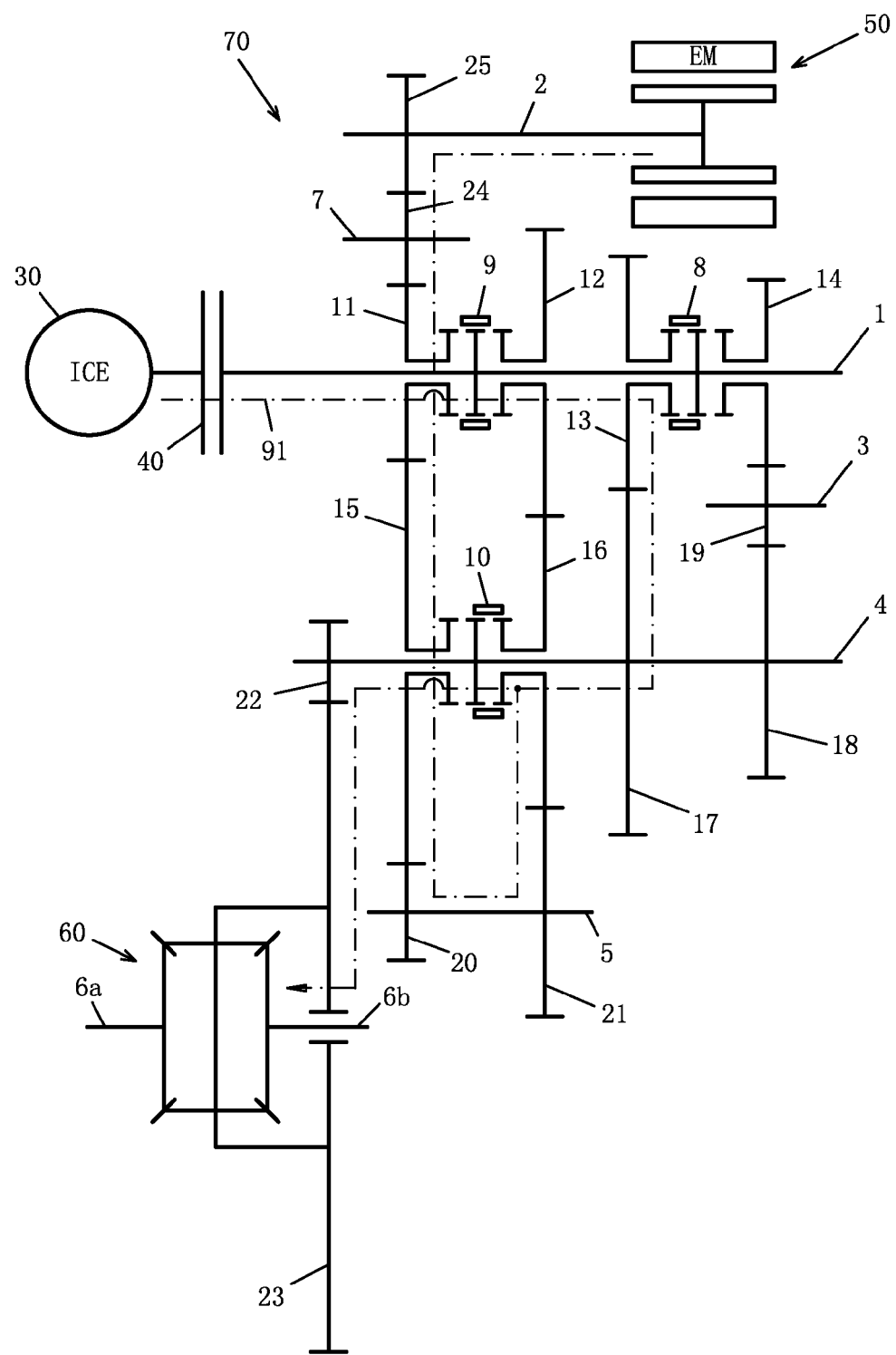

A power transmitting path 91 (shown in FIG. 13) for a second instance of the third forward speed ratio in the HDM can be achieved when (i) the clutch 40 is in an engaged state such that ICE 30 is coupled to the input shaft 1, (ii) the synchronizer 8 is engaged with the driving gearwheel 13, (iii) the synchronizer 10 is engaged with the driven gearwheel 16, and (iv) the synchronizer 9 is in its neutral position. The power transmitting path 91 transmits power output by the ICE 30 and the EM 50.

For the power transmitting path 91 for the second instance of the third forward speed ratio in the HDM, the power output by the ICE 30 is transmitted in sequence through the driving gearwheel 13 on the input shaft 1, the driven gearwheel 17 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted through the driving gearwheel 25 on the motor shaft 2, the idler gearwheel 24 on the idler shaft 7, the driving gearwheel 11 on the input shaft 1, the driven gearwheel 15 on the intermediate shaft 4, the idler gearwheel 20 and the idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

5. Fourth Forward Speed Ratio (HDM)

Figure 14:
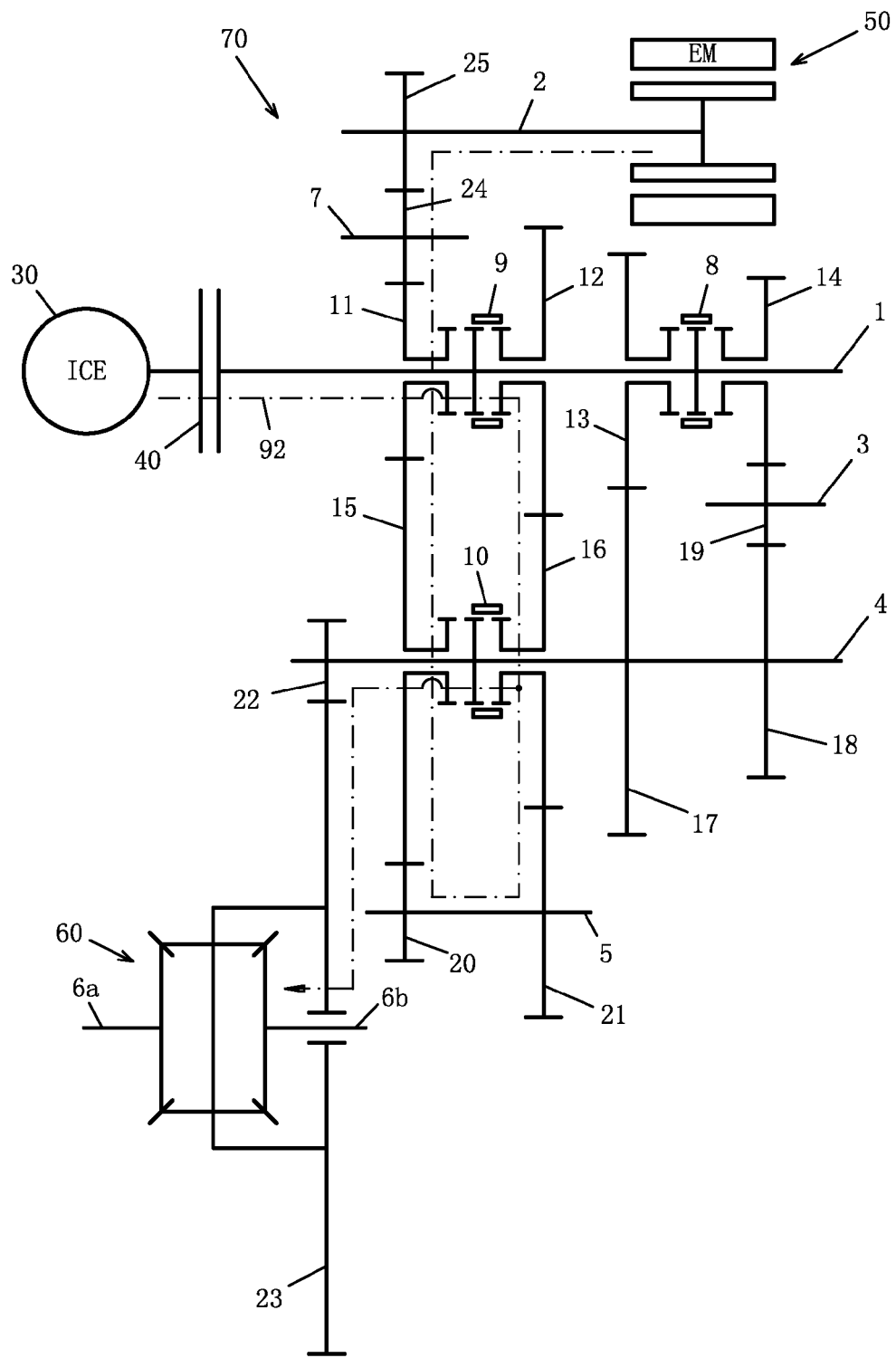

The HPDS 100 and the transmission 70 can provide a power transmitting path 92 from the ICE 30 and the EM 50 for a fourth forward speed ratio while operating in the HDM. This power transmitting path 92 (shown in FIG. 14) can be achieved when (i) the clutch 40 is in an engaged state such that ICE 30 is coupled to the input shaft 1, (ii) the synchronizer 9 is engaged with the driving gearwheel 12, (iii) the synchronizer 10 is engaged with the driven gearwheel 16, and (iv) the synchronizer 8 is in its neutral position. The power transmitting path 92 transmits power output by the ICE 30 and the EM 50.

For the fourth forward speed ratio in the HDM, the power output by the ICE 30 is transmitted in sequence through the driving gearwheel 12 on the input shaft 1, the driven gearwheel 16 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted through the driving gearwheel 25 on the motor shaft 2, the idler gearwheel 24 on the idler shaft 7, the driving gearwheel 11 on the input shaft 1, the driven gearwheel 15 on the intermediate shaft 4, the idler gearwheel 20 and the idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

6. Fifth Forward Speed Ratio (HDM)

Figure 15:
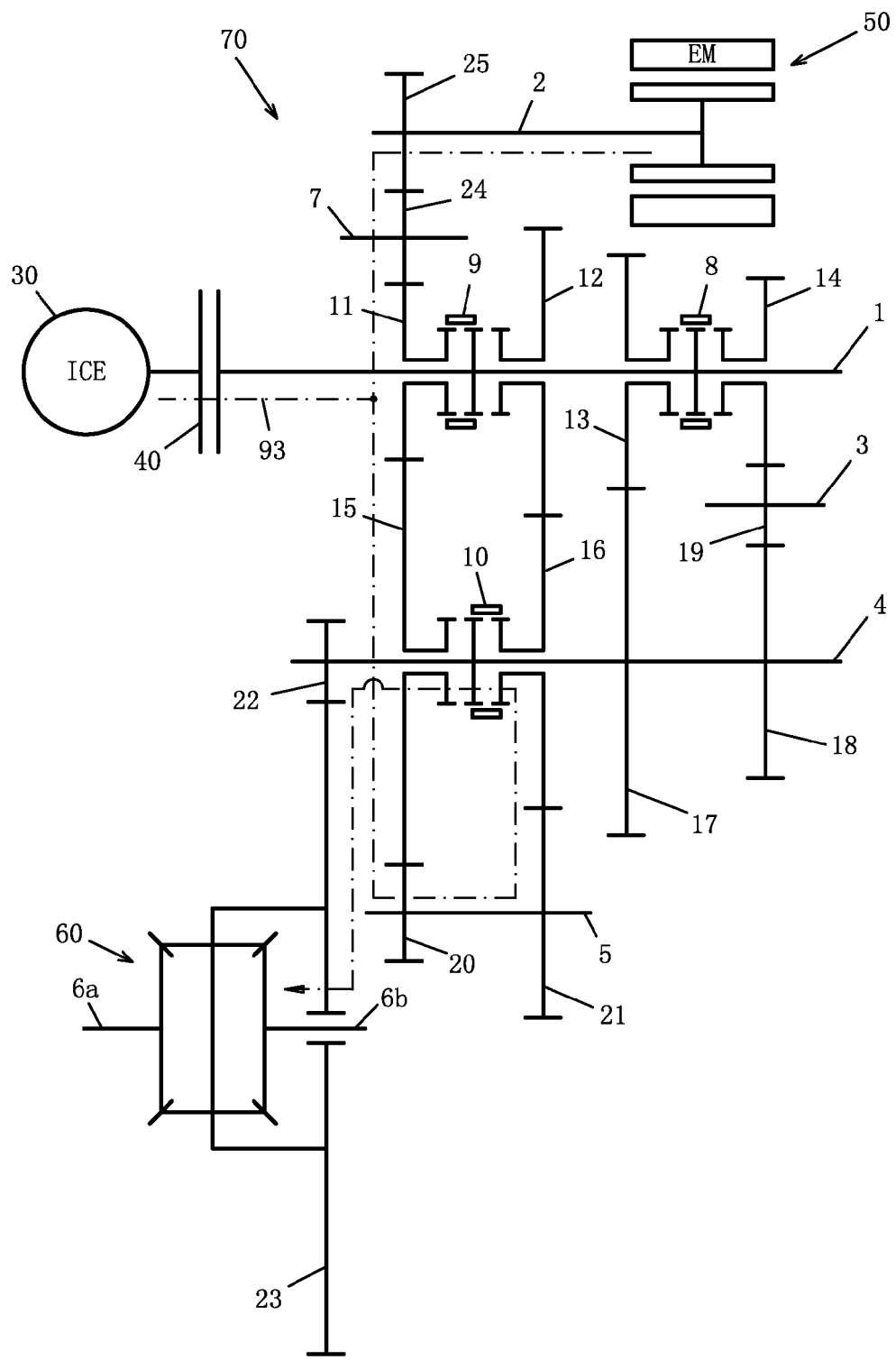

The HPDS 100 and the transmission 70 can provide a power transmitting path 93 from the ICE 30 and the EM 50 for a fifth forward speed ratio while operating in the HDM. This power transmitting path 93 (shown in FIG. 15) can be achieved when (i) the clutch 40 is in an engaged state such that ICE 30 is coupled to the input shaft 1, (ii) the synchronizer 9 is engaged with the driving gearwheel 11, (iii) the synchronizer 10 is engaged with the driven gearwheel 16, and (iv) the synchronizer 8 is in its neutral position. The power transmitting path 93 transmits power output by the ICE 30 and the EM 50.

For the fifth forward speed ratio in the HDM, the power output by the ICE 30 is transmitted in sequence through the driving gearwheel 11 on the input shaft 1, the driven gearwheel 15 on the first intermediate shaft, the idler gearwheel 20 and the idler gearwheel 21 on the intermediate shaft 5, the driven gearwheel 16 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted through the driving gearwheel 25 on the motor shaft 2, the idler gearwheel 24 on the idler shaft 7, the driving gearwheel 11 on the input shaft 1, the driven gearwheel 15 on the intermediate shaft 4, the idler gearwheel 20 and the idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

7. First Reverse Speed Ratio (HDM)

Figure 16:
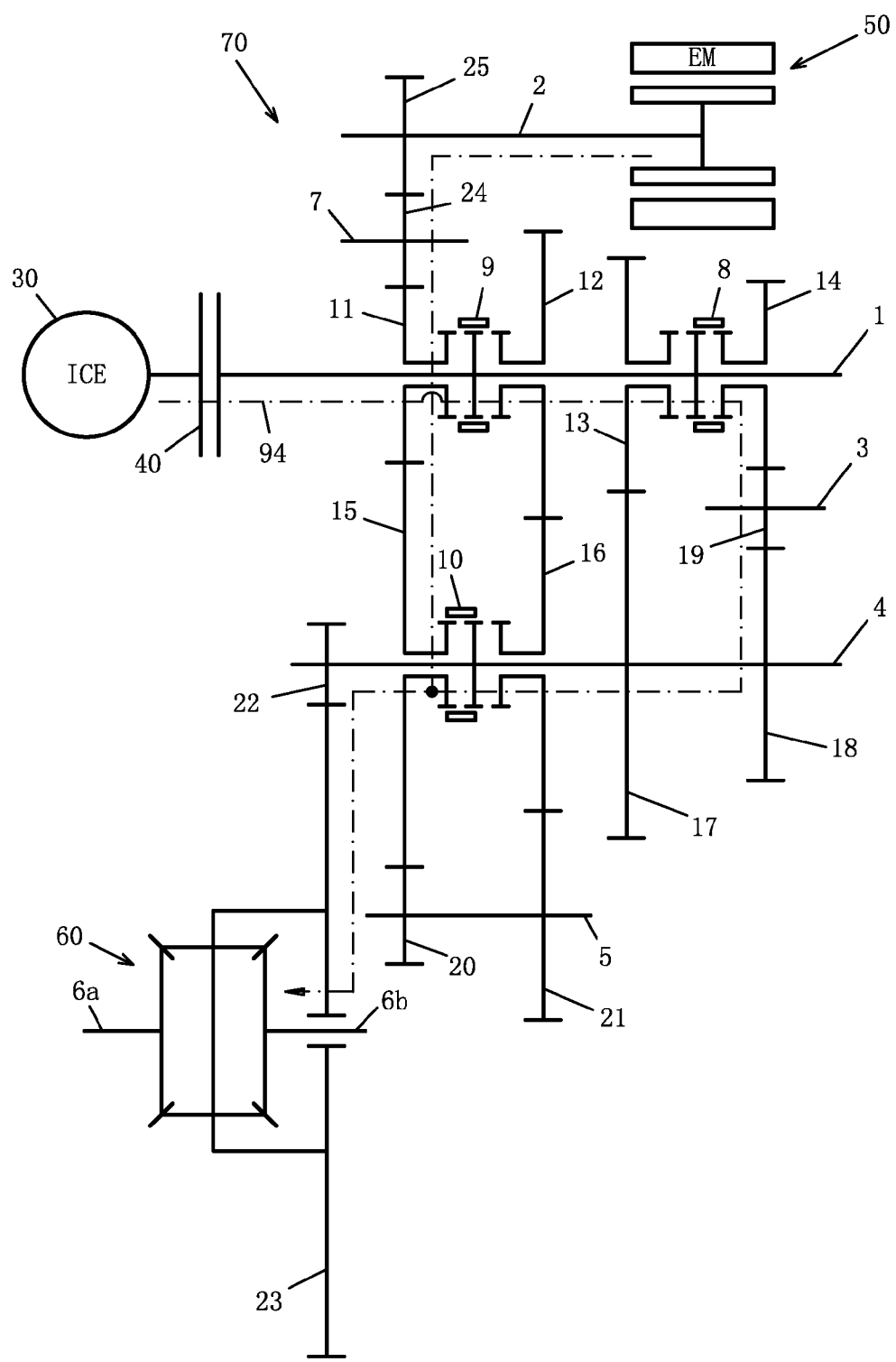

The HPDS 100 and the transmission 70 can provide a power transmitting path 94 from the ICE 30 and the EM 50 for a first reverse speed ratio while operating in the HDM. This power transmitting path 94 (shown in FIG. 16) can be achieved when (i) the clutch 40 is in an engaged state such that ICE 30 is coupled to the input shaft 1, (ii) the synchronizer 8 is engaged with the reverse-gear driving gearwheel 14, (iii) the synchronizer 10 is engaged with the driven gearwheel 15, and (iv) the synchronizer 9 is in its neutral position. The power transmitting path 94 transmits power output by the ICE 30 and the EM 50.

For the power transmitting path 94 of first reverse speed ratio in the HDM, the power output by the ICE 30 is transmitted in sequence through the reverse-gear driving gearwheel 14 on the input shaft 1, the reverse-gear idler gearwheel 19 on the reverse-gear idler shaft 3, the reverse-gear driven gearwheel 18 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted through the driving gearwheel 25 on the motor shaft 2, the idler gearwheel 24 on the idler shaft 7, the driving gearwheel 11 on the input shaft 1, the driven gearwheel 15 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

8. Second Reverse Speed Ratio (HDM)

Figure 17:
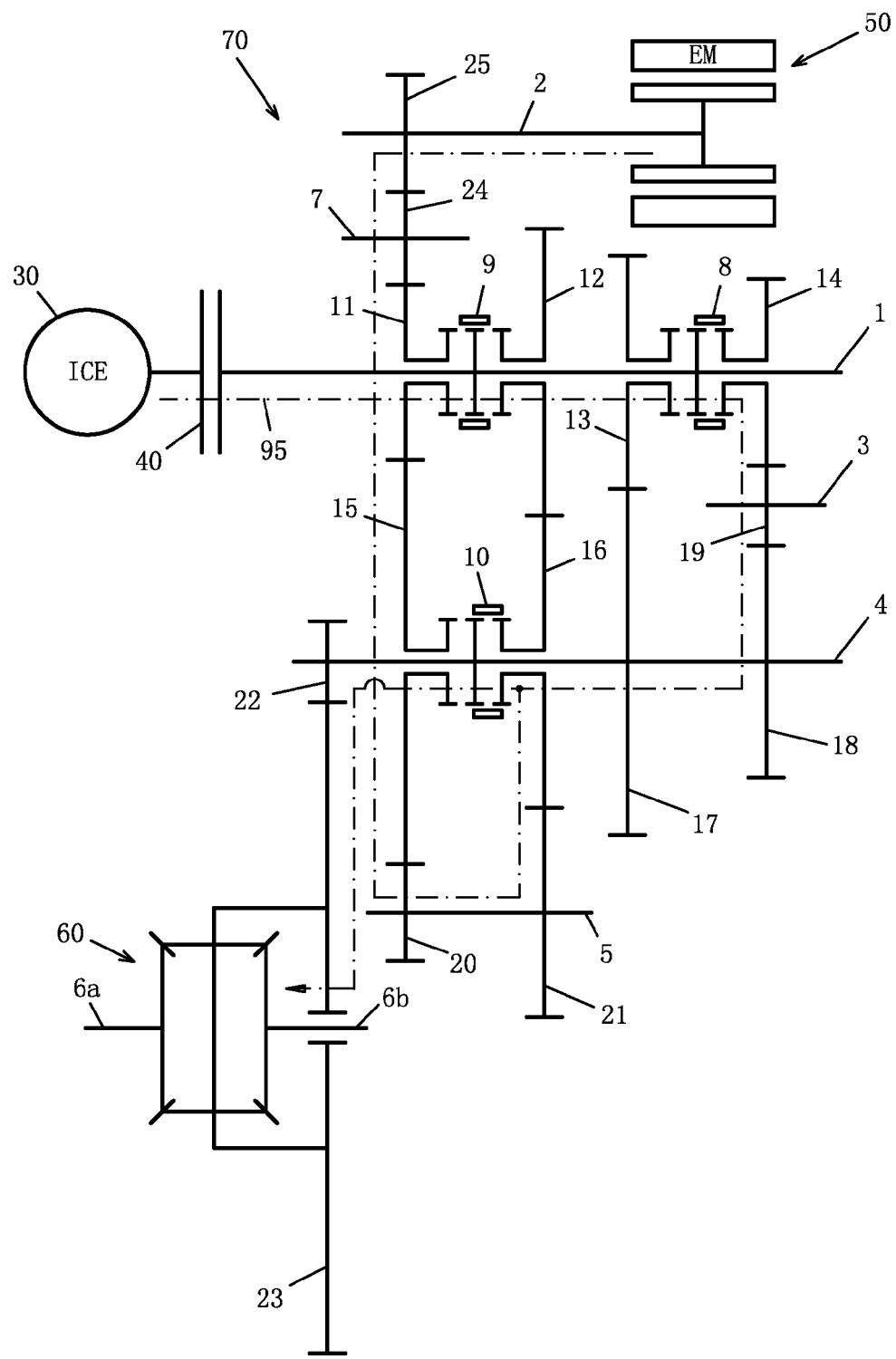

The HPDS 100 and the transmission 70 can provide a power transmitting path 95 from the ICE 30 and the EM 50 for a second reverse speed ratio while operating in the HDM. This power transmitting path 95 (shown in FIG. 17) can be achieved when (i) the clutch 40 is in an engaged state such that ICE 30 is coupled to the input shaft 1, (ii) the synchronizer 8 is engaged with the reverse-gear driving gearwheel 14, (iii) the synchronizer 10 is engaged with the driven gearwheel 16, and (iv) the synchronizer 9 is in its neutral position. The power transmitting path 95 transmits power output by the ICE 30 and the EM 50.

For the power transmitting path 95 of the second reverse speed ratio in the HDM, the power output by the ICE 30 is transmitted in sequence through the reverse-gear driving gearwheel 14 on the input shaft 1, the reverse-gear idler gearwheel 19 on the reverse-gear idler shaft 3, the reverse-gear driven gearwheel 18 on the intermediate shaft 4, the speed-reducing gearwheel 22 on the intermediate shaft 4 and the speed-reducing gearwheel 23, and the gearwheels of the differential 60 to at least one of the half-axles 6a and 6b and to a respective wheel (not shown) connectable thereto. Additionally, the power output by the EM 50 is transmitted in sequence through the driving gearwheel 25 on the motor shaft 2, the idler gearwheel 24 on the idler shaft 7, the driving gearwheel 11 on the input shaft 1, the driven gearwheel 15 on the intermediate shaft 4, the idler gearwheel 20 and the idler gearwheel 21 on the intermediate shaft 5, the driven gearwheel 16 on the intermediate shaft 4, the speed-reducing gearwheel 22 on the intermediate shaft 4, the speed-reducing gearwheel 23, and the gearwheels of the differential 60 to at least one of the half-axles 6a and 6b and to a respective wheel (not shown) connectable thereto.

IV. Second Example Hybrid-Power Driving System and Components Thereof

Figure 18:
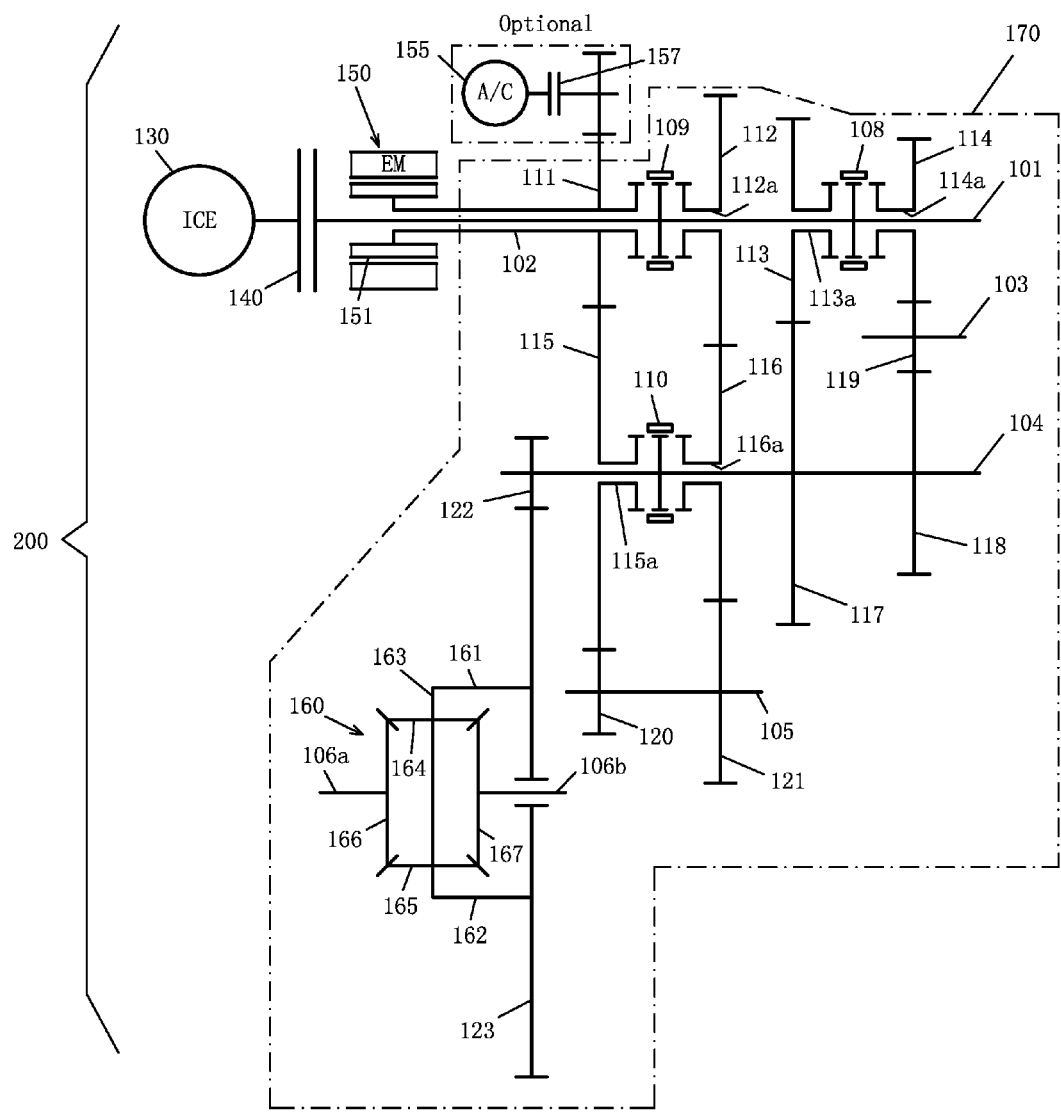
FIG. 18 is a schematic diagram of an HPDS including a transmission, an ICE, and an EM, the ICE and the EM being disposed coaxially with an input shaft of the transmission.
Figure 19:
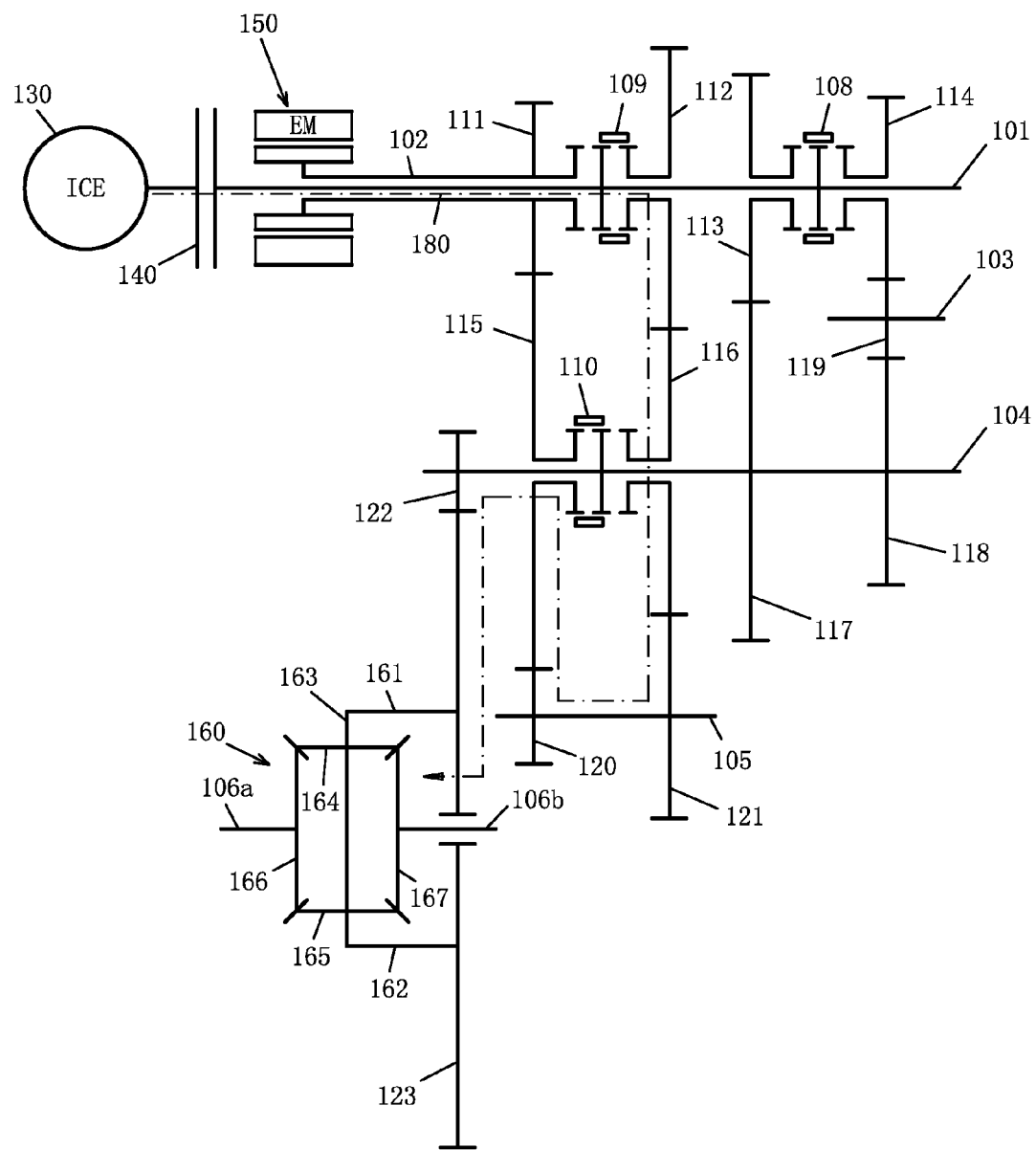
FIGS. 19-34 illustrate example power transmitting paths for the HPDS and the transmission shown in FIG. 18.
Figure 20:
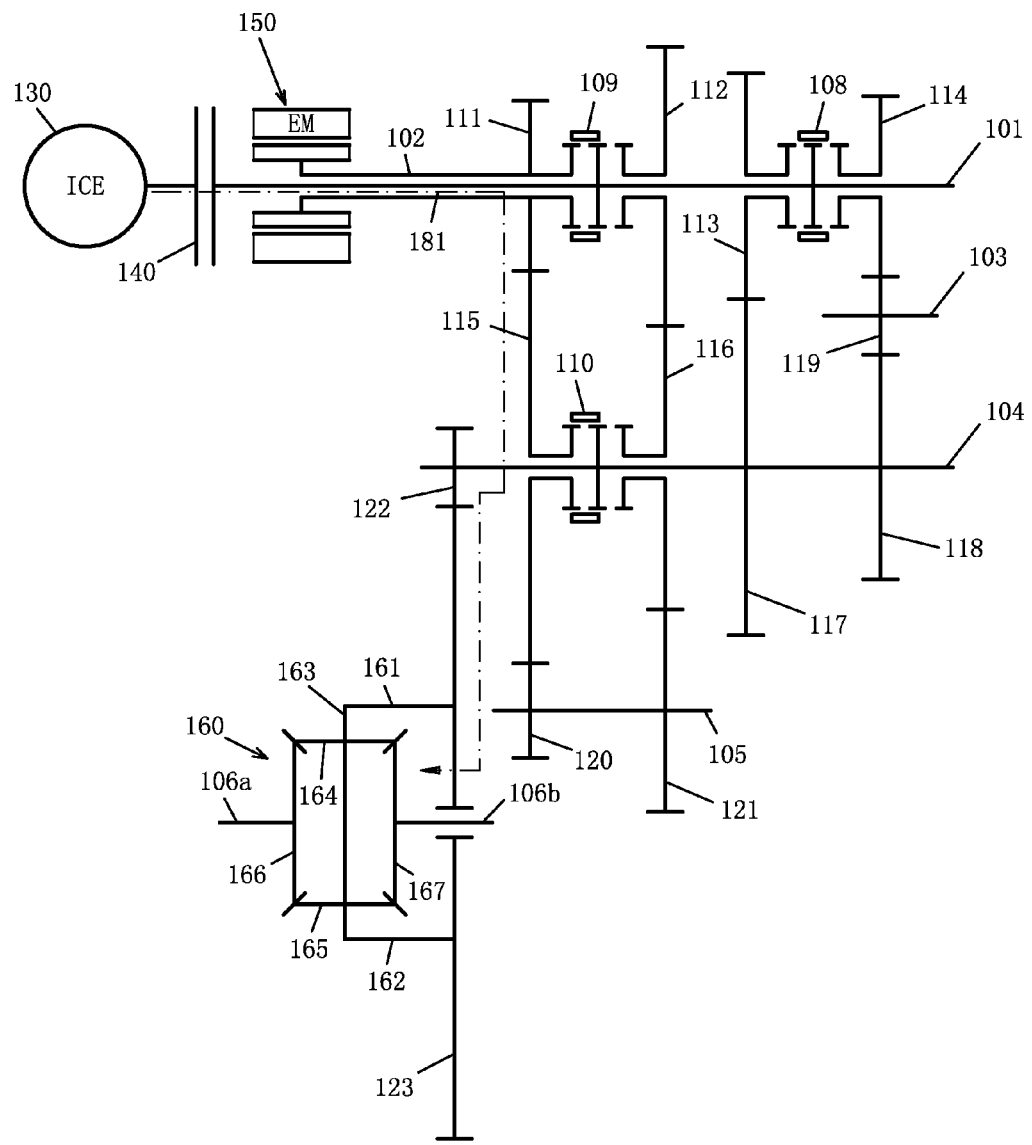
Figure 21:
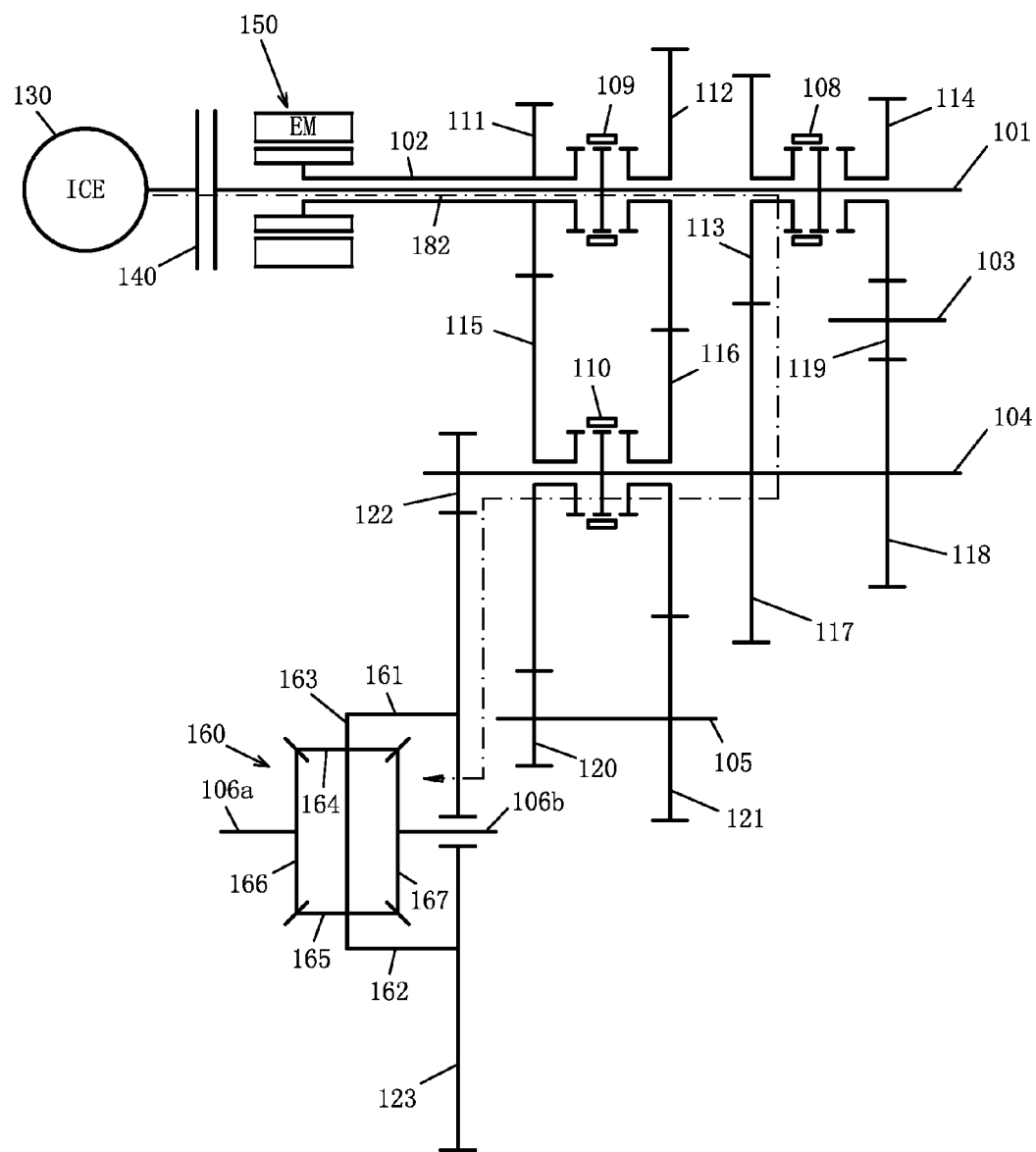
Figure 22:
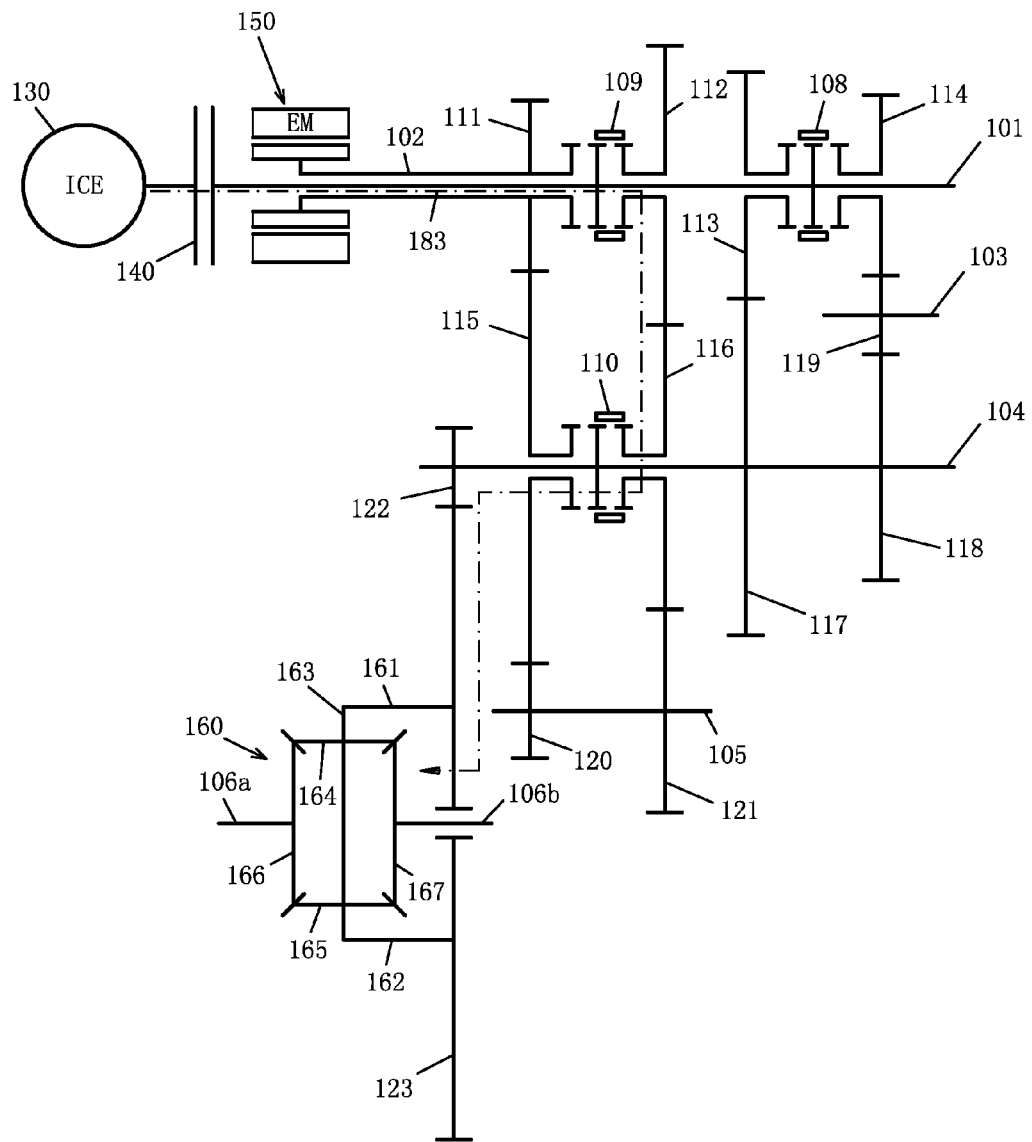
Figure 23:
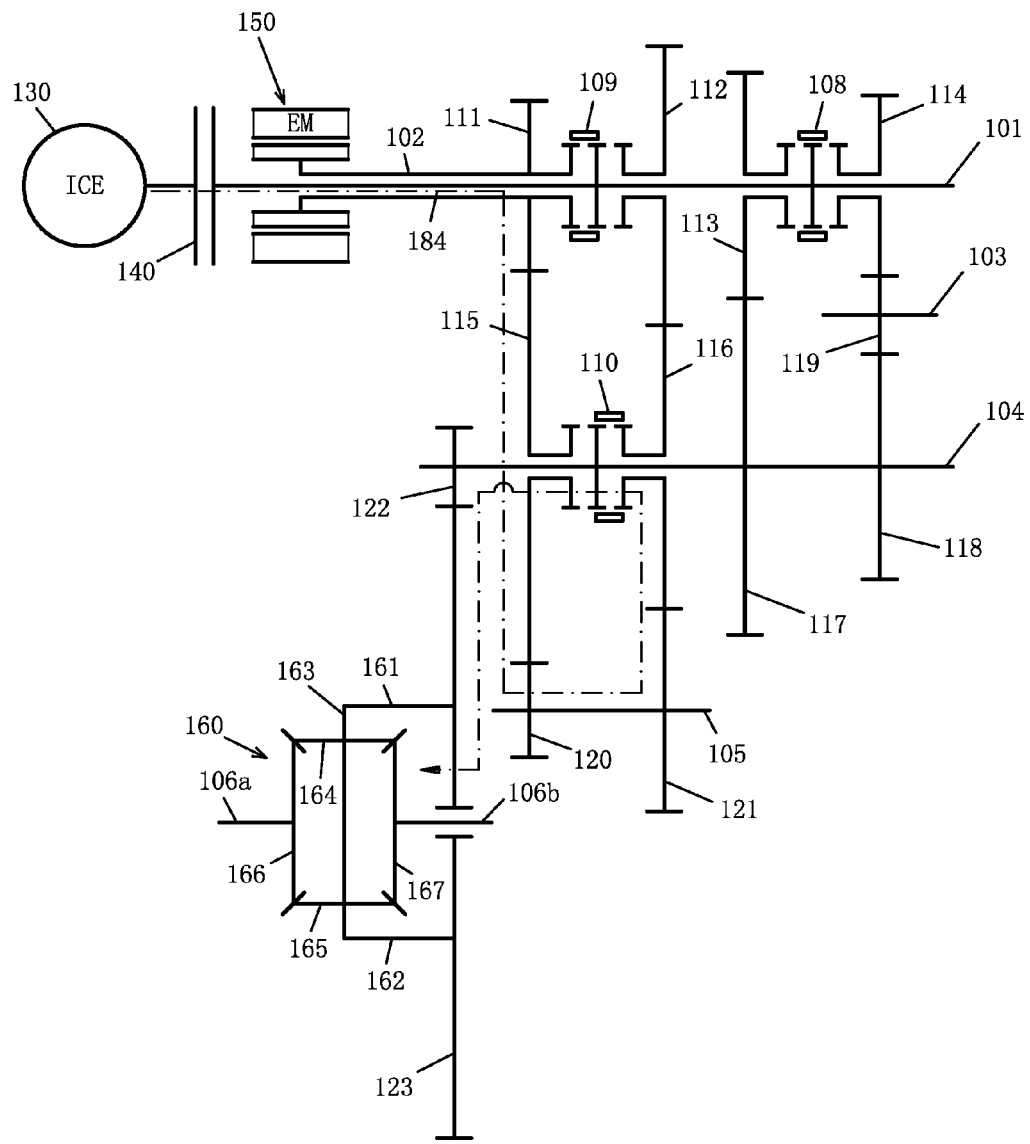
Figure 24:
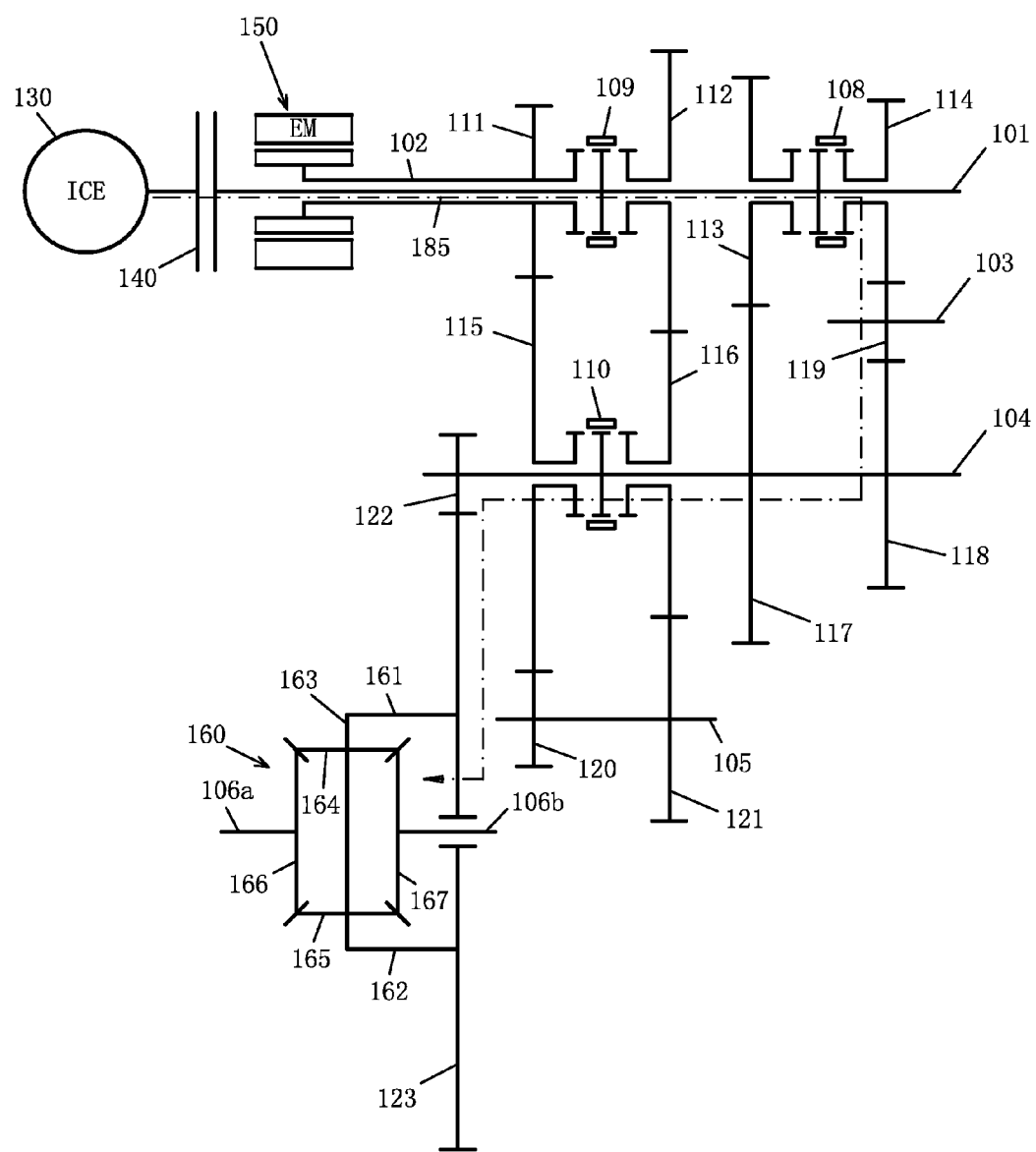
Figure 25:
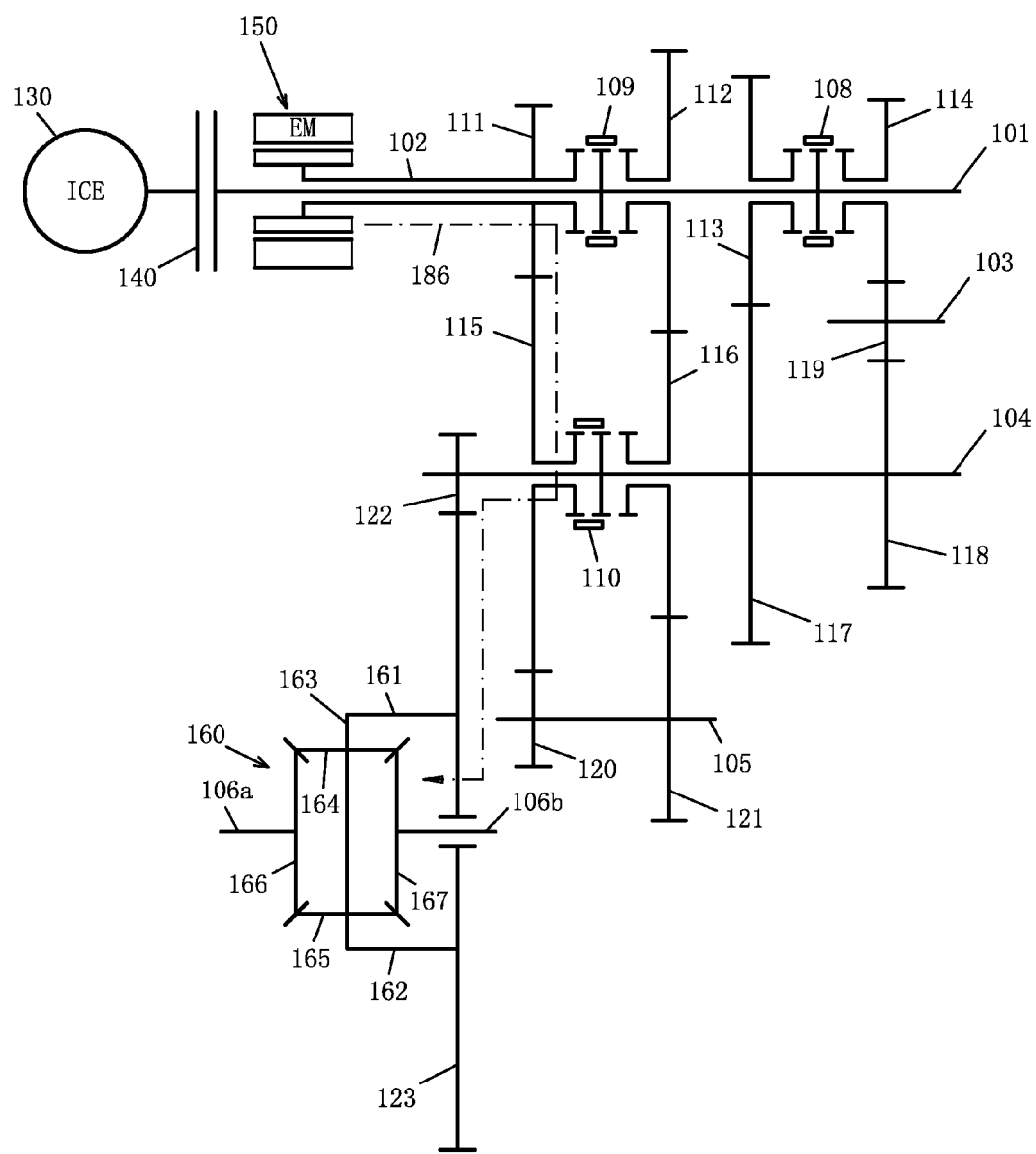
Figure 26:
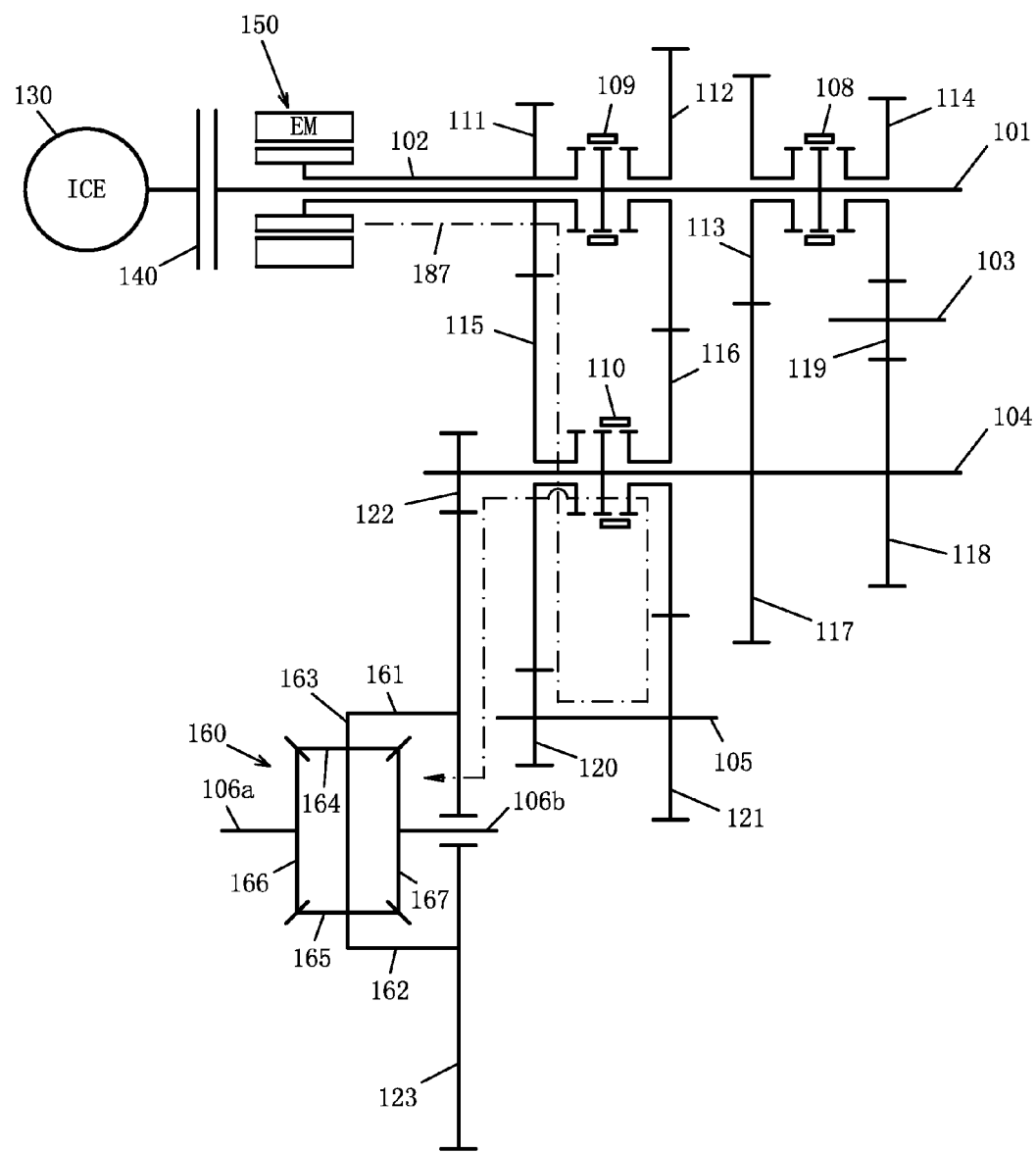
Figure 27:
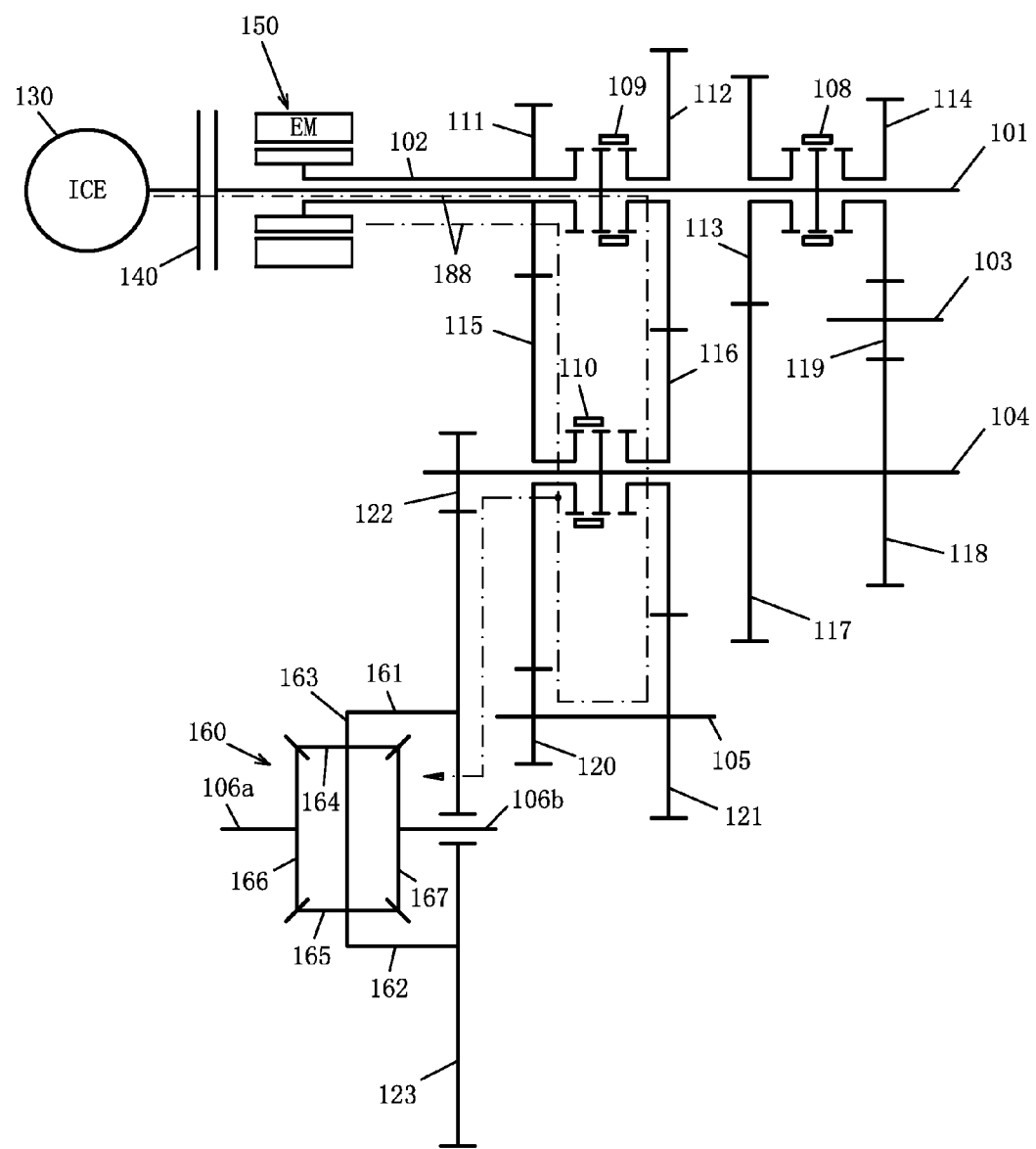
Figure 28:
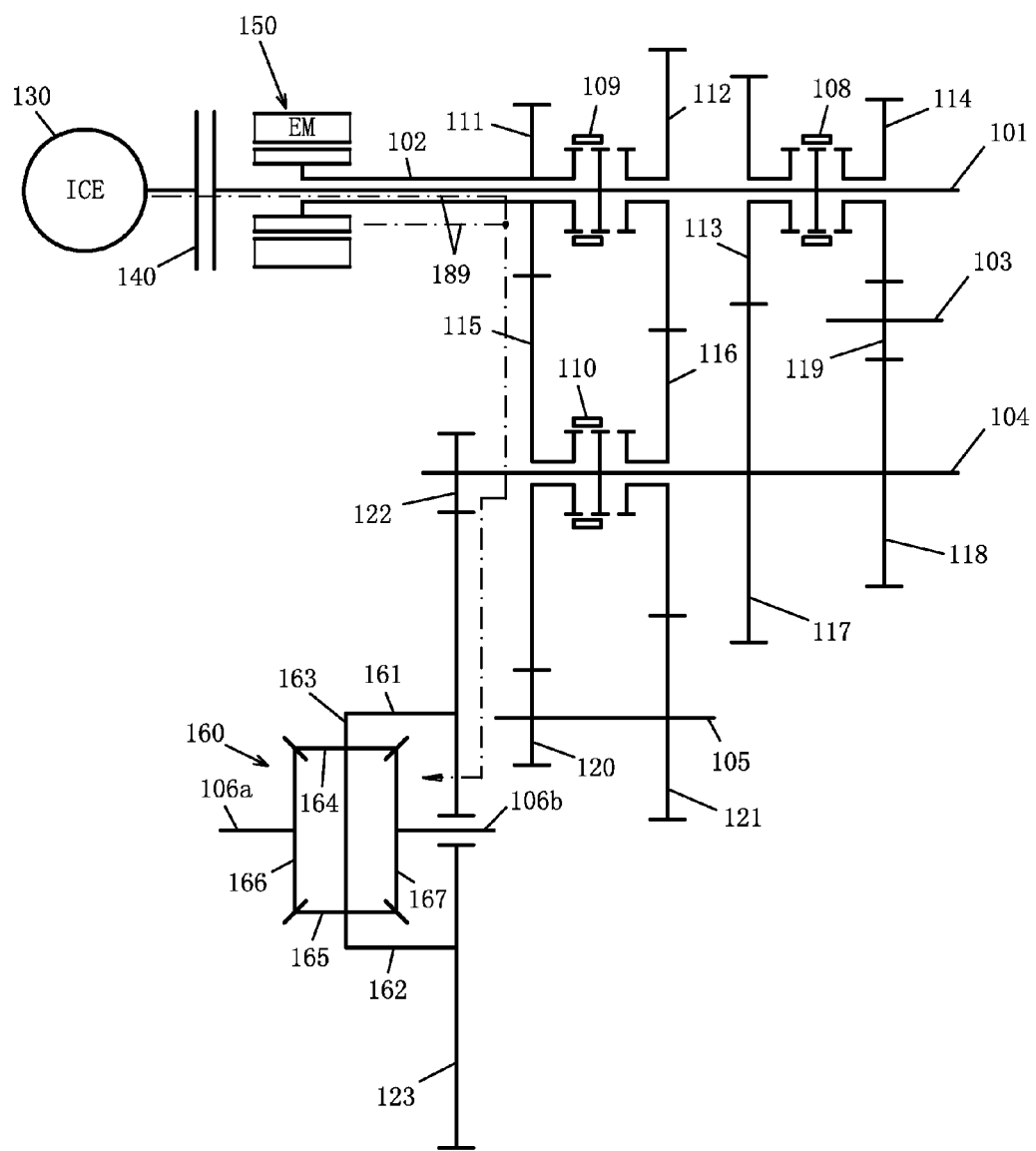
Figure 29:
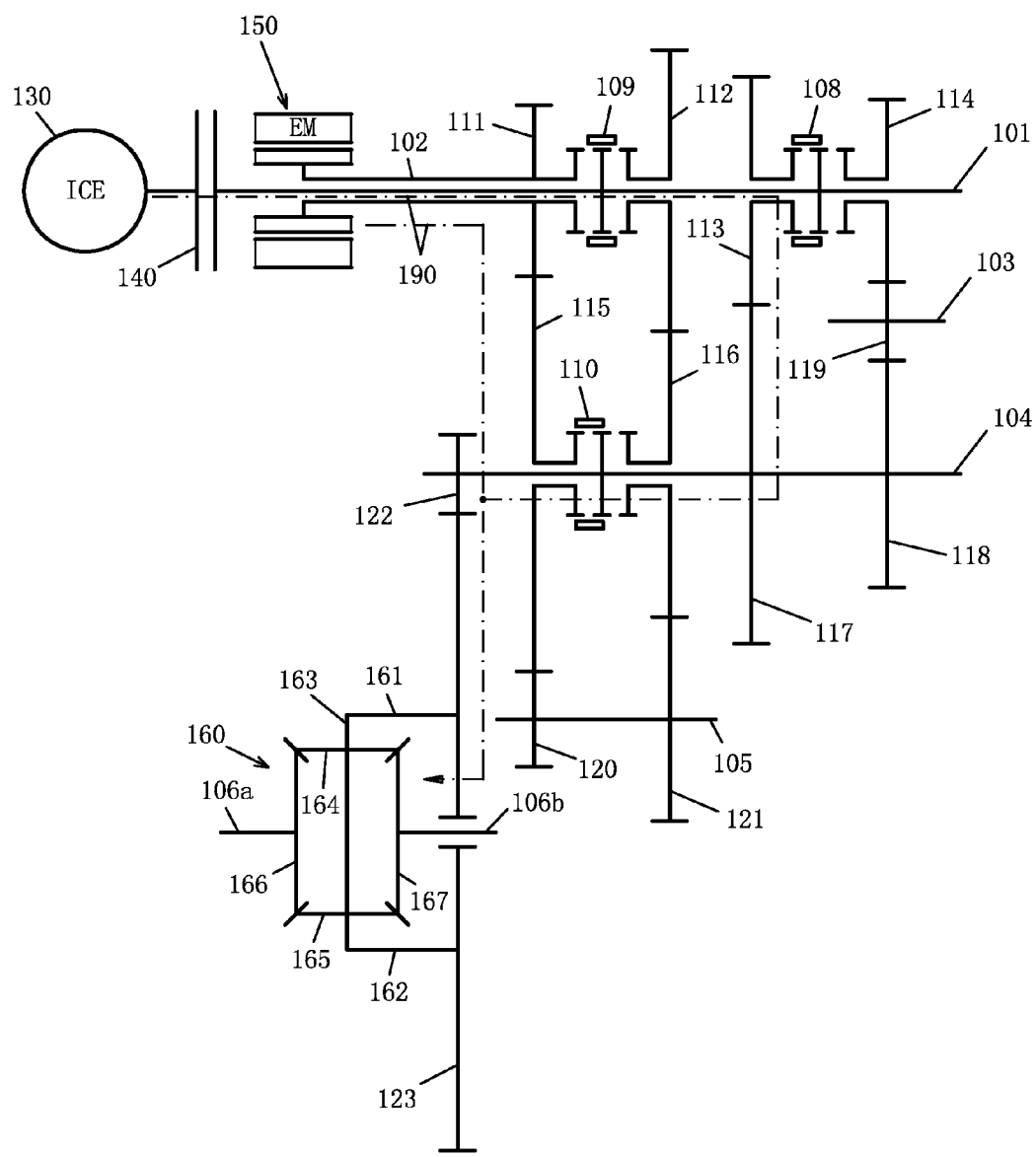
Figure 30:
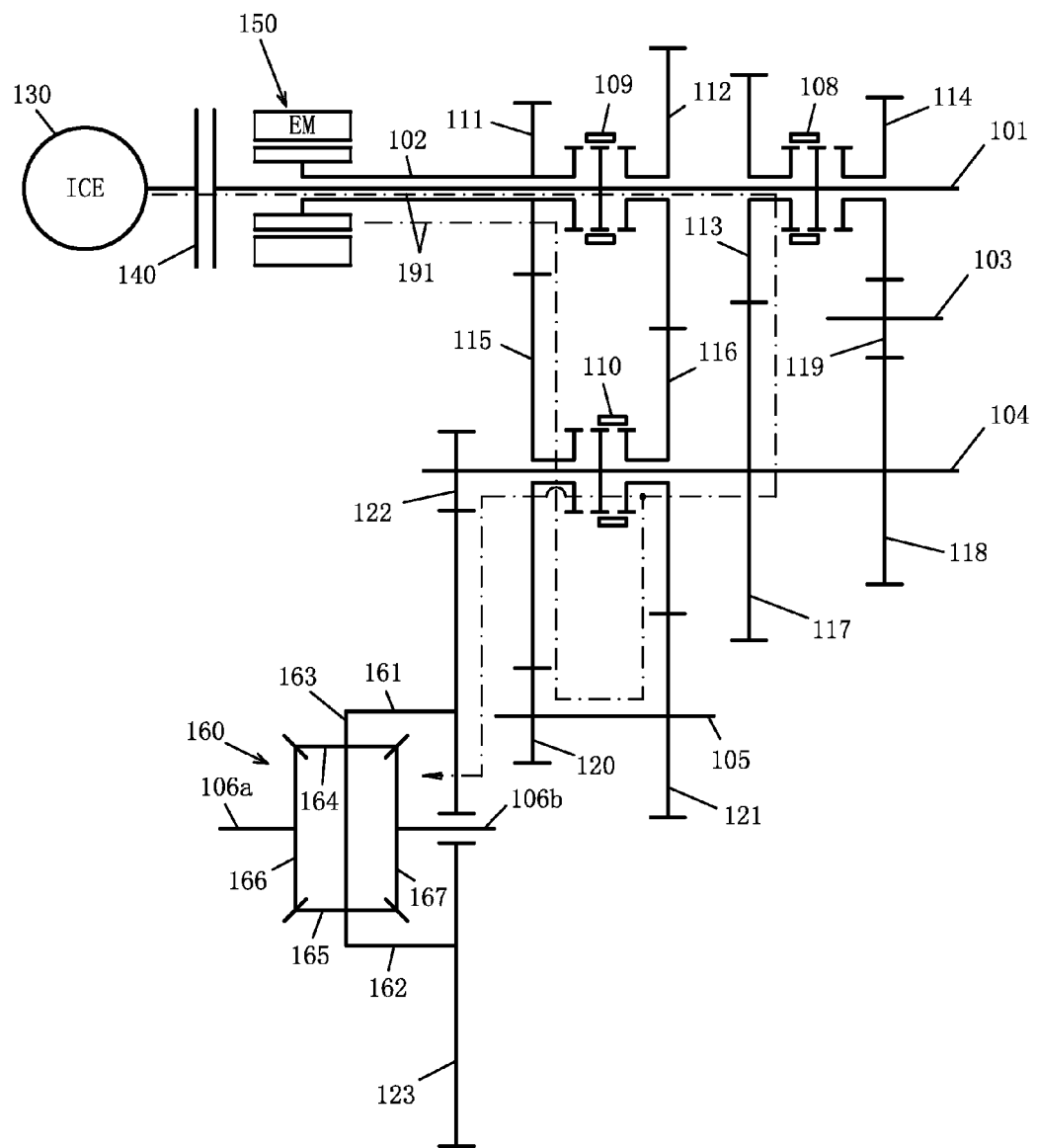
Figure 31:
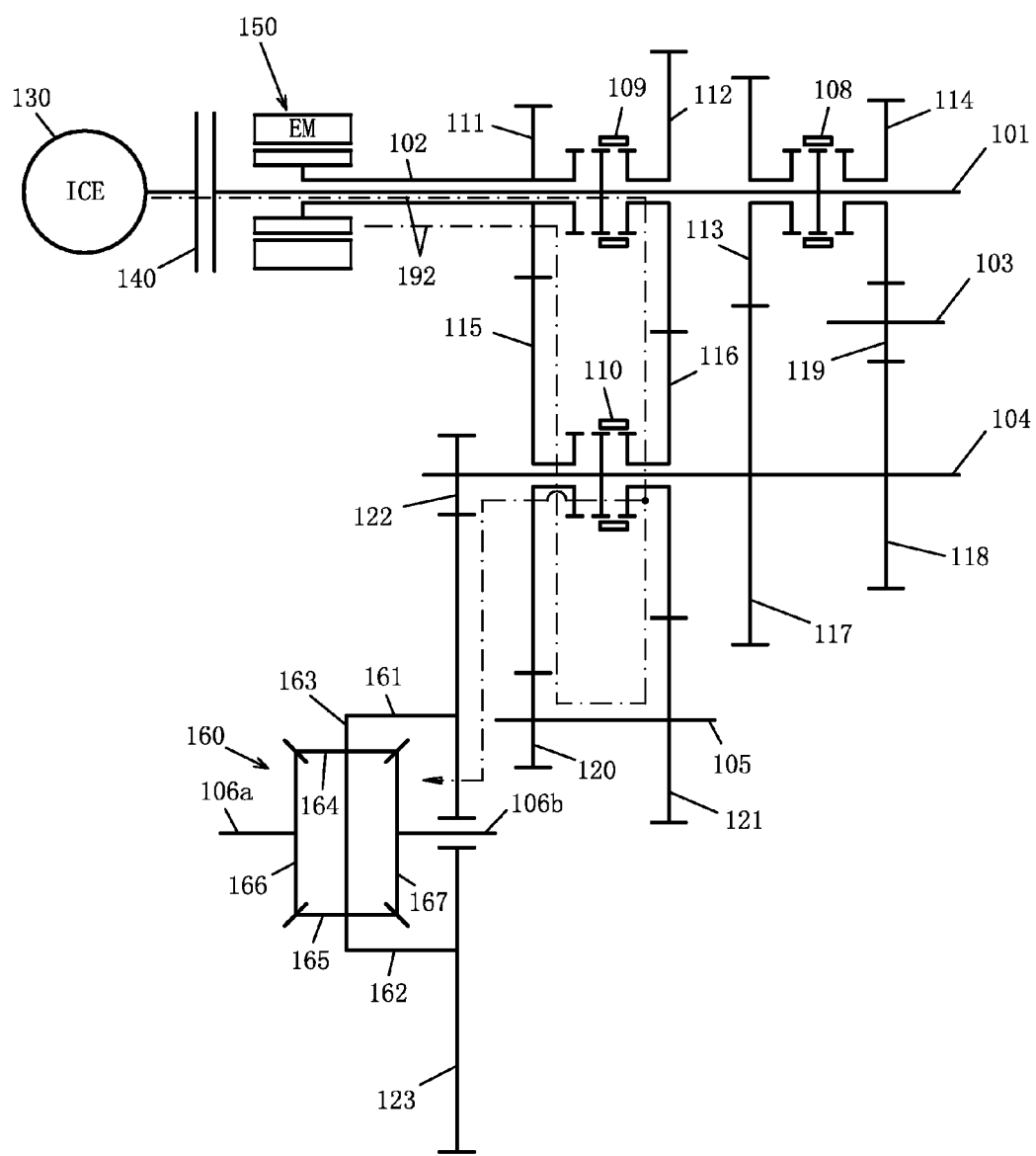
Figure 32:
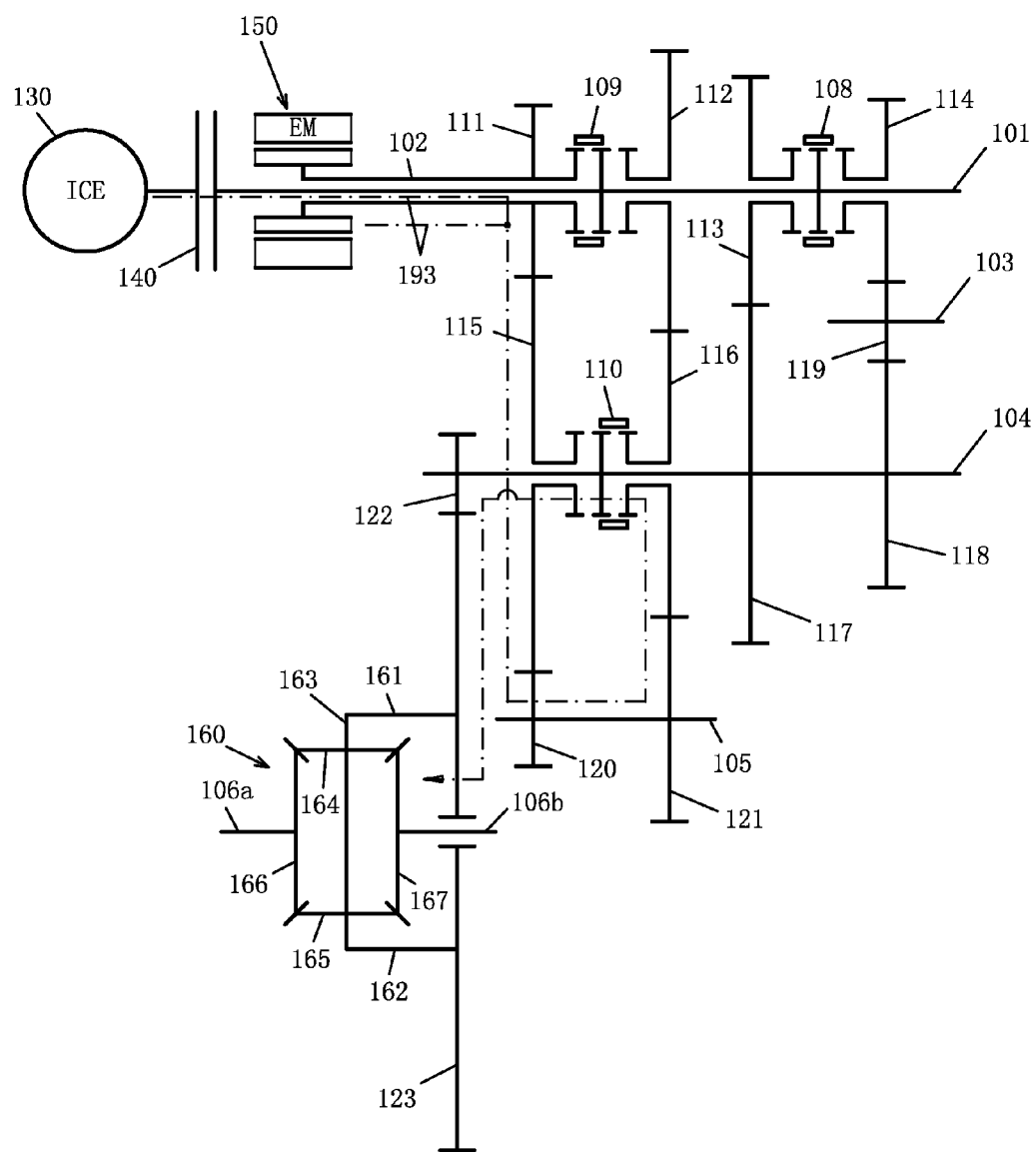
Figure 33:
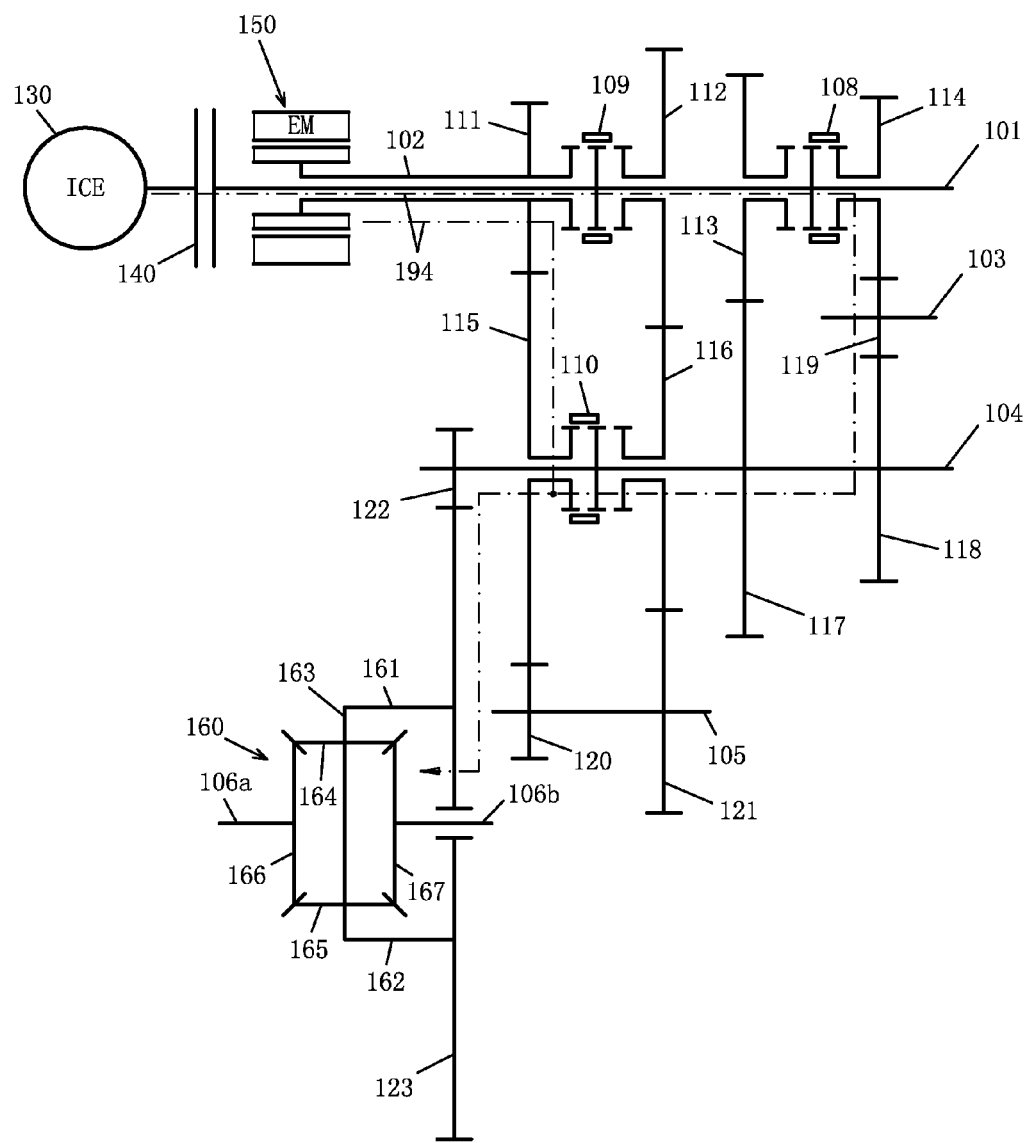
Figure 34:
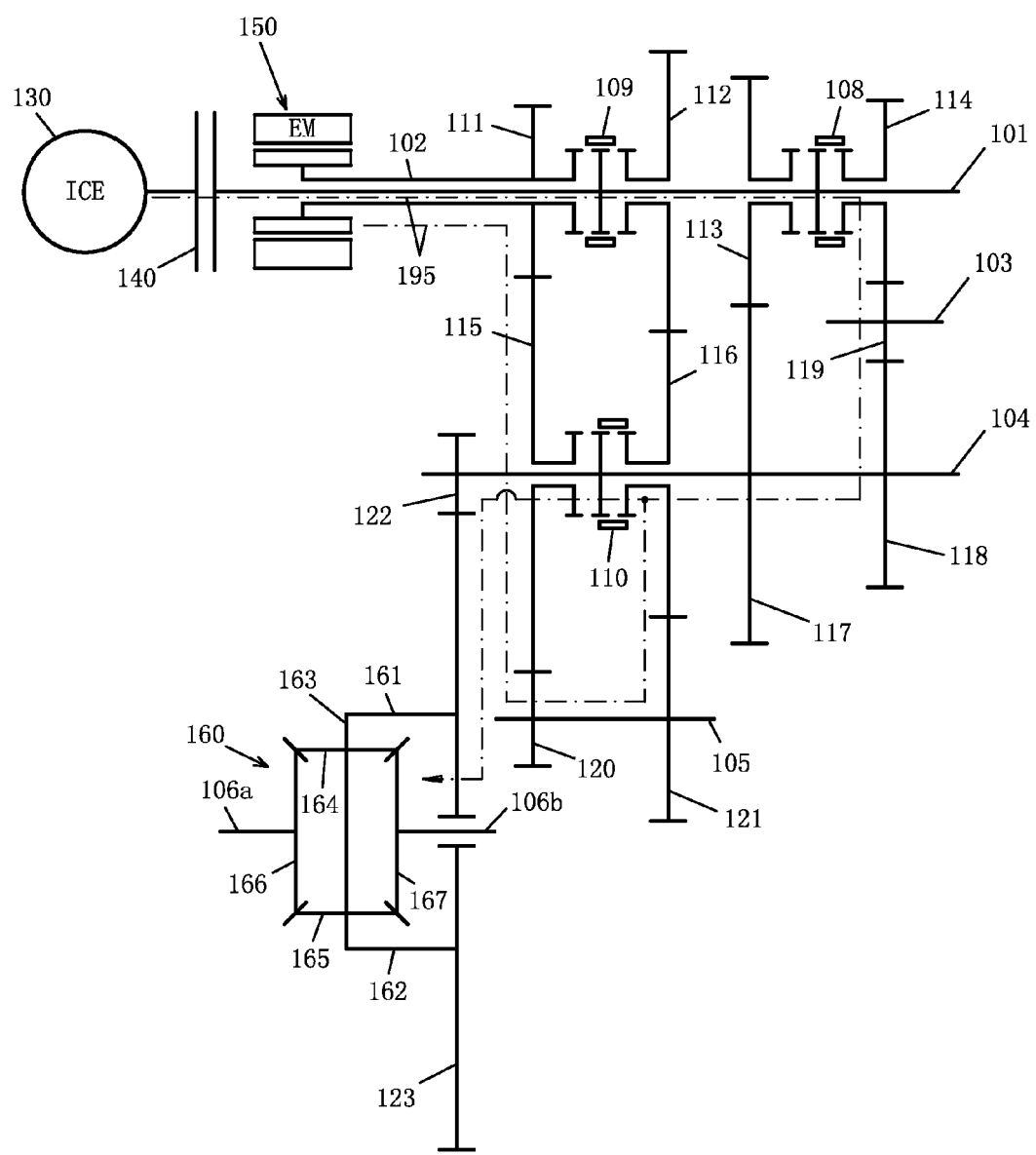

Next, FIG. 18 is a schematic view of an HPDS 200. Many components of the HPDS 200 can be identical to components of the HPDS 100. Table 3 identifies those components. The description herein regarding each component of the HPDS 100 shown in Table 3 is applicable to the identical component of the HPDS 200.

TABLE 3

| HPDS (100) Component | HPDS (200) Component | HPDS (100) Component | HPDS (200) Component |
|---|---|---|---|
| Reverse-gear idler shaft (3) | Reverse-gear idler shaft (103) | Intermediate shaft (4) | Intermediate shaft (104) |
| Intermediate shaft (5) | Intermediate shaft (105) | Half-axle (6a) | Half-axle (106a) |
| Half-axle (6b) | Half-axle (106b) | Synchronizer (8) | Synchronizer (108) |
| Synchronizer (10) | Synchronizer (110) | Second driving gearwheel (12) | Second driving gearwheel (112) |
| Third driving gearwheel (13) | Third driving gearwheel (113) | Reverse-gear driving gearwheel (14) | Reverse-gear driving gearwheel (114) |
| First driven gearwheel (15) | First driven gearwheel (115) | Second driven gearwheel (16) | Second driven gearwheel (116) |
| Third driven gearwheel (17) | Third driven gearwheel (117) | Reverse-gear driven gearwheel (18) | Reverse-gear driven gearwheel (118) |
| Reverse-gear idler gearwheel (19) | Reverse-gear idler gearwheel (119) | First idler gearwheel (20) | First idler gearwheel (120) |
| Second idler gearwheel (21) | Second idler gearwheel (121) | First speed-reducing gearwheel (22) | First speed-reducing gearwheel (122) |
| Second speed-reducing gearwheel (23) | Second speed-reducing gearwheel (123) | ICE (30) | ICE (130) |
| Clutch (40) | Clutch (140) | EM (50) | EM (150) |
| Compressor (55) | Compressor (155) | Compressor clutch (57) | Compressor clutch (157) |
| Differential (60) | Differential (160) | Carrier (61) | Carrier (161) |
| Carrier (62) | Carrier (162) | Shaft (63) | Shaft (163) |
| First gear (64) | First gear (164) | First gear (65) | First gear (165) |
| Second gear (66) | Second gear (166) | Second gear (67) | Second gear (167) |

As shown in FIG. 18, the HPDS 200 can include an ICE 130, a clutch 140, an EM 150, and a transmission 170. A vehicle including the HPDS 200 can include a compressor 155 and a compressor clutch 157. The transmission 170 can include an input shaft 101, a motor shaft 102, a reverse-gear idler shaft 103, an intermediate shaft 104, an intermediate shaft 105, and half-axles 106a and 106b. For convenience purposes, the seven aforementioned shafts are referred to herein as the "seven transmission shafts of the transmission 170." The motor shaft 102 can include a hollow shaft (e.g., a sleeve) that is rotatably carried by the input shaft 101.

Each of the aforementioned shafts of the transmission 170 can be mounted to, or at least partially within, a transmission case at locations that allow for gearwheels on those transmission shafts to mesh with at least one other gearwheel as described herein. Each of the seven transmission shafts of the transmission 170 can be spatially arranged parallel with each other. The transmission case can form or include a gearbox within which gearwheels of the transmission 170 and at least a portion of the seven transmission shafts of the transmission 170 are located. The EM 150 or a portion thereof can be located within the transmission case. Alternatively, the EM 150 can be located outside of the transmission case.

The transmission 170 can include sleeves (e.g., a hollow shaft) 112a, 113a, 114a, 115a, and 116a. Sleeves 112a, 113a, and 114a are carried by the input shaft 101. Sleeves 115a and 116a are carried by the intermediate shaft 104.

The transmission 170 includes multiple driving gearwheels that drive at least one other gearwheel or causes at least one other gearwheel to turn. The transmission 170 includes multiple driven gearwheels.

In an example embodiment of the HPDS 200 including the ICE 130, the input shaft 101 can be coupled to the ICE 130 by use of a clutch 140. As an example, the clutch 140 can include a pressure plate assembly, a throw-out bearing, a throw-our fork, and a clutch disk to engage a flywheel of the ICE 130, but the clutch 140 is not so limited. The clutch 140 can have an engaged state in which an output of the ICE 130 (e.g., the flywheel) is connected to the input shaft 101 (e.g., by way of the clutch disk). When viewed from a front side of the ICE 130 (opposite a back side of the ICE 130 to which the flywheel is connected), the power or torque output by the ICE 130 can turn the clutch 140 in a clockwise direction. Other references herein to the ICE 130 or a shaft of the transmission 170 turning in a clockwise direction are considered from the same viewpoint. Clutch 140 can have a disengaged state in which the output of the ICE 130 is not connected to the input shaft 101.

The transmission 170 can include the motor shaft 102, a synchronizer 109, a driving gearwheel 112, a driving gearwheel 113, a synchronizer 108, and a reverse-gear driving gearwheel 114 disposed on the input shaft 101 in a sequence from left to right (e.g., from the first shaft-end-portion to the second shaft-end portion) as shown in FIG. 18, but is not so limited. For example, those three gearwheels can be in a different sequence between the first shaft-end-portion and the second shaft-end portion of the input shaft 101 so long as each of those gearwheels is positioned to mesh with the corresponding gear(s) described herein as meshing with that gearwheel. Each of the driving gearwheel 112, the driving gearwheel 113, and the reverse-gear driving gearwheel 114 is configured for engagement to the input shaft 101 by a synchronizer and is rotatably carried by the input shaft 101 or is carried by the sleeves 112a, 113a, and 114a, respectively.

The transmission 170 can include a driving gearwheel 111 and the EM 150 disposed on the motor shaft 102. The driving gearwheel 111 is fixedly carried by the motor shaft 102 such that the driving gearwheel 111 and the motor shaft 102 rotate together around the input shaft 101. The motor shaft 102 can couple to a rotor 151 of the EM 150.

The synchronizer 109 can be moved axially along the input shaft 101 by a shift fork or another mechanism. The synchronizer 109 can have (i) a first engaged position in which the synchronizer 109 keeps the driving gearwheel 111, but not the driving gearwheel 112, engaged with the input shaft 101, (ii) a second engaged position in which the synchronizer 109 keeps the driving gearwheel 112, but not the driving gearwheel 111, engaged with the input shaft 101, and (iii) a neutral position in which neither of the driving gearwheel 111 and the driving gearwheel 112 is engaged with the input shaft 101. In its first engaged position, synchronizer 109 can releasably engage the motor shaft 102 or the driving gearwheel 111. The synchronizer 109 can be moved axially along the input shaft 101 away from a gearwheel adjacent to the synchronizer 109 so that the gearwheel disengages from the input shaft 101 and the synchronizer 109 moves into its neutral position.

The synchronizer 108 can be moved axially along the input shaft 101 by a shift fork or another mechanism. The synchronizer 108 can have (i) a first engaged position in which the synchronizer 108 keeps the driving gearwheel 113, but not the reverse-gear driving gearwheel 114, engaged with the input shaft 101, (ii) a second engaged position in which the synchronizer 108 keeps the reverse-gear driving gearwheel 114, but not the driving gearwheel 113, engaged with the input shaft 101, and (iii) a neutral position in which neither of the driving gearwheel 113 and the reverse-gear driving gearwheel 114 is engaged with the input shaft 101. The synchronizer 108 can be moved axially along the input shaft 101 away from a gearwheel adjacent to the synchronizer 108 so that the gearwheel disengages from the input shaft 101 and the synchronizer 108 moves into its neutral position.

The transmission 170 can include a speed-reducing gearwheel 122, a driven gearwheel 115, a synchronizer 110, a driven gearwheel 116, a driven gearwheel 117, and a reverse-gear driven gearwheel 118 disposed on the intermediate shaft 104 in a sequence from left to right (e.g., from the first shaft-end-portion to the second shaft-end portion) as shown in FIG. 18, but is not so limited. For example, those five gearwheels can be in a different sequence between the first shaft-end-portion and the second shaft-end portion of the intermediate shaft 104 so long as each of those gearwheels is positioned to mesh with the corresponding gear(s) described herein as meshing with that gearwheel.

The driven gearwheel 115 and the driven gearwheel 116 are configured for engagement to the intermediate shaft 104 by the synchronizer 110. The synchronizer 110 can be moved axially along the intermediate shaft 104 by a shift fork or another mechanism. The synchronizer 110 can have (i) a first engaged position in which the synchronizer 110 keeps the driven gearwheel 115, but not the driven gearwheel 116, engaged with the intermediate shaft 104, (ii) a second engaged position in which the synchronizer 110 keeps the driven gearwheel 116, but not the driven gearwheel 115, engaged with the intermediate shaft 104, and (iii) a neutral position in which neither of the driven gearwheel 115 and the driven gearwheel 116 is engaged with the intermediate shaft 104.

The transmission 170 can include an idler gearwheel 120 and an idler gearwheel 121 disposed on the intermediate shaft 105 in a sequence from left to right (e.g., from the first shaft-end-portion to the second shaft-end portion) as shown in FIG. 18, but is not so limited. For example, those two gearwheels can be in a different sequence between the first shaft-end-portion and the second shaft-end portion of the intermediate shaft 105 so long as each of those gearwheels is positioned on the intermediate shaft 105 so as to mesh with the corresponding gear(s) described herein as meshing with that gearwheel. The idler gearwheel 120 meshes with the driven gearwheel 115 on the intermediate shaft 104. The idler gearwheel 121 meshes with the driven gearwheel 116 on the intermediate shaft 104.

The transmission 170 can include a reverse-gear idler gearwheel 119 disposed on the reverse-gear idler shaft 103. The reverse-gear idler gearwheel 119 meshes with the reverse-gear driving gearwheel 114 on the input shaft 101 and with the reverse-gear driven gearwheel 118 on the intermediate shaft 104.

The transmission 170 can include a differential 160. The differential 160 can include a speed-reducing gearwheel 123 and differential half-axles 106a. Differential 160 can also include pinion gearwheels and side gearwheels. The differential half-axles 106 can be connected to vehicle wheels.

The transmission 170 can include a driven gearwheel 126 on the intermediate shaft 107. The driven gearwheel 126 and the driving gearwheel 111 mesh with each other. In the example embodiments in which the HPDS 200 includes the compressor 155, a compressor clutch 157 can releasably couple the compressor 155 and the intermediate shaft 107 together.

The aforementioned gearwheels and synchronizers can be referred to by alternative names. Table 3 shows alternative gearwheel and synchronizer names for the gearwheels and synchronizers of the transmission 170. Other examples of alternative names are also possible.

TABLE 4

| Gearwheel/Synchronizer | Drawing Reference Number | Alternative names for Gearwheel/Synchronizer |
|---|---|---|
| Synchronizer | 108 | Third-and-reverse-gear synchronizer |
| Synchronizer | 109 | Second-and-fourth-gear synchronizer |
| Synchronizer | 110 | Passive gearwheels synchronizer |
| Driving gearwheel | 111 | Second-gear active gearwheel |
| Driving gearwheel | 112 | Fourth-gear active gearwheel |
| Driving gearwheel | 113 | Third-gear active gearwheel |
| Reverse-gear driving gearwheel | 114 | Reverse-gear active gearwheel |
| Driven gearwheel | 115 | Second-gear passive gearwheel |
| Driven gearwheel | 116 | Fourth-gear passive gearwheel |
| Driven gearwheel | 117 | Third-gear passive gearwheel |
| Reverse-gear driven gearwheel | 118 | Reverse-gear passive gearwheel |
| Reverse-gear idler gearwheel | 119 | Fourth idler gearwheel |

TABLE 4-continued

| Gearwheel/ Synchronizer | Drawing Reference Number | Alternative names for Gearwheel/Synchronizer |
|---|---|---|
| Idler gearwheel | 120 | First idler gearwheel |
| Idler gearwheel | 121 | Second idler gearwheel |
| Speed-reducing gearwheel | 122 | First speed-reducing gearwheel |
| Driven speed-reducing gearwheel | 123 | Second speed-reducing gearwheel |
| Driven gearwheel | 126 | Compressor driven gearwheel |

The gearwheels of the example embodiments can have various characteristics. Table 4 includes data indicating additional example characteristics of the various gearwheels of the transmission 170. A person having ordinary skill in the art will understand that other examples of the identified characteristics are also possible.

TABLE 5

| Gearwheel | Slidable on shaft | Rotatably carried by shaft (Shaft No.) | Fixedly carried by shaft (Shaft No.) | Meshing gearwheels |
|---|---|---|---|---|
| Driving gearwheel (111) | No | No | Yes (102) | 115, 126 |
| Driving gearwheel (112) | No | Yes (101) | No | 116 |
| Driving gearwheel (113) | No | Yes (101) | No | 117 |
| Reverse-gear Driving (114) | No | Yes (101) | No | 119 |
| Driven gearwheel (115) | No | Yes (104) | No | 111, 120 |
| Driven gearwheel (116) | No | Yes (104) | No | 112, 121 |
| Driven gearwheel (117) | No | No | Yes (104) | 113 |
| Reverse-gear driven gearwheel (118) | No | No | Yes (104) | 119 |
| Reverse-gear Idler (119) | No | No | Yes (103) | 114, 118 |
| Idler gearwheel (120) | No | No | Yes (105) | 115 |
| Idler gearwheel (121) | No | No | Yes (105) | 116 |
| Speed-reducing gearwheel (122) | No | No | Yes (104) | 123 |
| Speed-reducing gearwheel (123) | No | No | Yes (106) | 122 |
| Driven gearwheel (126) | No | No | Yes (107) | 111 |

V. Power Transmitting Paths for HPDS 200

In accordance with the example embodiments, the EM 50 can be disposed in a side position relative to the transmission as shown in FIG. 1. Alternatively, an EM 150 can be disposed in an axial position relative to the transmission according to the layout of the vehicle, as shown in FIG. 18. As an example, in the axial position, the motor shaft 102 and the input shaft 101 to which the ICE 130 can be coupled are coaxial.

The HPDS 200 can have one or more driving modes. Those driving modes can include at least one of (i) a PEDM in which the ICE 130 is the acting power source for the HPDS 200, (ii) a PMDM in which the EM 150 is the acting power source for the HPDS 200, and (iii) a HDM in which both the ICE 130 and the EM 150 are the acting power sources for the HPDS 200.

The HPDS 200 and the transmission 170 can provide multiple power transmitting paths for each of the one or more driving modes. Examples of those power transmitting paths are described below. For each of the power transmitting paths of the PEDM and the HDM, the clutch 140 can be in the engaged state such that the power of the ICE 130 is transmitted to the input shaft 101 by the clutch 140. For each of the power transmitting paths of the PMDM, the clutch 140 is in the disengaged state such that any power available from the ICE 130 is not transmitted to the input shaft 101 by the clutch 140 or the ICE 130 is not outputting power. Shifting the transmission 170 from any speed ratio to another speed ratio in the PEDM and HDM can include the ICE 130 and the input shaft 101 being disengaged from one another by the clutch 140 so that axial movement of one or more of the synchronizers can be moved axially to allow for engagement and disengagement (i.e., coupling and uncoupling) of one or more gearwheels as described below.

The power transmitting paths discussed herein refer to forward speed ratios and reverse speed ratios. The power output by the half-axles 106a and 106b for the forward speed ratios can cause the half-axles 106a and 106b, and wheels attached thereto, to turn in a first driving direction (e.g., a forward driving direction). The power output by the half-axles 106a and 106b for the reverse speed ratios can cause the half-axles 106a and 106b, and wheels attached thereto, to turn in a second driving direction (e.g., a reverse driving direction) opposite the first driving direction. FIG. 19 to FIG. 34 illustrate example power transmitting paths performed by components of the HPDS 200 and the transmission 170 shown in FIG. 18, and also illustrate components of the HPDS 200 and the transmission 170.

A. Power Transmitting Paths—Pure Engine Driving Mode (PEDM)

1. First Forward Speed Ratio (PEDM)

The HPDS 200 and the transmission 170 can provide a power transmitting path 180 for a first forward speed ratio while operating in the PEDM. This power transmitting path 180 (shown in FIG. 19) can be achieved when (i) the clutch 140 is in an engaged state such that the ICE 130 is coupled to the input shaft 101, (ii) the synchronizer 109 is engaged with the driving gearwheel 112, (iii) the synchronizer 110 is engaged with the driven gearwheel 115, and (iv) the synchronizer 108 is in its neutral position.

For the first forward speed ratio in the PEDM, the power output by the ICE 130 for power transmitting path 180 is transmitted in sequence through the driving gearwheel 112 on the input shaft 101, the driven gearwheel 116 on the intermediate shaft 104, the idler gearwheel 121 and the idler gearwheel 120 on the intermediate shaft 105, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto.

2. Second Forward Speed Ratio (PEDM)

The HPDS 200 and the transmission 170 can provide a power transmitting path 181 for a second forward speed ratio while operating in the PEDM. This power transmitting path 181 (shown in FIG. 20) can be achieved when (i) the clutch 140 is in an engaged state such that the ICE 130 is coupled to the input shaft 101, (ii) the synchronizer 109 is engaged with the driving gearwheel 111, (iii) the synchronizer 110 is engaged with the driven gearwheel 115, and (iv) the synchronizer 108 is in its neutral position.

For the second forward speed ratio in the PEDM, the power output by the ICE 130 for power transmitting path 181 is transmitted in sequence through the driving gearwheel 111 on the input shaft 101, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

3. Third Forward Speed Ratio (PEDM)

The HPDS 200 and the transmission 170 can provide a power transmitting path 182 for a third forward speed ratio while operating in the PEDM. This power transmitting path 182 (shown in FIG. 21) can be achieved when (i) the clutch 140 is in an engaged state such that the ICE 130 is coupled to the input shaft 101, (ii) the synchronizer 108 is engaged with the driving gearwheel 113, (iii) the synchronizer 109 is in its neutral position, and (iv) the synchronizer 110 is in its neutral position.

For the third forward speed ratio in the PEDM, the power output by the ICE 130 for power transmitting path 182 is transmitted in sequence through the driving gearwheel 113 on the input shaft 101, the driven gearwheel 117 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

4. Fourth Forward Speed Ratio (PEDM)

The HPDS 200 and the transmission 170 can provide a power transmitting path 183 for a fourth forward speed ratio while operating in the PEDM. This power transmitting path 183 (shown in FIG. 22) can be achieved when (i) the clutch 140 is in an engaged state such that the ICE 130 is coupled to the input shaft 101, (ii) the synchronizer 109 is engaged with the driving gearwheel 112, (iii) the synchronizer 110 is engaged with the driven gearwheel 116, and (iv) the synchronizer 108 is in its neutral position.

For the fourth forward speed ratio in the PEDM, the power output by the ICE 130 for power transmitting path 183 is transmitted in sequence through the driving gearwheel 112 on the input shaft 101, the driven gearwheel 116 and the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

5. Fifth Forward Speed Ratio (PEDM)

The HPDS 200 and the transmission 170 can provide a power transmitting path 184 for a fifth forward speed ratio while operating in the PEDM. This power transmitting path 184 (shown in FIG. 23) can be achieved when (i) the clutch 140 is in an engaged state such that the ICE 130 is coupled to the input shaft 101, (ii) the synchronizer 109 is engaged with the driving gearwheel 111, (iii) the synchronizer 110 is engaged with the driven gearwheel 116, and (iv) the synchronizer 108 is in its neutral position.

For the fifth forward speed ratio in the PEDM, the power output by the ICE 130 for power transmitting path 184 is transmitted in sequence through the driving gearwheel 111 on the input shaft 101, the driven gearwheel 115 on the first intermediate shaft, the idler gearwheel 120 and idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

6. Reverse Speed Ratio (PEDM)

The HPDS 200 and the transmission 170 can provide a power transmitting path 185 for a reverse speed ratio while operating in the PEDM. This power transmitting path 185 (shown in FIG. 24) can be achieved when (i) the clutch 140 is in an engaged state such that the ICE 130 is coupled to the input shaft 101, (ii) the synchronizer 108 is engaged with the reverse-gear driving gearwheel 114, (iii) the synchronizer 109 is in its neutral position, and (iv) the synchronizer 110 is in its neutral position.

For the reverse speed ratio in the PEDM, the power output by the ICE 130 for power transmitting path 185 is transmitted in sequence through the reverse-gear driving gearwheel 114 on the input shaft 101, the reverse-gear idler gearwheel 119 on the reverse-gear idler shaft 103, the reverse-gear driven gearwheel 118 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

B. Power Transmitting Paths—Pure Motor Driving Mode (PMDM)

1. First Forward Speed Ratio (PMDM)

The HPDS 200 and the transmission 170 can provide a power transmitting path 186 for a first forward speed ratio while operating in the PMDM. This power transmitting path 186 (shown in FIG. 25) can be achieved when (i) the synchronizer 110 is engaged with the driven gearwheel 115, (ii) the synchronizer 108 is in its neutral position, and (iii) the synchronizer 109 is in its neutral position.

For the first forward speed ratio in the PMDM, the power output by the EM 150 for power transmitting path 186 is transmitted in sequence through the driving gearwheel 111 on the motor shaft 102, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

2. Second Forward Speed Ratio (PMDM)

The HPDS 200 and the transmission 170 can provide a power transmitting path 187 for a second forward speed ratio while operating in the PMDM. This power transmitting path 187 (shown in FIG. 26) can be achieved when (i) the synchronizer 110 is engaged with the driven gearwheel 116, (ii) the synchronizer 108 is in its neutral position, and (iii) the synchronizer 109 is in its neutral position.

For the second forward speed ratio in the PMDM, the power output by the EM 150 for power transmitting path 187 is transmitted in sequence through the driving gearwheel 111 on the input shaft 101, the driven gearwheel 115 on the intermediate shaft 104, the idler gearwheel 120 and the idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

3. Reverse Speed Ratios (PMDM)

The HPDS 200 and the transmission 170 can provide power transmitting paths for a reverse speed ratio in the PMDM. A power transmitting path for a first reverse speed ratio in the PMDM is identical to the power transmitting path 186 for the first forward speed ratio in the PMDM, but the EM 150 rotates in an opposite direction (e.g., a reverse direction) with respect to the direction the EM 150 rotates for the first forward speed ratio in the PMDM. This power transmitting path 186 (shown in FIG. 25) can be achieved when (i) the synchronizer 110 is engaged with the driven gearwheel 115, (ii) the synchronizer 108 is in its neutral position, and (iii) the synchronizer 109 is in its neutral position.

For the power transmitting path for the first reverse speed ratio in the PMDM, the power output by the EM 150 for power transmitting path 186 is transmitted in sequence through, the driving gearwheel 111 on the input shaft 101, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

A power transmitting path for a second reverse speed ratio in the PMDM is identical to the power transmitting path 187 for the second forward speed ratio in the PMDM, but the EM 150 rotates in the opposite direction with respect to the direction the EM 150 rotates for the second forward speed ratio in the PMDM. This power transmitting path 187 (shown in FIG. 26) can be achieved when (i) the synchronizer 110 is engaged with the driven gearwheel 116, (ii) the synchronizer 108 is in its neutral position, and (iii) the synchronizer 109 is in its neutral position.

For the power transmitting path for the second reverse speed ratio in the PMDM, the power output by the EM 150 for power transmitting path 187 is transmitted in sequence through the driving gearwheel 111 on the input shaft 101, the driven gearwheel 115 on the intermediate shaft 104, the idler gearwheel 120 and the idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto.

C. Power Transmitting Paths—Hybrid Driving Mode (HDM)

1. First Forward Speed Ratio (HDM)

The HPDS 200 and the transmission 170 can provide a power transmitting path 188 from the ICE 130 and the EM 150 for a first forward speed ratio while operating in the HDM. This power transmitting path 188 (shown in FIG. 27) can be achieved when (i) the clutch 140 is in an engaged state such that ICE 130 is coupled to the input shaft 101, (ii) the synchronizer 109 is engaged with the driving gearwheel 112, (iii) the synchronizer 110 is engaged with the driven gearwheel 115, and (iv) the synchronizer 108 is in its neutral position. The power transmitting path 188 transmits power output by the ICE 130 and the EM 150.

For the first forward speed ratio in the HDM, the power output by the ICE 130 is transmitted in sequence through the driving gearwheel 112 on the input shaft 101, the driven gearwheel 116 on the intermediate shaft 104, the idler gearwheel 121 on the intermediate shaft 105, the idler gearwheel 120 on the intermediate shaft 105, the driven gearwheel 115 on the intermediate shaft 104, the speed-reducing gearwheel 122 on the intermediate shaft 104, and the speed-reducing gearwheel 123 on the half-axles 106*a* and 106*b* and to a respective wheel (not shown) connectable thereto. Additionally, the power output by the EM 150 is transmitted in sequence through the driving gearwheel 111 on the input shaft 101, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto. Stated another way, for the first forward speed ratio in the HDM, the power transmitting path for power from the ICE 130 follows the power transmitting path 180 and the power from the EM 150 follows the power transmitting path 186.

2. Second Forward Speed Ratio (HDM)

The HPDS 200 and the transmission 170 can provide a power transmitting path 189 from the ICE 130 and the EM 150 for a second forward speed ratio while operating in the HDM. This power transmitting path 189 (shown in FIG. 28) can be achieved when (i) the clutch 140 is in an engaged state such that ICE 130 is coupled to the input shaft 101, (ii) the synchronizer 109 on the input shaft 101 is engaged with the driving gearwheel 111, (iii) the synchronizer 110 is engaged with the driven gearwheel 115, and (iv) the synchronizer 108 is in its neutral position. The power transmitting path 189 transmits power output by the ICE 130 and the EM 150.

For the second forward speed ratio in the HDM, the power output by the ICE 130 is transmitted in sequence through the driving gearwheel 111 on the input shaft 101, the driven gearwheel 115 on the intermediate shaft 104, the speed-reducing gearwheel 122 on the intermediate shaft 104 and the speed-reducing gearwheel 123 on the half-axles 106*a* and 106*b* and to a respective wheel (not shown) connectable thereto. Additionally, the power output by the EM 150 is transmitted through the driving gearwheel 111 on the input shaft 101, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106*a* and 106*b* and to a respective wheel (not shown) connectable thereto. Stated another way, for the second forward speed ratio in the HDM, the power transmitting path for power from the ICE 130 follows the power transmitting path 181 and the power from the EM 150 follows the power transmitting path 186.

3. First Instance of a Third Forward Speed Ratio (HDM)

The HPDS 200 and the transmission 170 can provide multiple power transmitting paths from the ICE 130 and the EM 150 for a third forward speed ratio while operating in the HDM. A power transmitting path 190 (shown in FIG. 29) for a first instance of the third forward speed ratio in the HDM can be achieved when (i) the clutch 140 is in an engaged state such that ICE 130 is coupled to the input shaft 101, (ii) the synchronizer 108 is engaged with the driving gearwheel 113, (iii) the synchronizer 110 is engaged with the driven gearwheel 115, and (iv) the synchronizer 109 is in its neutral position. The power transmitting path 190 transmits power output by the ICE 130 and the EM 150.

For the power transmitting path 190 for the first instance of the third forward speed ratio in the HDM, the power output by the ICE 130 is transmitted in sequence through the driving gearwheel 113 on the input shaft 101, the driven gearwheel 117 on the intermediate shaft 104, the speed-reducing gearwheel 122 on the intermediate shaft 104 and the speed-reducing gearwheel 123 on the half-axles 106*a* and 106*b* and to a respective wheel (not shown) connectable thereto. Additionally, the power output by the EM 150 is transmitted through the driving gearwheel 111 on the input shaft 101, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto. Stated another way, for the first instance of the third forward speed ratio in the HDM, the power transmitting path for power from the ICE 130 follows the power transmitting path 182 and the power from the EM 150 follows the power transmitting path 186.

4. Second Instance of a Third Forward Speed Ratio (HDM)

A power transmitting path 191 (shown in FIG. 30) for a second instance of the third forward speed ratio in the HDM can be achieved when (i) the clutch 140 is in an engaged state such that ICE 130 is coupled to the input shaft 101, (ii) the synchronizer 108 is engaged with the driving gearwheel 113, (iii) the synchronizer 110 is engaged with the driven gearwheel 116, and (iv) the synchronizer 109 is in its neutral position. The power transmitting path 191 transmits power output by the ICE 130 and the EM 150.

For the power transmitting path 191 for the second instance of the third forward speed ratio in the HDM, the power output by the ICE 130 is transmitted in sequence through the driving gearwheel 113 on the input shaft 101, the driven gearwheel 117 on the intermediate shaft 104, the speed-reducing gearwheel 122 on the intermediate shaft 104 and the speed-reducing gearwheel 123 on the half-axles 106a and 106b and to a respective wheel (not shown) connectable thereto. Additionally, the power output by the EM 150 is transmitted through the driving gearwheel 111 on the input shaft 101, the driven gearwheel 115 on the intermediate shaft 104, the idler gearwheel 120 and the idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto.

5. Fourth Forward Speed Ratio (HDM)

The HPDS 200 and the transmission 170 can provide a power transmitting path 192 from the ICE 130 and the EM 150 for a fourth forward speed ratio while operating in the HDM. This power transmitting path 192 (shown in FIG. 31) can be achieved when (i) the clutch 140 is in an engaged state such that ICE 130 is coupled to the input shaft 101, (ii) the synchronizer 109 is engaged with the driving gearwheel 112, (iii) the synchronizer 110 is engaged with the driven gearwheel 116, and (iv) the synchronizer 108 is in its neutral position. The power transmitting path 192 transmits power output by the ICE 130 and the EM 150.

For the fourth forward speed ratio in the HDM, the power output by the ICE 130 is transmitted in sequence through the driving gearwheel 112 on the input shaft 101, the driven gearwheel 116 on the intermediate shaft 104, the speed-reducing gearwheel 122 on the intermediate shaft 104 and the speed-reducing gearwheel 123 on the half-axles 106a and 106b and to a respective wheel (not shown) connectable thereto. Additionally, the power output by the EM 150 is transmitted through the driving gearwheel 111 on the input shaft 101, the driven gearwheel 115 on the intermediate shaft 104, the idler gearwheel 120 and the idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto.

6. Fifth Forward Speed Ratio (HDM)

The HPDS 200 and the transmission 170 can provide a power transmitting path 193 from the ICE 130 and the EM 150 for a fifth forward speed ratio while operating in the HDM. This power transmitting path 193 (shown in FIG. 32) can be achieved when (i) the clutch 140 is in an engaged state such that ICE 130 is coupled to the input shaft 101, (ii) the synchronizer 109 is engaged with the driving gearwheel 111, (iii) the synchronizer 110 is engaged with the driven gearwheel 116, and (iv) the synchronizer 108 is in its neutral position. The power transmitting path 193 transmits power output by the ICE 130 and the EM 150.

For the fifth forward speed ratio in the HDM, the power output by the ICE 130 is transmitted in sequence through the driving gearwheel 111 on the input shaft 101, the driven gearwheel 115 on the first intermediate shaft, the idler gearwheel 120 and the idler gearwheel 121 on the intermediate shaft 105, the driven gearwheel 116 on the intermediate shaft 104, the speed-reducing gearwheel 122 on the intermediate shaft 104 and the speed-reducing gearwheel 123 on the half-axles 106a and 106b and to a respective wheel (not shown) connectable thereto. Additionally, the power output by the EM 150 is transmitted through the driving gearwheel 111 on the input shaft 101, the driven gearwheel 115 on the intermediate shaft 104, the idler gearwheel 120 and the idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto.

7. First Reverse Speed Ratio (HDM)

The HPDS 200 and the transmission 170 can provide a power transmitting path 194 from the ICE 130 and the EM 150 for a first reverse speed ratio while operating in the HDM. This power transmitting path 194 (shown in FIG. 33) can be achieved when (i) the clutch 140 is in an engaged state such that ICE 130 is coupled to the input shaft 101, (ii) the synchronizer 108 is engaged with the reverse-gear driving gearwheel 114, (iii) the synchronizer 110 is engaged with the driven gearwheel 115, and (iv) the synchronizer 109 is in its neutral position. The power transmitting path 194 transmits power output by the ICE 130 and the EM 150.

For the power transmitting path 194 of first reverse speed ratio in the HDM, the power output by the ICE 130 is transmitted in sequence through the reverse-gear driving gearwheel 114 on the input shaft 101, the reverse-gear idler gearwheel 119 on the reverse-gear idler shaft 103, the reverse-gear driven gearwheel 118 on the intermediate shaft 104, the speed-reducing gearwheel 122 on the intermediate shaft 104 and the speed-reducing gearwheel 123 on the half-axles 106a and 106b and to a respective wheel (not shown) connectable thereto. Additionally, the power output by the EM 150 is transmitted through the driving gearwheel 111 on the input shaft 101, the driven gearwheel 115 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto.

8. Second Reverse Speed Ratio (HDM)

The HPDS 200 and the transmission 170 can provide a power transmitting path 195 from the ICE 130 and the EM 150 for a second reverse speed ratio while operating in the HDM. This power transmitting path 195 (shown in FIG. 34) can be achieved when (i) the clutch 140 is in an engaged state such that ICE 130 is coupled to the input shaft 101, (ii) the synchronizer 108 is engaged with the reverse-gear driving gearwheel 114, (iii) the synchronizer 110 is engaged with the driven gearwheel 116, and (iv) the synchronizer 109 is in its neutral position. The power transmitting path 195 transmits power output by the ICE 130 and the EM 150.

For the power transmitting path 195 of the second reverse speed ratio in the HDM, the power output by the ICE 130 is transmitted in sequence through the reverse-gear driving gearwheel 114 on the input shaft 101, the reverse-gear idler gearwheel 119 on the reverse-gear idler shaft 103, the reverse-gear driven gearwheel 118 on the intermediate shaft 104, the speed-reducing gearwheel 122 on the intermediate shaft 104 and the speed-reducing gearwheel 123 on the half-axles 106a and 106b and to a respective wheel (not shown) connectable thereto. Additionally, the power output by the EM 150 is transmitted in sequence through the driving gearwheel 111 on the input shaft 101, the driven gearwheel 115 on the intermediate shaft 104, the idler gearwheel 120 and the idler gearwheel 121 on the intermediate shaft 105, the driven gearwheel 116 on the intermediate shaft 104, the speed-reducing gearwheel 122 on the intermediate shaft 104, the speed-reducing gearwheel 123, and the gearwheels of the differential 160 to at least one of the half-axles 106a and 106b and to a respective wheel (not shown) connectable thereto.

VI. Additional Example Embodiments

The following examples set out further or alternative aspects of the disclosure. Any reference characters (e.g., numbers or letters) to items in the figures or to the figures are for ease of reference only and are not limiting on the scope of the other examples described herein. For any of the examples in this section that refers to providing a forward speed ratio or reverse speed ratio, but does not set forth the position of a synchronizer, that synchronizer may be in its neutral position.

Example 1

A Hybrid-Power Driving System (HPDS) (100, 200) Comprising an input shaft (1, 101) having disposed thereon a first driving gearwheel (11, 111), a second driving gearwheel (12, 112), a third driving gearwheel (13, 113), a reverse-gear driving gearwheel (14, 114), a first synchronizer (9, 109), and a second synchronizer (8, 108), wherein the first synchronizer (9, 109) is disposed between the first driving gearwheel (11, 111) and the second driving gearwheel (12, 112), and wherein the second synchronizer (8, 108) is disposed between the third driving gearwheel (13, 113) and the reverse-gear driving gearwheel (14, 114);

a first intermediate shaft (4, 104) having disposed thereon a first speed-reducing gearwheel (22, 122), a first driven gearwheel (15, 115), a second driven gearwheel (16, 116), a third driven gearwheel (17, 117), a reverse-gear driven gearwheel (18, 118), and a third synchronizer (10, 110), wherein the third synchronizer (10, 110) is disposed between the first driven gearwheel (15, 115) and the second driven gearwheel (16, 116);

a second intermediate shaft (5, 105) having disposed thereon a first idler gearwheel (20, 120) and a second idler gearwheel (21, 121);

a first idler shaft (3, 103) having disposed thereon a reverse-gear idler gearwheel (19, 119);

a motor shaft (2, 102); and a differential (60, 160) having gearwheels including a second speed-reducing gearwheel (23, 123), wherein (i) the first driving gearwheel (11, 111) meshes with the first driven gearwheel (15, 115), (ii) the second driving gearwheel (12, 112) meshes with the second driven gearwheel (16, 116), (iii) the third driving gearwheel (13, 113) meshes with the third driven gearwheel (17, 117), (iv) the reverse-gear driving gearwheel (14, 114) meshes with the reverse-gear idler gearwheel (19, 119), (v) the reverse-gear driven gearwheel (18, 118) meshes with the reverse-gear idler gearwheel (19, 119), (vi) the first idler gearwheel (20, 120) meshes with the first driven gearwheel (15, 115), (vii) the second idler gearwheel (21, 121) meshes with the second driven gearwheel (16, 116), and (viii) the first speed-reducing gearwheel (22, 122) meshes with the second speed-reducing gearwheel (23, 123).

Example 2

The hybrid-power driving system of EXAMPLE 1, further comprising: a pair of half-axles (6a and 6b, 106a and 106b) connected to the differential (60, 160).

Example 3

The hybrid-power driving system of EXAMPLE 2, wherein the input shaft (1, 101), the motor shaft (2, 102) the first idler shaft (3, 103) the first intermediate shaft (4, 104), the second intermediate shaft (5, 105), and the pair of half-axles (6a and 6b, 106a and 106b) are parallel to each other.

Example 4

The hybrid-power driving system in any of EXAMPLES 1-3, further comprising: a gearbox including at least a portion of each of the following: the input shaft (1, 101), the motor shaft (2, 102) the first idler shaft (3, 103) the first intermediate shaft (4, 104), and the second intermediate shaft (5, 105).

Example 5

The hybrid-power driving system in any of EXAMPLES 1-4, further comprising: an internal combustion engine (ICE) (30, 130); and an electric motor (EM) (50, 150).

Example 6

The hybrid-power driving system in any of EXAMPLES 1-5, further comprising: a clutch (40, 140), wherein the clutch (40, 140) is configured to couple the input shaft (1, 101) to the ICE (30, 130), and wherein the clutch (40, 140) is disposed between the ICE (30, 130) and a one of the first driving gearwheel (11, 111), the second driving gearwheel (12, 112), the third driving gearwheel (13, 113), and the reverse-gear driving gearwheel (14, 114) that is disposed on the input shaft (1, 101) closest to the ICE (30, 130).

Example 7

The hybrid-power driving system in any of EXAMPLES 1-6, further comprising: an air conditioning compressor (55, 155), wherein an element of the air conditioning compressor (55, 155) is rotatable by the motor shaft (2, 102).

Example 8

The hybrid-power driving system in any of EXAMPLES 1-7,
wherein the first synchronizer (9, 109) is configured for releasably coupling, to the input shaft (1, 101) one at a time, the first driving gearwheel (11, 111) and the second driving gearwheel (12, 112) and
wherein the second synchronizer (8, 108) is configured for releasably coupling, to the input shaft (1, 101) one at a time, the third driving gearwheel (13, 113) and the reverse-gear driving gearwheel (14, 114).

Example 9

The hybrid-power driving system in any of EXAMPLES 1-8, further comprising:
a first synchronizer mechanism slidable to releasably couple the first synchronizer (9, 109) with the first driving gearwheel (11, 111) and the second driving gearwheel (12, 112);
a second synchronizer mechanism slidable to releasably couple the second synchronizer (8, 108) with the third driving gearwheel (13, 113) and the reverse-gear driving gearwheel (14, 114); and
a third synchronizer mechanism slidable to releasably couple the third synchronizer (10, 110) with the first driven gearwheel (15, 115) and the second driven gearwheel (16, 116).

Example 10

The hybrid-power driving system in any of EXAMPLES 5-9,
wherein the HPDS (100, 200) provides for transmission of power in a first forward speed ratio in a pure engine driving mode (PEDM) with (i) the second driving gearwheel (12, 112) releasably coupled to the input shaft (1, 101) by the first synchronizer (9, 109), (ii) the first driven gearwheel (15, 115) releasably coupled to the first intermediate shaft (4, 104) by the third synchronizer (10, 110), and (iii) the input shaft (1, 101) releasably coupled to the ICE (30, 130), and
wherein power from the ICE (30, 130) in the first forward speed ratio in the PEDM is transmitted in sequence through the second driving gearwheel (12, 112) on the first input shaft (1, 101), the second driven gearwheel (16, 116) on the first intermediate shaft (4, 104), the second idler gearwheel (21, 121) on the second intermediate shaft (5, 105), the first idler gearwheel (20, 120) on the second intermediate shaft (5, 105), the first driven gearwheel (15, 115) on the first intermediate shaft (4, 104), the first speed-reducing gearwheel (22, 122) on the first intermediate shaft (4, 104), the speed-reducing gearwheel (23, 123), and the gearwheels of the differential (60, 160) to at least one of the half-axles (6*a* and 6*b*, 106*a* and 106*b*).

Example 11

The hybrid-power driving system in any of EXAMPLES 5-10,
wherein the HPDS (100, 200) provides for transmission of power in a second forward speed ratio in a pure engine driving mode (PEDM) with (i) the first driving gearwheel (11, 111) releasably coupled to the input shaft (1, 101) by the first synchronizer (9, 109), (ii) the first driven gearwheel (15, 115) releasably coupled to the first intermediate shaft (4, 104) by the third synchronizer (10, 110), and (iii) the input shaft (1, 101) releasably coupled to the ICE (30, 130), and
wherein power from the ICE (30, 130) in the second forward speed ratio in the PEDM is transmitted in sequence through the first driving gearwheel (11, 111) on the input shaft (1, 101), the first driven gearwheel (15, 115) on the first intermediate shaft (4, 104), the first speed-reducing gearwheel (22, 122) on the first intermediate shaft (4, 104), the speed-reducing gearwheel (23, 123), and the gearwheels of the differential (60, 160) to at least one of the half-axles (6*a* and 6*b*, 106*a* and 106*b*).

Example 12

The hybrid-power driving system in any of EXAMPLES 5-11,
wherein the HPDS (100, 200) provides for transmission of power in a third forward speed ratio in a pure engine driving mode (PEDM) with (i) the third driving gearwheel (13, 113) releasably coupled to the input shaft (1, 101) by the second synchronizer (8, 108), and (ii) the input shaft (1, 101) releasably coupled to the ICE (30, 130), and
wherein power from the ICE (30, 130) in the third forward speed ratio in the PEDM is transmitted in sequence through the third driving gearwheel (13, 113) on the input shaft (1, 101), the third driven gearwheel (17, 117) on the first intermediate shaft (4, 104), the first speed-reducing gearwheel (22, 122) on the first intermediate shaft (4, 104), the speed-reducing gearwheel (23, 123), and the gearwheels of the differential (60, 160) to at least one of the half-axles (6*a* and 6*b*, 106*a* and 106*b*).

Example 13

The hybrid-power driving system in any of EXAMPLES 5-12,
wherein the HPDS (100, 200) provides for transmission of power in a fourth forward speed ratio in a pure engine driving mode (PEDM) with (i) the second driving gearwheel (12, 112) releasably coupled to the input shaft (1, 101) by the first synchronizer (9, 109), (ii) the second driven gearwheel (16, 116) releasably coupled to the first intermediate shaft (4, 104) by the third synchronizer (10, 110), and (iii) the input shaft (1, 101) releasably coupled to the ICE (30, 130), and
wherein power from the ICE (30, 130) in the fourth forward speed ratio in the PEDM is transmitted in sequence through the second driving gearwheel (12, 112) on the input shaft (1, 101), the second driven gearwheel (16, 116) on the first intermediate shaft (4, 104), the first speed-reducing gearwheel (22, 122) on the first intermediate shaft (4, 104), the speed-reducing gearwheel (23, 123), and the gearwheels of the differential (60, 160) to at least one of the half-axles (6*a* and 6*b*, 106*a* and 106*b*).

Example 14

The hybrid-power driving system in any of EXAMPLES 5-13,
wherein the HPDS (100, 200) provides for transmission of power in a fifth forward speed ratio in a pure engine driving mode (PEDM) with (i) the first driving gearwheel (11, 111) releasably coupled to the input shaft (1, 101) by the first synchronizer (9, 109), (ii) the second driven gearwheel (16, 116) releasably coupled to the first intermediate shaft (4, 104) by the third synchronizer (10, 110), and (iii) the input shaft (1, 101) releasably coupled to the ICE (30, 130), and wherein power from the ICE (30, 130) in the fifth forward speed ratio in the PEDM is transmitted in sequence through the first driving gearwheel (11, 111) on the input shaft (1, 101), the first driven gearwheel (15, 115) on the first intermediate shaft (4, 104), the first idler gearwheel (20, 120) on the second intermediate shaft (5, 105), the second idler gearwheel (21, 121) on the second intermediate shaft (5, 105), the second driven gearwheel (16, 116) on the first intermediate shaft (4, 104), the first speed-reducing gearwheel (22, 122) on the first intermediate shaft (4, 104), the speed-reducing gearwheel (23, 123), and the gearwheels of the differential (60, 160) to at least one of the half-axles (6a and 6b, 106a and 106b).

Example 15

The hybrid-power driving system in any of EXAMPLES 5-14,
wherein the HPDS (100, 200) provides for transmission of power in a reverse speed ratio in a pure engine driving mode (PEDM) with (i) the reverse-gear driving gearwheel (14, 114) releasably coupled to the input shaft (1, 101) by the second synchronizer (8, 108), and (ii) the input shaft (1, 101) releasably coupled to the ICE (30, 130), and
wherein power from the ICE (30, 130) in the reverse speed ratio in the PEDM is transmitted in sequence through the reverse-gear driving gearwheel (14, 114) on the input shaft (1, 101), the reverse-gear idler gearwheel (19, 119) on the first idler shaft (3, 103), the reverse-gear driven gearwheel (18, 118) on the first intermediate shaft (4, 104), the first speed-reducing gearwheel (22, 122) on the first intermediate shaft (4, 104), the speed-reducing gearwheel (23, 123), and the gearwheels of the differential (60, 160) to at least one of the half-axles (6a and 6b, 106a and 106b).

Example 16

The hybrid-power driving system in any of EXAMPLES 5-15, further comprising: a second idler shaft (7) having disposed thereon a third idler gearwheel (24), wherein the motor shaft (2) has disposed thereon a fourth driving gearwheel (25); and wherein the third idler gearwheel (24) meshes with the first driving gearwheel (11) and the fourth driving gearwheel (25).

Example 17

The hybrid-power driving system of EXAMPLE 16,
wherein the HPDS (100) provides for transmission of power in a first forward speed ratio in a pure motor driving mode (PMDM) with the first driven gearwheel (15) releasably coupled to the first intermediate shaft (4) by the third synchronizer (10),
wherein the HPDS (100) provides for transmission of power in a first reverse speed ratio in the PMDM with the first driven gearwheel (15) releasably coupled to the first intermediate shaft (4) by the third synchronizer (10), and
wherein power from the EM (50) in the first forward speed ratio in the PMDM and in the first reverse speed ratio in the PMDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 18

The hybrid-power driving system of EXAMPLE 17,
wherein the HPDS (100) provides for transmission of power in a second forward speed ratio in the PMDM with the second driven gearwheel (16) releasably coupled to the first intermediate shaft (4) by the third synchronizer (10),
wherein the HPDS (100) provides for transmission of power in a second reverse speed ratio in the PMDM with the second driven gearwheel (16) releasably coupled to the first intermediate shaft (4) by the third synchronizer (10), and
wherein power from the EM (50) in the second forward speed ratio in the PMDM and in the second reverse speed ratio in the PMDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first idler gearwheel (20) on the second intermediate shaft (5), the second idler gearwheel (21) on the second intermediate shaft (5), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 19

The hybrid-power driving system of EXAMPLE 18, wherein the EM (50) turns in a first direction for the first forward speed ratio in the PMDM and for the second forward speed ratio in the PMDM, and wherein the EM (50) turns in a second direction, opposite the first direction, for the first reverse speed ratio in the PMDM and for the second reverse speed ratio in the PMDM.

Example 20

The hybrid-power driving system in any of EXAMPLES 5-19,
wherein the HPDS (100) provides for transmission of power in a first forward speed ratio in a hybrid driving mode (HDM) with (i) the second driving gearwheel (12) releasably coupled to the input shaft (1) by the first synchronizer (9), (ii) the first driven gearwheel (15) releasably coupled to the first intermediate shaft (4) by the third synchronizer (10), and (iii) the input shaft (1) releasably coupled to the ICE (30),
wherein power from the ICE (30) in the first forward speed ratio in the HDM is transmitted in sequence through the second driving gearwheel (12) on the first input shaft (1), the second driven gearwheel (16) on the first intermediate shaft (4), the second idler gearwheel (21) on the second intermediate shaft (5), the first idler gearwheel (20) on the second intermediate shaft (5), the first driven gearwheel (15) on the first intermediate shaft (4, 104), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the first forward speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 21

The hybrid-power driving system in any of EXAMPLES 5-20,
wherein the HPDS (100) provides for transmission of power in a second forward speed ratio in a hybrid driving mode (HDM) with (i) the first driving gearwheel (11) releasably coupled to the input shaft (1) by the first synchronizer (9), (ii) the first driven gearwheel (15) releasably coupled to the first intermediate shaft (4) by the third synchronizer (10), and (iii) the input shaft (1) releasably coupled to the ICE (30),
wherein power from the ICE (30) in the second forward speed ratio in the HDM is transmitted in sequence through the first driving gearwheel (11) on the first input shaft (1), the first driven gearwheel (15) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the second forward speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 22

The hybrid-power driving system in any of EXAMPLES 5-21,
wherein the HPDS (100) provides for transmission of power in a first instance of a third forward speed ratio in a hybrid driving mode (HDM) with (i) the third driving gearwheel (13) releasably coupled to the input shaft (1) by the second synchronizer (8), (ii) the first driven gearwheel (15) releasably coupled to the first intermediate shaft (4) by the third synchronizer (10), and (iii) the input shaft (1) releasably coupled to the ICE (30),
wherein power from the ICE (30) in the first instance of the third forward speed ratio in the HDM is transmitted in sequence through the third driving gearwheel (13) on the first input shaft (1), the third driven gearwheel (17) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the first instance of the third forward speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 23

The hybrid-power driving system in any of EXAMPLES 5-22,
wherein the HPDS (100) provides for transmission of power in a second instance of a third forward speed ratio in a hybrid driving mode (HDM) with (i) the third driving gearwheel (13) releasably coupled to the input shaft (1) by the second synchronizer (8), (ii) the second driven gearwheel (16) releasably coupled to the first intermediate shaft (4) by the third synchronizer (10), and (iii) the input shaft (1) releasably coupled to the ICE (30),
wherein power from the ICE (30) in the second instance of the third forward speed ratio in the HDM is transmitted in sequence through the third driving gearwheel (13) on the first input shaft (1), the third driven gearwheel (17) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the second instance of the third forward speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first idler gearwheel (20) on the second intermediate shaft (5), the second idler gearwheel (21) on the second intermediate shaft (5), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 24

The hybrid-power driving system in any of EXAMPLES 5-23,
wherein the HPDS (100) provides for transmission of power in a fourth forward speed ratio in a hybrid driving mode (HDM) with (i) the second driving gearwheel (12) releasably coupled to the input shaft (1) by the first synchronizer (9), (ii) the second driven gearwheel (16) releasably coupled to the first intermediate shaft (4) by the third synchronizer (10), and (iii) the input shaft (1) releasably coupled to the ICE (30),
wherein power from the ICE (30) in the fourth forward speed ratio in the HDM is transmitted in sequence through the second driving gearwheel (12) on the first input shaft (1), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the fourth forward speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first idler gearwheel (20) on the second intermediate shaft (5), the second idler gearwheel (21) on the second intermediate shaft (5), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 25

The hybrid-power driving system in any of EXAMPLES 5-24,
wherein the HPDS (100) provides for transmission of power in a fifth forward speed ratio in a hybrid driving mode (HDM) with (i) the first driving gearwheel (11) releasably coupled to the input shaft (1) by the first synchronizer (9), (ii) the second driven gearwheel (16) releasably coupled to the first intermediate shaft (4) by the third synchronizer (10), and (iii) the input shaft (1) releasably coupled to the ICE (30),
wherein power from the ICE (30) in the fifth forward speed ratio in the HDM is transmitted in sequence through the first driving gearwheel (11) on the first input shaft (1), the first driven gearwheel (15) on the first intermediate shaft (4), the first idler gearwheel (20) on the second intermediate shaft (5), the second idler gearwheel (21) on the second intermediate shaft (5), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the fifth forward speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first idler gearwheel (20) on the second intermediate shaft (5), the second idler gearwheel (21) on the second intermediate shaft (5), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 26

The hybrid-power driving system in any of EXAMPLES 16-25,
wherein the HPDS (100) provides for transmission of power in a first reverse speed ratio in a hybrid driving mode (HDM) with (i) the reverse-gear driving gearwheel (14) releasably coupled to the input shaft (1) by the second synchronizer (8), (ii) the first driven gearwheel (15) releasably coupled to the first intermediate shaft (4) by the third synchronizer (10), and (iii) the input shaft (1) releasably coupled to the ICE (30),
wherein power from the ICE (30) in the first reverse speed ratio in the HDM is transmitted in sequence through the reverse-gear driving gearwheel (14) on the input shaft (1), the reverse-gear idler gearwheel (19) on the reverse-gear idler shaft (3), the reverse-gear driven gearwheel (18) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the first reverse speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 27

The hybrid-power driving system in any of EXAMPLES 16-26,
wherein the HPDS (100) provides for transmission of power in a second reverse speed ratio in a hybrid driving mode (HDM) with (i) the reverse-gear driving gearwheel (14) releasably coupled to the input shaft (1) by the second synchronizer (8), (ii) the second driven gearwheel (16) releasably coupled to the first intermediate shaft (4) by the third synchronizer (10), and (iii) the input shaft (1) releasably coupled to the ICE (30),
wherein power from the ICE (30) in the second reverse speed ratio in the HDM is transmitted in sequence through the reverse-gear driving gearwheel (14) on the input shaft (1), the reverse-gear idler gearwheel (19) on the reverse-gear idler shaft (3), the reverse-gear driven gearwheel (18) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b), and
wherein power from the EM (50) in the second reverse speed ratio in the HDM is transmitted in sequence through the fourth driving gearwheel (25) on the motor shaft (2), the third idler gearwheel (24) on the second idler shaft (7), the first driving gearwheel (11) on the input shaft (1), the first driven gearwheel (15) on the first intermediate shaft (4), the first idler gearwheel (20) on the second intermediate shaft (5), the second idler gearwheel (21) on the second intermediate shaft (5), the second driven gearwheel (16) on the first intermediate shaft (4), the first speed-reducing gearwheel (22) on the first intermediate shaft (4), the second speed-reducing gearwheel (23), and the gearwheels of the differential (60) to at least one of the half-axles (6a and 6b).

Example 28

The hybrid-power driving system in any of EXAMPLES 1-27, further comprising: a first sleeve (12a, 112a), a second sleeve (13a, 113a), a third sleeve (14a, 114a), a fourth sleeve (15a, 115a), and a fifth sleeve (16a, 116a), wherein the first sleeve (12a, 112a), the second sleeve (13a, 113a), and the third sleeve (14a, 114a) are carried by the input shaft (1, 101) and carry the second driving gearwheel (12, 112), the third driving gearwheel (13, 113), and the reverse-gear driving gearwheel (14, 114), respectively, and wherein the fourth sleeve (15a, 115a) and the fifth sleeve (16a, 116a) are carried by the first intermediate shaft (4, 104) and carry the second driving gearwheel (12, 112), the first driven gearwheel (15, 115), and the second driven gearwheel (16, 116), respectively.

Example 29

The hybrid-power driving system in any of EXAMPLES 5-15, wherein the motor shaft (102) is a sleeve carried by the input shaft (101), and wherein the first driving gearwheel 111 is fixedly carried by the motor shaft (102).

Example 30

The hybrid-power driving system of EXAMPLE 29, wherein the HPDS (200) provides for transmission of power in a first forward speed ratio in a pure motor driving mode (PMDM) with the first driven gearwheel (115) releasably coupled to the first intermediate shaft (104) by the third synchronizer (110), wherein the HPDS (200) provides for transmission of power in a first reverse speed ratio in the PMDM with the first driven gearwheel (115) releasably coupled to the first intermediate shaft (104) by the third synchronizer (110), and wherein power from the EM (150) in the first forward speed ratio in the PMDM and in the first reverse speed ratio in the PMDM is transmitted in sequence through the first driving gearwheel (111) on the input shaft (101), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106*a* and 106*b*).

Example 31

The hybrid-power driving system of EXAMPLE 30, wherein the HPDS (200) provides for transmission of power in a second forward speed ratio in the PMDM with the second driven gearwheel (116) releasably coupled to the first intermediate shaft (104) by the third synchronizer (110), wherein the HPDS (200) provides for transmission of power in a second reverse speed ratio in the PMDM with the second driven gearwheel (116) releasably coupled to the first intermediate shaft (104) by the third synchronizer (110), and wherein power from the EM (150) in the second forward speed ratio in the PMDM and in the second reverse speed ratio in the PMDM is transmitted in sequence through the first driving gearwheel (111) on the input shaft (101), the first driven gearwheel (115) on the first intermediate shaft (104), the first idler gearwheel (120) on the second intermediate shaft (105), the second idler gearwheel (121) on the second intermediate shaft (105), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106*a* and 106*b*).

Example 32

The hybrid-power driving system of EXAMPLE 31, wherein the EM (150) turns in a first direction for the first forward speed ratio in the PMDM and for the second forward speed ratio in the PMDM, and wherein the EM (150) turns in a second direction, opposite the first direction, for the first reverse speed ratio in the PMDM and for the second reverse speed ratio in the PMDM.

Example 33

The hybrid-power driving system in any of EXAMPLES 29-32, wherein the HPDS (200) provides for transmission of power in a first forward speed ratio in a hybrid driving mode (HDM) with (i) the second driving gearwheel (112) releasably coupled to the input shaft (101) by the first synchronizer (109), (ii) the first driven gearwheel (115) releasably coupled to the first intermediate shaft (104) by the third synchronizer (110), and (iii) the input shaft (101) releasably coupled to the ICE (130), wherein power from the ICE (130) in the first forward speed ratio in the HDM is transmitted in sequence through the second driving gearwheel (112) on the first input shaft (101), the second driven gearwheel (116) on the first intermediate shaft (104), the second idler gearwheel (121) on the second intermediate shaft (105), the first idler gearwheel (120) on the second intermediate shaft (105), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106*a* and 106*b*), and wherein power from the EM (150) in the first forward speed ratio in the HDM is transmitted in sequence through the first driving gearwheel (111) on the input shaft (101), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106*a* and 106*b*).

Example 34

The hybrid-power driving system in any of EXAMPLES 29-33, wherein the HPDS (200) provides for transmission of power in a second forward speed ratio in a hybrid driving mode (HDM) with (i) the first driving gearwheel (111) releasably coupled to the input shaft (101) by the first synchronizer (109), (ii) the first driven gearwheel (115) releasably coupled to the first intermediate shaft (104) by the third synchronizer (110), and (iii) the input shaft (101) releasably coupled to the ICE (130), wherein power from the ICE (130) in the second forward speed ratio in the HDM is transmitted in sequence through the first driving gearwheel (111) on the first input shaft (101), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106*a* and 106*b*), and wherein power from the EM (150) in the second forward speed ratio in the HDM is transmitted in sequence through the first driving gearwheel (111) on the input shaft (101), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106*a* and 106*b*).

Example 35

The hybrid-power driving system in any of EXAMPLES 29-34, wherein the HPDS (200) provides for transmission of power in a first instance of a third forward speed ratio in a hybrid driving mode (HDM) with (i) the third driving gearwheel (113) releasably coupled to the input shaft (101) by the second synchronizer (108), (ii) the first driven gearwheel (115) releasably coupled to the first intermediate shaft (104) by the third synchronizer (110), and (iii) the input shaft (101) releasably coupled to the ICE (130), wherein power from the ICE (130) in the first instance of the third forward speed ratio in the HDM is transmitted in sequence through the third driving gearwheel (113) on the first input shaft (101), the third driven gearwheel (117) on the first intermediate shaft (104), the first speed-reducing gearwheel (122)

on the first intermediate shaft (104), the speed-reducing gearwheel (123), and the gearwheels of the differential (160) to at least one of the half-axles (106a and 106b), and wherein power from the EM (150) in the first instance of the third forward speed ratio in the HDM is transmitted in sequence the first driving gearwheel (111) on the input shaft (101), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106a and 106b).

Example 36

The hybrid-power driving system in any of EXAMPLES 29-35, wherein the HPDS (200) provides for transmission of power in a second instance of a third forward speed ratio in a hybrid driving mode (HDM) with (i) the third driving gearwheel (113) releasably coupled to the input shaft (101) by the second synchronizer (108), (ii) the second driven gearwheel (116) releasably coupled to the first intermediate shaft (104) by the third synchronizer (110), and (iii) the input shaft (101) releasably coupled to the ICE (130), wherein power from the ICE (130) in the second instance of the third forward speed ratio in the HDM is transmitted in sequence through the third driving gearwheel (113) on the first input shaft (101), the third driven gearwheel (117) on the first intermediate shaft (104), the first speed-reducing gearwheel (122) on the first intermediate shaft (104), the speed-reducing gearwheel (123), and the gearwheels of the differential (160) to at least one of the half-axles (106a and 106b), and wherein power from the EM (150) in the second instance of the third forward speed ratio in the HDM is transmitted in sequence through the first driving gearwheel (111) on the input shaft (101), the first driven gearwheel (115) on the first intermediate shaft (104), the first idler gearwheel (120) on the second intermediate shaft (105), the second idler gearwheel (121) on the second intermediate shaft (105), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106a and 106b).

Example 37

The hybrid-power driving system in any of EXAMPLES 29-36, wherein the HPDS (200) provides for transmission of power in a fourth forward speed ratio in a hybrid driving mode (HDM) with (i) the second driving gearwheel (112) releasably coupled to the input shaft (101) by the first synchronizer (109), (ii) the second driven gearwheel (116) releasably coupled to the first intermediate shaft (104) by the third synchronizer (110), and (iii) the input shaft (101) releasably coupled to the ICE (130), wherein power from the ICE (130) in the fourth forward speed ratio in the HDM is transmitted in sequence through the second driving gearwheel (112) on the first input shaft (1), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106a and 106b), and wherein power from the EM (150) in the fourth forward speed ratio in the HDM is transmitted in sequence through the first driving gearwheel (111) on the input shaft (101), the first driven gearwheel (115) on the first intermediate shaft (104), the first idler gearwheel (120) on the second intermediate shaft (105), the second idler gearwheel (121) on the second intermediate shaft (105), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106a and 106b).

Example 38

The hybrid-power driving system in any of EXAMPLES 29-37, wherein the HPDS (200) provides for transmission of power in a fifth forward speed ratio in a hybrid driving mode (HDM) with (i) the first driving gearwheel (111) releasably coupled to the input shaft (101) by the first synchronizer (109), (ii) the second driven gearwheel (116) releasably coupled to the first intermediate shaft (104) by the third synchronizer (110), and (iii) the input shaft (101) releasably coupled to the ICE (130), wherein power from the ICE (130) in the fifth forward speed ratio in the HDM is transmitted in sequence through the first driving gearwheel (111) on the first input shaft (101), the first driven gearwheel (115) on the first intermediate shaft (104), the first idler gearwheel (120) on the second intermediate shaft (105), the second idler gearwheel (121) on the second intermediate shaft (105), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106a and 106b), and wherein power from the EM (150) in the fifth forward speed ratio in the HDM is transmitted in sequence through the first driving gearwheel (111) on the input shaft (101), the first driven gearwheel (115) on the first intermediate shaft (104), the first idler gearwheel (120) on the second intermediate shaft (105), the second idler gearwheel (121) on the second intermediate shaft (105), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106a and 106b).

Example 39

The hybrid-power driving system in any of EXAMPLES 29-38, wherein the HPDS (200) provides for transmission of power in a first reverse speed ratio in a hybrid driving mode (HDM) with (i) the reverse-gear driving gearwheel (114) releasably coupled to the input shaft (101) by the second synchronizer (108), (ii) the first driven gearwheel (115) releasably coupled to the first intermediate shaft (104) by the third synchronizer (110), and (iii) the input shaft (101) releasably coupled to the ICE (130), wherein power from the ICE (130) in the first reverse speed ratio in the HDM is transmitted in sequence through the reverse-gear driving gearwheel (114) on the input shaft (101), the reverse-gear idler gearwheel (119) on the reverse-gear idler shaft (103), the reverse-gear driven gearwheel (118) on the first intermediate shaft (104), the first speed-reducing gearwheel (122) on the first intermediate shaft (104), the speed-reducing gearwheel (123), and the gearwheels of the differential (160) to at least one of the half-axles (106a and 106b), and wherein power from the EM (150) in the first reverse speed ratio in the HDM is transmitted in sequence through the first driving gearwheel (111) on the input shaft (101), the first driven gearwheel (115) on the first intermediate shaft (104), the first speed-reducing gearwheel (122) on the first intermediate shaft (104), the speed-reducing gearwheel (123), and the gearwheels of the differential (160) to at least one of the half-axles (106a and 106b).

Example 40

The hybrid-power driving system in any of EXAMPLES 29-39, wherein the HPDS (200) provides for transmission of power in a second reverse speed ratio in a hybrid driving mode (HDM) with (i) the reverse-gear driving gearwheel (114) releasably coupled to the input shaft (101) by the second synchronizer (108), (ii) the second driven gearwheel (116) releasably coupled to the first intermediate shaft (104) by the third synchronizer (110), and (iii) the input shaft (101) releasably coupled to the ICE (130), wherein power from the ICE (130) in the second reverse speed ratio in the HDM is transmitted in sequence through the reverse-gear driving gearwheel (114) on the input shaft (101), the reverse-gear idler gearwheel (119) on the reverse-gear idler shaft (103), the reverse-gear driven gearwheel (118) on the first intermediate shaft (104), the first speed-reducing gearwheel (122) on the first intermediate shaft (104), the speed-reducing gearwheel (123), and the gearwheels of the differential (160) to at least one of the half-axles (106a and 106b), and wherein power from the EM (150) in the second reverse speed ratio in the HDM is transmitted in sequence through the first driving gearwheel (111) on the input shaft (101), the first driven gearwheel (115) on the first intermediate shaft (104), the first idler gearwheel (120) on the second intermediate shaft (5, 105), the second idler gearwheel (121) on the second intermediate shaft (105), the second driven gearwheel (116) on the first intermediate shaft (104), the first speed-reducing gearwheel (122) on the first intermediate shaft (104), the speed-reducing gearwheel (123), and the gearwheels of the differential (160) to at least one of the half-axles (106a and 106b).

Example 41

The hybrid-power driving system in any of EXAMPLES 1-40, wherein the HPDS (100, 200) with a single clutch (40, 140) is shiftable through at least five forward speed ratios without interruption of an output power by the pair of half-axles (6a and 6b, 106a and 106b).

Example 42

The hybrid-power driving system in any of EXAMPLES 5-41, wherein the HPDS (100, 200) with a single clutch (40, 140) is shiftable through at least five forward speed ratios to output power from at least one of the ICE (30, 130) and the EM (50, 150) by the pair of half-axles (6a and 6b, 106a and 106b) without interruption of an output power by the pair of half-axles (6a and 6b, 106a and 106b).

VII. Conclusion

Example embodiments have been described above. Those skilled in the art will understand that changes and modifications can be made to the described embodiments without departing from the true scope and spirit of the present invention, which is defined by the claims.

We claim:

1. A hybrid-power driving system (HPDS) comprising:
an input shaft having disposed thereon a first driving gearwheel, a second driving gearwheel, a third driving gearwheel, a reverse-gear driving gearwheel, a first synchronizer, and a second synchronizer, wherein the first synchronizer is disposed between the first driving gearwheel and the second driving gearwheel, and wherein the second synchronizer is disposed between the third driving gearwheel and the reverse-gear driving gearwheel;
a first intermediate shaft having disposed thereon a first speed-reducing gearwheel, a first driven gearwheel, a second driven gearwheel, a third driven gearwheel, a reverse-gear driven gearwheel, and a third synchronizer, wherein the third synchronizer is disposed between the first driven gearwheel and the second driven gearwheel;
a second intermediate shaft having disposed thereon a first idler gearwheel and a second idler gearwheel;
a first idler shaft having disposed thereon a reverse-gear idler gearwheel;
a motor shaft; and
a differential having gearwheels including a second speed-reducing gearwheel,
wherein (i) the first driving gearwheel meshes with the first driven gearwheel, (ii) the second driving gearwheel meshes with the second driven gearwheel, (iii) the third driving gearwheel meshes with the third driven gearwheel, (iv) the reverse-gear driving gearwheel meshes with the reverse-gear idler gearwheel, (v) the reverse-gear driven gearwheel meshes with the reverse-gear idler gearwheel, (vi) the first idler gearwheel meshes with the first driven gearwheel, (vii) the second idler gearwheel meshes with the second driven gearwheel, and (viii) the first speed-reducing gearwheel meshes with the second speed-reducing gearwheel.

2. The hybrid-power driving system of claim 1, further comprising: a pair of half-axles connected to the differential.

3. The hybrid-power driving system of claim 1, further comprising:
an internal combustion engine (ICE); and
an electric motor (EM).

4. The hybrid-power driving system of claim 3, further comprising: a clutch,
wherein the clutch is configured to couple the input shaft to the ICE, and
wherein the clutch is disposed between the ICE and a one of the first driving gearwheel, the second driving gearwheel, the third driving gearwheel, and the reverse-gear driving gearwheel that is disposed on the input shaft closest to the ICE.

5. The hybrid-power driving system of claim 4, further comprising: a second idler shaft having disposed thereon a third idler gearwheel, wherein the motor shaft has disposed thereon a fourth driving gearwheel; and wherein the third idler gearwheel meshes with the first driving gearwheel and the fourth driving gearwheel.

6. The hybrid-power driving system of claim 5,
wherein the HPDS provides for transmission of power in a first forward speed ratio in a hybrid driving mode (HDM) with (i) the second driving gearwheel releasably coupled to the input shaft by the first synchronizer, (ii) the first driven gearwheel releasably coupled to the first intermediate shaft by the third synchronizer, and (iii) the input shaft releasably coupled to the ICE,
wherein power from the ICE in the first forward speed ratio in the HDM is transmitted in sequence through the second driving gearwheel on the first input shaft, the second driven gearwheel on the first intermediate shaft, the second idler gearwheel on the second intermediate shaft, the first idler gearwheel on the second intermediate shaft, the first driven gearwheel on the first intermediate shaft, the first speed-reducing gearwheel on the first intermediate shaft, the second speed-reducing gearwheel, and the gearwheels of the differential to at least one of the half-axles, and wherein power from the EM in the first forward speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first speed-reducing gearwheel on the first intermediate shaft, the second speed-reducing gearwheel, and the gearwheels of the differential to at least one of the half-axles.

7. The hybrid-power driving system of claim 6,
wherein the HPDS provides for transmission of power in a second forward speed ratio in a hybrid driving mode (HDM) with (i) the first driving gearwheel releasably coupled to the input shaft by the first synchronizer, (ii) the first driven gearwheel releasably coupled to the first intermediate shaft by the third synchronizer, and (iii) the input shaft releasably coupled to the ICE, wherein power from the ICE in the second forward speed ratio in the HDM is transmitted in sequence through the first driving gearwheel on the first input shaft, the first driven gearwheel on the first intermediate shaft, the first speed-reducing gearwheel on the first intermediate shaft, the second speed-reducing gearwheel, and the gearwheels of the differential to at least one of the half-axles, and wherein power from the EM in the second forward speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first speed-reducing gearwheel on the first intermediate shaft, the second speed-reducing gearwheel, and the gearwheels of the differential to at least one of the half-axles.

8. The hybrid-power driving system of claim 7,
wherein the HPDS provides for transmission of power in a first instance of a third forward speed ratio in a hybrid driving mode (HDM) with (i) the third driving gearwheel releasably coupled to the input shaft by the second synchronizer, (ii) the first driven gearwheel releasably coupled to the first intermediate shaft by the third synchronizer, and (iii) the input shaft releasably coupled to the ICE, wherein power from the ICE in the first instance of the third forward speed ratio in the HDM is transmitted in sequence through the third driving gearwheel on the first input shaft, the third driven gearwheel on the first intermediate shaft, the first speed-reducing gearwheel on the first intermediate shaft, the second speed-reducing gearwheel, and the gearwheels of the differential to at least one of the half-axles, and wherein power from the EM in the first instance of the third forward speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first speed-reducing gearwheel on the first intermediate shaft, the second speed-reducing gearwheel, and the gearwheels of the differential to at least one of the half-axles.

9. The hybrid-power driving system of claim 8,
wherein the HPDS provides for transmission of power in a second instance of a third forward speed ratio in a hybrid driving mode (HDM) with (i) the third driving gearwheel releasably coupled to the input shaft by the second synchronizer, (ii) the second driven gearwheel releasably coupled to the first intermediate shaft by the third synchronizer, and (iii) the input shaft releasably coupled to the ICE, wherein power from the ICE in the second instance of the third forward speed ratio in the HDM is transmitted in sequence through the third driving gearwheel on the first input shaft, the third driven gearwheel on the first intermediate shaft, the first speed-reducing gearwheel on the first intermediate shaft, the second speed-reducing gearwheel, and the gearwheels of the differential to at least one of the half-axles, and wherein power from the EM in the second instance of the third forward speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first idler gearwheel on the second intermediate shaft, the second idler gearwheel on the second intermediate shaft, the second driven gearwheel on the first intermediate shaft, the first speed-reducing gearwheel on the first intermediate shaft, the second speed-reducing gearwheel, and the gearwheels of the differential to at least one of the half-axles.

10. The hybrid-power driving system of claim 9,
wherein the HPDS provides for transmission of power in a fourth forward speed ratio in a hybrid driving mode (HDM) with (i) the second driving gearwheel releasably coupled to the input shaft by the first synchronizer, (ii) the second driven gearwheel releasably coupled to the first intermediate shaft by the third synchronizer, and (iii) the input shaft releasably coupled to the ICE, wherein power from the ICE in the fourth forward speed ratio in the HDM is transmitted in sequence through the second driving gearwheel on the first input shaft, the second driven gearwheel on the first intermediate shaft, the first speed-reducing gearwheel on the first intermediate shaft, the second speed-reducing gearwheel, and the gearwheels of the differential to at least one of the half-axles, and wherein power from the EM in the fourth forward speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first idler gearwheel on the second intermediate shaft, the second idler gearwheel on the second intermediate shaft, the second driven gearwheel on the first intermediate shaft, the first speed-reducing gearwheel on the first intermediate shaft, the second speed-reducing gearwheel, and the gearwheels of the differential to at least one of the half-axles.

11. The hybrid-power driving system of claim 10,
wherein the HPDS provides for transmission of power in a fifth forward speed ratio in a hybrid driving mode (HDM) with (i) the first driving gearwheel releasably coupled to the input shaft by the first synchronizer, (ii)

the second driven gearwheel releasably coupled to the first intermediate shaft by the third synchronizer, and (iii) the input shaft releasably coupled to the ICE, wherein power from the ICE in the fifth forward speed ratio in the HDM is transmitted in sequence through the first driving gearwheel on the first input shaft, the first driven gearwheel on the first intermediate shaft, the first idler gearwheel on the second intermediate shaft, the second idler gearwheel on the second intermediate shaft, the second driven gearwheel on the first intermediate shaft, the first speed-reducing gearwheel on the first intermediate shaft, the second speed-reducing gearwheel, and the gearwheels of the differential to at least one of the half-axles, and wherein power from the EM in the fifth forward speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first idler gearwheel on the second intermediate shaft, the second idler gearwheel on the second intermediate shaft, the second driven gearwheel on the first intermediate shaft, the first speed-reducing gearwheel on the first intermediate shaft, the second speed-reducing gearwheel, and the gearwheels of the differential to at least one of the half-axles.

12. The hybrid-power driving system of claim 5, wherein the HPDS provides for transmission of power in a first reverse speed ratio in a hybrid driving mode (HDM) with (i) the reverse-gear driving gearwheel releasably coupled to the input shaft by the second synchronizer, (ii) the first driven gearwheel releasably coupled to the first intermediate shaft by the third synchronizer, and (iii) the input shaft releasably coupled to the ICE, wherein power from the ICE in the first reverse speed ratio in the HDM is transmitted in sequence through the reverse-gear driving gearwheel on the input shaft, the reverse-gear idler gearwheel on the reverse-gear idler shaft, the reverse-gear driven gearwheel on the first intermediate shaft, the first speed-reducing gearwheel on the first intermediate shaft, the second speed-reducing gearwheel, and the gearwheels of the differential to at least one of the half-axles, and wherein power from the EM in the first reverse speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first speed-reducing gearwheel on the first intermediate shaft, the second speed-reducing gearwheel, and the gearwheels of the differential to at least one of the half-axles.

13. The hybrid-power driving system of claim 12, wherein the HPDS provides for transmission of power in a second reverse speed ratio in a hybrid driving mode (HDM) with (i) the reverse-gear driving gearwheel releasably coupled to the input shaft by the second synchronizer, (ii) the second driven gearwheel releasably coupled to the first intermediate shaft by the third synchronizer, and (iii) the input shaft releasably coupled to the ICE, wherein power from the ICE in the second reverse speed ratio in the HDM is transmitted in sequence through the reverse-gear driving gearwheel on the input shaft, the reverse-gear idler gearwheel on the reverse-gear idler shaft, the reverse-gear driven gearwheel on the first intermediate shaft, the first speed-reducing gearwheel on the first intermediate shaft, the second speed-reducing gearwheel, and the gearwheels of the differential to at least one of the half-axles, and wherein power from the EM in the second reverse speed ratio in the HDM is transmitted in sequence through the fourth driving gearwheel on the motor shaft, the third idler gearwheel on the second idler shaft, the first driving gearwheel on the input shaft, the first driven gearwheel on the first intermediate shaft, the first idler gearwheel on the second intermediate shaft, the second idler gearwheel on the second intermediate shaft, the second driven gearwheel on the first intermediate shaft, the first speed-reducing gearwheel on the first intermediate shaft, the second speed-reducing gearwheel, and the gearwheels of the differential to at least one of the half-axles.

14. The hybrid-power driving system of claim 1, further comprising: a first sleeve, a second sleeve, a third sleeve, a fourth sleeve, and a fifth sleeve, wherein the first sleeve, the second sleeve, and the third sleeve are carried by the input shaft and carry the second driving gearwheel, the third driving gearwheel, and the reverse-gear driving gearwheel, respectively, and wherein the fourth sleeve and the fifth sleeve are carried by the first intermediate shaft and carry the first driven gearwheel and the second driven gearwheel, respectively.

15. The hybrid-power driving system of claim 4, wherein the motor shaft is a sleeve carried by the input shaft, and wherein the first driving gearwheel is fixedly carried by the motor shaft.

16. The hybrid-power driving system of claim 2, wherein the HPDS with a single clutch is shiftable through at least five forward speed ratios without interruption of an output power by the pair of half-axles.

17. The hybrid-power driving system of claim 4, further comprising a pair of half-axles connected to the differential, wherein the HPDS with a single clutch is shiftable through at least five forward speed ratios to output power from at least one of the ICE and the EM by the pair of half-axles without interruption of an output power by the pair of half-axles.

* * * * *